United States Patent
Gong et al.

(10) Patent No.: US 11,240,761 B2
(45) Date of Patent: Feb. 1, 2022

(54) METHODS AND SYSTEMS OF POWER CONTROL FOR UPLINK TRANSMISSION

(71) Applicant: Huawei Technologies Co., Ltd., Shenzhen (CN)

(72) Inventors: Zhengwei Gong, Ottawa (CA); Amine Maaref, Ottawa (CA); Kelvin Kar Kin Au, Ottawa (CA); Mohammadhadi Baligh, Ottawa (CA); Weimin Xiao, Hoffman Estates, IL (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/662,357

(22) Filed: Oct. 24, 2019

(65) Prior Publication Data

US 2020/0068497 A1  Feb. 27, 2020

Related U.S. Application Data

(63) Continuation of application No. PCT/CN2018/091087, filed on Jun. 13, 2018.
(Continued)

(51) Int. Cl.
H04W 52/14 (2009.01)
H04W 52/24 (2009.01)
H04W 52/32 (2009.01)

(52) U.S. Cl.
CPC ....... *H04W 52/146* (2013.01); *H04W 52/242* (2013.01); *H04W 52/325* (2013.01)

(58) Field of Classification Search
CPC ............. H04W 52/146; H04W 52/242; H04W 52/325; H04W 52/0209; H04W 52/08;
(Continued)

(56) References Cited

U.S. PATENT DOCUMENTS

2011/0038271 A1\* 2/2011 Shin .................... H04W 52/146
                                                              370/252
2011/0171992 A1   7/2011 Seo et al.
(Continued)

FOREIGN PATENT DOCUMENTS

CN    101808360 A    8/2010
CN    102083181 A    6/2011
(Continued)

OTHER PUBLICATIONS

Huawei et al., "Discussion on UL DMRS power boosting", 3GPP TSG RAN WG1 NR Ad Hoc Meeting, R1-1710458, Jun. 27-30, 2017, 3 Pages, Qingdao, China.
(Continued)

*Primary Examiner* — John J Lee
(74) *Attorney, Agent, or Firm* — Slater Matsil, LLP

(57) ABSTRACT

A method for power control for uplink transmission is provided. In an embodiment, a method in a user equipment (UE) for reference signal (RS) relationship specific uplink (UL) transmission power control includes transmitting, by the UE, a first UL signal according to a first power control set including at least one of a first target power, a second target power, a DL reference signal (RS) for pathloss estimation, a pathloss compensation factor, and a transmit power command (TPC). The first power control set is determined according to a first RS relationship between one first RS and a first UL signal.

20 Claims, 18 Drawing Sheets

Related U.S. Application Data

(60) Provisional application No. 62/521,259, filed on Jun. 16, 2017.

(58) Field of Classification Search
CPC . H04W 52/16; H04W 52/243; H04W 52/245; H04W 52/365; H04W 52/367; H04W 52/63; H04W 52/38; H04W 52/42; H04W 52/52; H04W 72/042; H04W 72/044; H04W 72/046; H04W 72/0473; H04L 5/001
USPC .................................. 455/522, 69, 452.1, 509
See application file for complete search history.

(56) References Cited

U.S. PATENT DOCUMENTS

| | | | |
|---|---|---|---|
| 2013/0142113 A1* | 6/2013 | Fong | H04W 68/02 370/328 |
| 2014/0022994 A1 | 1/2014 | Pan et al. | |
| 2014/0171144 A1* | 6/2014 | Kim | H04W 52/367 455/522 |
| 2014/0219126 A1* | 8/2014 | Li | H04W 72/0413 370/252 |
| 2014/0226551 A1* | 8/2014 | Ouchi | H04W 52/40 370/311 |
| 2014/0348078 A1* | 11/2014 | Kim | H04W 72/0473 370/329 |
| 2014/0376471 A1* | 12/2014 | Nishio | H04W 52/367 370/329 |
| 2015/0110023 A1 | 4/2015 | Pan et al. | |
| 2015/0124673 A1* | 5/2015 | Ouchi | H04W 52/362 370/311 |
| 2015/0208361 A1 | 7/2015 | Kim et al. | |
| 2016/0157183 A1 | 6/2016 | Kim et al. | |
| 2016/0198414 A1* | 7/2016 | Yano | H04W 52/242 455/522 |
| 2017/0238287 A1* | 8/2017 | Kusashima | H04L 5/001 370/280 |
| 2018/0014257 A1 | 1/2018 | Ouchi et al. | |
| 2018/0070316 A1* | 3/2018 | Sun | H04W 52/245 |
| 2019/0313342 A1 | 10/2019 | Papasakellariou | |
| 2020/0068497 A1 | 2/2020 | Gong et al. | |

FOREIGN PATENT DOCUMENTS

| | | |
|---|---|---|
| CN | 102083189 A | 6/2011 |
| CN | 103024884 A | 4/2013 |
| CN | I03327594 A | 9/2013 |
| CN | 103843422 A | 6/2014 |
| CN | 103843423 A | 6/2014 |
| CN | 104363645 A | 2/2015 |
| JP | 2013118619 A | 6/2013 |

OTHER PUBLICATIONS

Huawei et al., "Discussion on UL SRS transmission power", 3GPP TSG RAN WG1 NR Ad Hoc Meeting, R1-1710459, Jun. 27-30, 2017, 4 Pages, Qingdao, China.

Huawei, et al., "UL Power control for Cross-link interference mitigation", 3GPP TSG RAN WG1 NR Ad Hoc Meeting, R1-1709983, Jun. 27-30, 2017, 6 Pages, Qingdao, China.

MCC Support, Final Report of 3GPP TSG RAN WG1 #89 v1.0.0, (Hangzhou, China, May 15-19, 2017), 3GPP TSG RAN WG1 Meeting #90, R1-1712031, Aug. 21-25, 2017, 165 Pages, Prague, Czech Rep.

"3rd Generation Partnership Project; Technical Specification Group Radio Access Network; NR; Medium Access Control (MAC) protocol specification (Release 15)", 3GPP TS 38.321 V0.0.3, May 2017, 20 Pages.

"3rd Generation Partnership Project; Technical Specification Group Radio Access Network; NR; Physical channels and modulation (Release 15)", 3GPP TS 38.211, V0.0.0, May 2017, 10 Pages.

"3rd Generation Partnership Project; Technical Specification Group Radio Access Network; NR; Radio Resource Control (RRC); Protocol specification (Release 15)", 3GPP TSs 38.331 M V0.0.3, May 2017, 20 Pages.

"3rd Generation Partnership Project; Technical Specification Group Radio Access Network; Evolved Universal Terrestrial Radio Access (E-UTRA); Multiplexing and channel coding (Release 14)", 3GPP TS 36.212 V14.2.0, Mar. 2017, 197 Pages.

CATT, "PUCCH Power Control and Priority in Power Scaling", 3GPP TSG RAN WG1 Meeting #89, R1-1707530, May 15-19, 2017, 7 Pages, Hangzhou, China.

Samsung, "Power Control for PUCCH", 3GPP TSG RAN WG1 Meeting #89, R1-1708069, May 15-19, 2017, 3 Pages, Hangzhou, China.

"3rd Generation Partnership Project; Technical Specification Group Radio Access Network; Evolved Universal Terrestrial Radio Access (E-UTRA); NB-IOT; Technical Report for BS and UE radio transmission and reception KRelease 13)", 3GPP TR 36.802 V13.0.0, Jun. 2016, 59 Pages.

Huawei et al., "Detailed considerations on UL power control design for NR", 3GPP TSG RAN WG1 Meeting #88, R1-1701688, Feb. 13-17, 2017, 4 Pages, Athens, Greece.

Huawei, et al., "Detailed considerations on UL power control design for NR", 3GPP TSG RAN WG1 Meeting #89, R1-1706930, May 15-19, 2017, 5 Pages, Hangzhou, China.

Interdigital Inc., "On Power Control Processes for Multi Beam Transmission in NR", 3GPP TSG RAN WG1 Meeting #89, R1-1708361, May 15-19, 2017, 4 Pages, Hangzhou, China.

Nokia, et al., "Power Control for MIMO", 3GPP TSG-RAN WG1 Meeting #86bis, R1-1610283, Oct. 10-14, 2016, 5 Pages, Lisbon, Portugal.

\* cited by examiner

METHODS AND SYSTEMS OF POWER CONTROL FOR UPLINK TRANSMISSION

This application is a continuation of PCT Application No. PCT/CN2018/091087, entitled "METHODS AND SYSTEMS OF POWER CONTROL FOR UPLINK TRANSMISSION," filed on Jun. 13, 2018, which claims the benefit of U.S. Provisional Application No. 62/521,259, entitled "METHODS AND SYSTEMS OF POWER CONTROL FOR UPLINK TRANSMISSION," filed on Jun. 16, 2017, which applications are hereby incorporated herein by reference in their entireties.

TECHNICAL FIELD

The present disclosure relates generally to a system and method user equipment power control, and, in particular embodiments, to a system and method for beam or RS relationship specific power control for uplink transmission.

BACKGROUND

In conventional cellular networks, each transmit/receive point (TRP) is associated with a coverage area or a conventional TRP-based cell and is assigned a conventional cell identifier (ID) to define the control channel and data channel so that simultaneous TRP to user equipment (UE) or UE to TRP communications can be supported for each conventional cell. The network may maintain the association between serving TP and the UE through assigned conventional cell ID until a handover is triggered.

As the demand on mobile broadband increases, conventional wireless networks are deployed more densely and heterogeneously with a greater number of TPs. Conventional cell ID assignment becomes more difficult and the occurrence rate of handovers increases as the UE moves between TPs. Further, the density of the conventional cells creates interference between neighboring conventional cells. Methods and systems for mitigating these drawbacks are desired, particularly in dense heterogeneous networks.

SUMMARY

Technical advantages are generally achieved by embodiments of this disclosure which describe systems and methods for power control for uplink transmission. An advantage of one or more embodiments of the present disclosure is providing RS relationship specific pathloss estimation and power control. Other advantages will be apparent to those of ordinary skill in the art upon reading the disclosure below.

In an embodiment, a method in a user equipment (UE) for reference signal (RS) relationship specific uplink (UL) transmission power control includes transmitting, by the UE, a first UL signal according to a first power control set including at least one of a first target power, a second target power, a DL reference signal (RS) for pathloss estimation, a pathloss compensation factor, and a transmit power command (TPC). The first power control set is determined according to a first RS relationship between one first RS and a first UL signal.

In an embodiment, a method in a user equipment (UE) for PUCCH resource specific power control includes transmitting, by the UE, a first PUCCH according to a first power control set including a first target power, a second target power, a DL reference signal (RS) for pathloss estimation, an offset for PUCCH format, and a transmit power command (TPC). The first power control set is determined according to a first PUCCH resource, the first PUCCH resource including at least one of first PUCCH format with specific symbol number, first numerology.

In an embodiment, a user equipment (UE) for uplink (UL) transmission power control, includes a non-transitory memory storage comprising instructions and one or more processors in communication with the non-transitory memory storage, wherein the one or more processors execute instructions according any of the disclosed embodiments or aspects.

In an embodiment, a non-transitory computer-readable medium storing computer instructions for uplink (UL) transmission power control, that when executed by one or more processors, cause the one or more processors to perform the method of any of the disclosed embodiments or aspects.

Optionally, in any of the preceding aspects, the method further includes transmitting, by the UE, a second UL signal according to a second power control set including at least one of another first target power, another second target power, another DL RS for pathloss estimation, another pathloss compensation factor, and another transmit power command (TPC). The second power control set is determined according to a second RS relationship between second RS and a second UL signal.

Optionally, in any of the preceding aspects, the first or second RS for RS relationship is one of a SS block, a CSI-RS, and a sounding reference signal (SRS). The UL signal is one of a physical UL shared channel (PUSCH), and physical UL control channel (PUCCH).

Optionally, in any of the preceding aspects, the method further includes receiving more than one RS configurations for RS relationship. Each RS configuration is associated with one specific RS relationship and identified with at least one of a respective DL RS type, a respective antenna port group (APG) index, a resource index, and a resource set index wherein an APG has at least one antenna port.

Optionally, in any of the preceding aspects, one first target power of the first power control set and one another first target power of the second power control set are the same and are configured with a broadcasting channel.

Optionally, in any of the preceding aspects, one second target power of the first power control set and one another second target power of the second power control set are separately configured with dedicated RRC signaling.

Optionally, in any of the preceding aspects, one PL compensation factor of the first power control set and one another PL compensation factor of the second power control set are separately configured with dedicated RRC signaling.

Optionally, in any of the preceding aspects, one DL RS for pathloss estimation of the first power control set and one another DL RS resource for pathloss estimation of the second power control set are separately configured with dedicated RRC signaling.

Optionally, in any of the preceding aspects, one TPC of the first power control set and one another TPC of the second power control set are separately configured with dedicated RRC signaling.

Optionally, in any of the preceding aspects, an RS relationship is indicated with at least one of DCI, RRC signaling, and MAC CE.

Optionally, in any of the preceding aspects, the SS block comprises at least one of a synchronization signal and a demodulation reference signal (DMRS) for a physical broadcast channel (PBCH).

Optionally, in any of the preceding aspects, the method further includes L3 filtering according to a first filter coefficient configured for pathloss estimation with an SS block.

Optionally, in any of the preceding aspects, the method further includes L3 filtering according to a second filter coefficient configured for pathloss estimation with a CSI-RS.

Optionally, in any of the preceding aspects, the first filter coefficient or the second filter coefficient is configured based on at least one of predefinition and RRC signaling.

Optionally, in any of the preceding aspects, the information associating the first power control set with the first RS relationship and information associating the second power control set with the second RS relationship is obtained by at least one of predefinition, broadcast signaling, or dedicated signaling from a network.

Optionally, in any of the preceding aspects, the method further includes transmitting, by the UE, a second PUCCH according to a second power control set including another first target power, another second target power, another DL reference signal (RS) for pathloss estimation, another offset for PUCCH format, and another transmit power command (TPC). The second power control set is determined according to a second PUCCH resource, the second PUCCH resource including at least one of second PUCCH format with specific symbol number, second numerology.

Optionally, in any of the preceding aspects, one first target power of a first power control set and another first target power of a second power control set are the same and are configured with a broadcasting channel.

Optionally, in any of the preceding aspects, one second target power of a first power control set and another second target power of a second power control set are separately configured with dedicated RRC signaling.

Optionally, in any of the preceding aspects, one DL RS of a first power control set and another DL RS resource of a second power control set are separately configured with dedicated RRC signaling.

Optionally, in any of the preceding aspects, one TPC of a first power control set and another TPC of a second power control set are separately configured with dedicated RRC signaling.

Optionally, in any of the preceding aspects, the method further includes providing information associating the first power control set with the first PUCCH resource and information associating the second power control set with the second PUCCH resource.

Optionally, in any of the preceding aspects, the method further includes configuring more than one PUCCH resource specific power control set. The method also includes configuring one or more numerology. The method also includes configuring one or more PUCCH format specific offset. The method also includes determining a specific total transmission power according to one PUCCH resource specific power control set.

Optionally, in any of the preceding aspects, another implementation of the aspect also includes obtaining, by the UE, a RS relationship between an AGP of an SRS resource and an AGP of a DMRS of a PUSCH. The RS relationship is determined according to an explicit association or the RS relationship is determined according to an implicit association derived from a common RS relationship associated with the APG of another RS. Generally, a RS relationship between an AGP of a DMRS of a PUSCH and another RS implies that a RS relationship between a PUSCH and another RS, and this implication can be extended to other UL channel.

BRIEF DESCRIPTION OF THE DRAWINGS

For a more complete understanding of the present disclosure, and the advantages thereof, reference is now made to the following description taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

It should be understood at the outset that although an illustrative implementation of one or more embodiments are provided below, the disclosed systems and methods may be implemented using any number of techniques, whether currently known or not. The disclosure should in no way be limited to the illustrative implementations, drawings, and techniques illustrated below, including the example configurations and implementations illustrated and described herein, but may be modified within the scope of the appended claims along with their full scope of equivalents.

5G New Radio (NR) is envisioned to support a number of features that enhance the user experience by providing for faster data transfer and supporting larger numbers of connected devices. Various agreements have been reached between the various stakeholders formulating the 5G standards. Agreement 36.802 proposes support for beam or beam pair link (BPL) specific pathloss (PL) for uplink (UL) power control (PC). Under the agreement, a number of downlink (DL) reference signals (RSs) can be used for PL calculation for UL PC. If the power offset between a secondary synchronization signal (SSS) and a demodulation reference signal (DMRS) for the physical broadcast channel (PBCH) is known by the user equipment (UE), both the secondary synchronization signal (SSS) and the DM-RS can be used for determining the PL for the PBCH of the synchronization signal (SS) block. If the power offset between the SSS and the DMRS for the PBCH is not known by the UE, then only the SSS of the SS block is used for PL determination.

In an aspect, the following DL RS can be used for PL calculation for UL PC:

If the power offset between SSS and DM-RS for PBCH is known by the UE, both SSS and DM-RS for PBCH of SS block are used;

If the power offset between SSS and DM-RS for PBCH is not known by the UE, only SSS of SS block is used;

CSI-RS; and

Optionally, the applicable case for above DL-RSs.

In an aspect, separate power control processes are supported for transmission of different channel/RS (i.e., PUSCH, PUCCH, SRS). The same gNB antenna port can be used for pathloss measurement for multiple processes. In an aspect, different gNB antenna ports can be used for pathloss measurement for each process. In an aspect, at least an UL transmission scheme without grant is supported for URLLC.

Regarding DL RS for mobility and beam management measurement, some agreements were reached as follows:

RAN1 assumes at least SSS is used for SS block RSRP;

Note that NR-PBCH DMRS can also be used for SS block RSRP if the UE knows the power offset of NR-PBCH DMRS and NR-SSS;

For CONNECTED mode RRM measurement for L3 mobility, CSI-RS can be used, in addition to IDLE mode RS.

Measurement Quantities for Beam

Support L1 RSRP and CSI Report (when CSI-RS is for CSI Acquisition)

Figure 1:
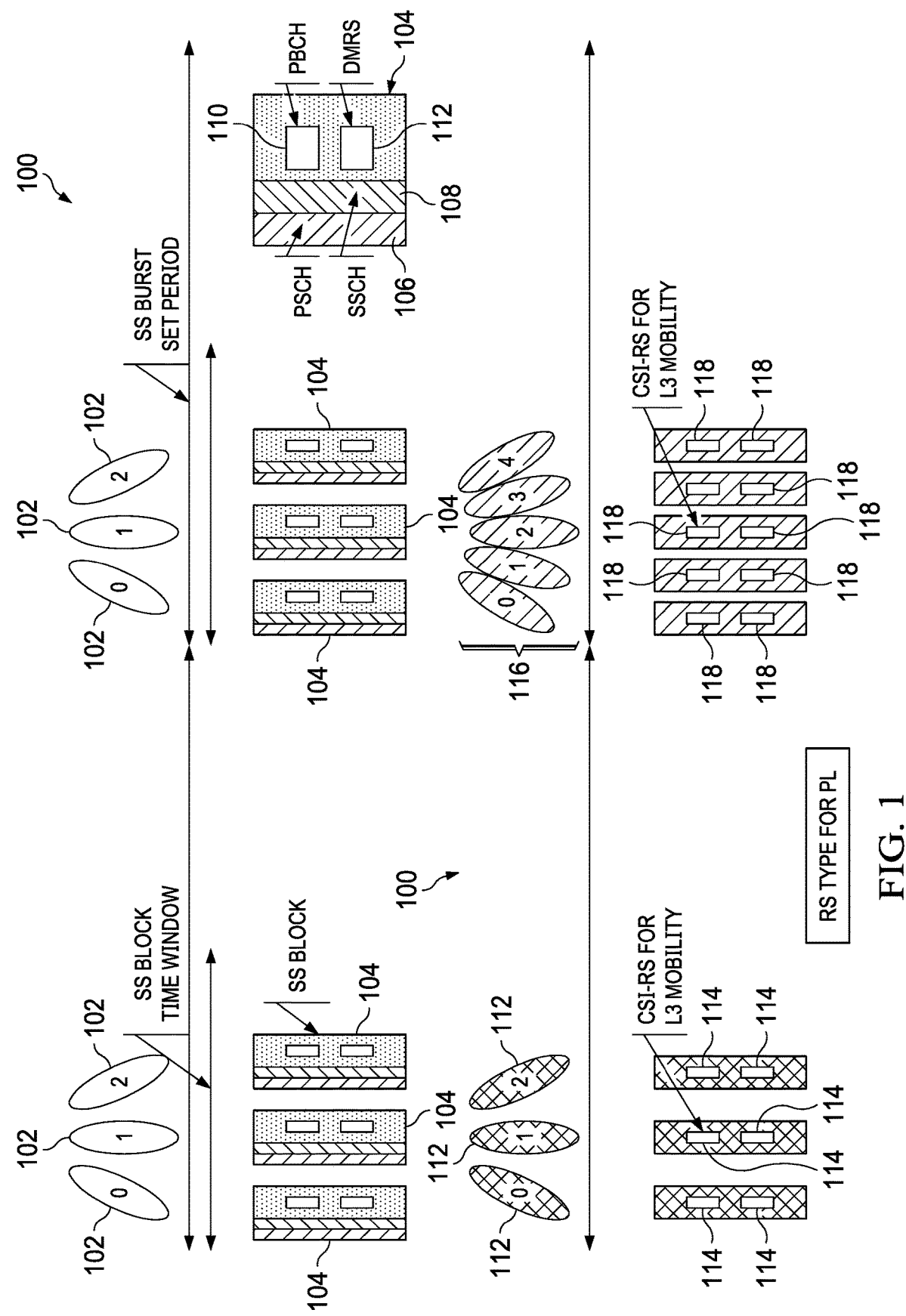
FIG. 1 is a diagram illustrating RS types that may be used for PL determination.

FIG. 1 is a diagram 100 illustrating RS types that may be used for PL determination. An SS block 104 may be transmitted in each beam 102. Each SS block includes a primary synchronization channel (PSCH) 106, a secondary synchronization channel (SSCH) 108, and a DMRS 112 for PBCH 110. A channel state information reference signal (CSI-RS) for layer 3 (L3) mobility 114 and a CSI-RS for beam management 118 may be transmitted by each beam 116.

Figure 2:
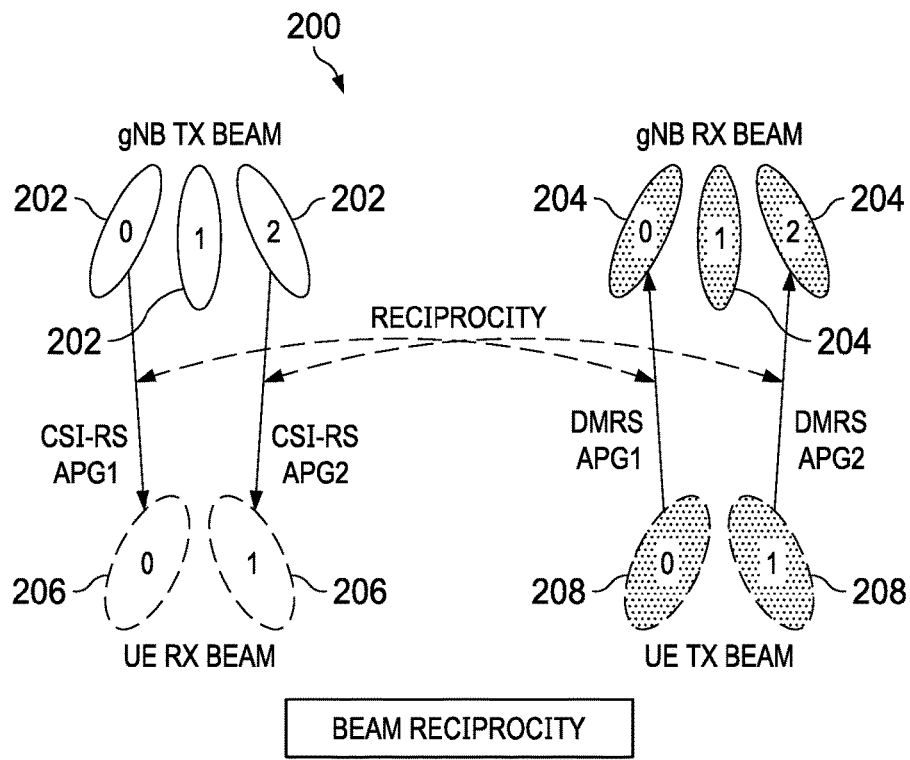
FIG. 2 is a diagram showing that beam reciprocity may be used to help estimate the beam or RS relationship specific PL.

FIG. 2 is a diagram 200 showing that beam reciprocity may be used to help estimate the RS relationship specific DL PL based on RS relationship specific DL PL. The diagram 200 shows three gNB transmit (Tx) beams 202, three gNBs receive (Rx) beams 204, two UE Rx beams 206, and two UE Tx beams 208.

An association between one or multiple occasions for SS block, a subset of random access channel (RACH) resources or a subset of preamble indices may be indicated to the UE by broadcast system information, be known to the UE, or may be provided by the UE through dedicated signaling. This association can be used for identifying the beam reciprocity at the gNB.

The determination of LTE PUCCH power control is provided by the following equation:

$$P_{PUCCH}(i) = \min\left\{\begin{array}{c} P_{CMAX,c}(i), \\ P_{0\_PUCCH} + PL_c + 10\log_{10}(M_{PUCCH,c}(i)) + \\ \Delta_{TF,c}(i) + \Delta_{F\_PUCCH}(F) + g(i) \end{array}\right\}$$

where $P_{0\_PUCCH}$, $PL_C$, $\Delta_{TF,c}(i)$, $\Delta_{F\_PUCCH}$ and $g(i)$ denote target power, pathloss and MCS (modulation and coding scheme) related compensation factor for serving cell C, transmission format compensation factor and closed-loop transmission power command (TPC) respectively.

In an embodiment, at least of one SS block, CSI-RS for mobility and CSI-RS for beam management may be used for PL estimation for both idle and connected UEs.

Disclosed herein are systems and methods for power control for uplink transmission. Multiple RSRP filtering levels for L3 or layer 1 (L1) are provided as well as techniques for addressing the different measurement qualities (e.g., different beam width, periodicity, etc.) when estimating pathloss. Additionally, systems and methods are described for compensating asymmetric DL/DL PL reciprocity issues and for TRP set decoupling between transmission and reception.

Disclosed herein are systems and methods for beam or RS relationship specific and common UL PC for SRS, PUSCH, and PUCCH. Additionally, systems and methods for configuring RS relationship specific PL estimation and for selecting associated specific PL for UL transmission RS relationship based on an open-loop or closed-loop mechanism are disclosed. Furthermore, systems and methods for RS relationship common SRS PC for beam management and UL tracking, RS relationship specific SRS PC for UL CSI measurement are disclosed. The disclosed SRS PC for beam management may be associated with configuration information including triggered, periodic, and semi-persistent. The disclosed RS relationship specific PL estimation may be performed with or without inter-channel/signal association, e.g., PUSCH, SRS, or PUCCH. Also disclosed herein are high level configurations for PUCCH such as numerology, format (e.g., long or short with different symbol number, even repetition, etc.), multiplexing with other channel (e.g., PUSCH, SRS, etc.).

In the present disclosure, QCL can refer to one or more of LTE Quasi-Co-Location (QCL) and spatial QCL defined for New Radio (NR) wherein the QCL information indicating a RS relationship between at least two different reference signals (RSs). For simplicity, A QCLed B implies QCL assumption is configured between A & B. RS relationship specific, beam specific and beam pair link (BPL) or QCL are used interchangeably. One SS burst has one or multiple SS blocks with different index within one time window.

In an embodiment, for UEs in an idle state, one or more PLs are estimated from one or more SS blocks within one SS burst based on configuration for beam reciprocity at the gNB. For a first example, one PL is estimated from one or more SS blocks within one SS burst by default. For a second example, based on the explicit indication for beam reciprocity assumption, one PL is estimated from one or more SS blocks within one SS burst if beam reciprocity is not assumed or multiple RS relationship specific PLs are estimated. Each RS relationship specific PL is estimated by one specific SS block within one SS burst if beam reciprocity is assumed and indication for beam reciprocity is configured by the broadcasting. For a third example, based on the implicit indication for beam reciprocity assumption, one PL is estimated from one or more SS blocks within one SS burst if beam reciprocity is not assumed or multiple RS relationship PLs are estimated wherein each RS relationship specific PL is estimated by one specific SS block within one SS burst if beam reciprocity is assumed and implicit beam reciprocity indication is associated with PRACH or preamble configuration enabling PRACH repetition transmission or not. In this example, PRACH or preamble configuration enabling PRACH repetition transmission means beam reciprocity is assumed, and otherwise beam reciprocity is not assumed. In an embodiment, PL is estimated using filtering for PL or L3-RSRP with at least one filtering coefficient. For a first example, one PL or L3-RSRP with one or multiple SS blocks is filtered with one first filtering coefficient (i.e. one-dimension filtering). For a second example, one PL or L3-RSRP with multiple SS blocks is filtered with one first filtering coefficient and one second filtering coefficient (i.e. two-dimension filtering). The first filtering coefficient is for filtering PL or L3-RSRP with one specific SS block and second filtering coefficient is for filtering PL or L3-RSRP with a different SS block. The first and second filtering coefficients can be configured with at least one of predefinition and broadcasting.

In an embodiment, for UEs that are in a connected state, one common PL or multiple RS relationship specific PLs are based on at least one of: a first type CSI-RS (L1-reference signal received power (RSRP)), an SS block (also another reference signal type), and a second type CSI-RS (L3-RSRP). One RS relationship specific PL is based on at least one of a specific first type CSI-RS, a specific SS block, and a specific second type CSI-RS. One PL can be estimated based on at least two different RS types which are configured with quasi-co-location (QCL) assumption between each other. In an embodiment, PL is estimated using filtering for PL or RSRP. For a first example, one PL or L1-RSRP with at least one RS type will be filtered with one third filtering coefficient. For a second example, one PL or L1-RSRP with multiple RS type will be filtered with one third filtering coefficient and one second filtering coefficient wherein one third filtering coefficient is for filtering PL or L1-RSRP with one specific RS type and second filtering coefficient is for filtering PL or L1-RSRP with different RS type. For a third example, one PL or L1-RSRP with multiple RS type will be filtered with multiple third filtering coefficients and one second filtering coefficient. Each specific third filtering coefficient is for filtering PL or L1-RSRP with one specific RS type and second filtering coefficient is for filtering PL or L1-RSRP with different RS type. For a fourth example, one PL or L3-RSRP with at least one RS type will be filtered with one first filtering coefficient. For a fifth example, one PL or L3-RSRP with multiple RS type will be filtered with one first filtering coefficient and one second filtering coefficient wherein one first filtering coefficient is for filtering PL or L3-RSRP with one specific RS type and second filtering coefficient is for filtering PL or L3-RSRP with different RS type. For a sixth example, one PL or L3-RSRP with multiple RS type will be filtered with multiple first filtering coefficients and one second filtering coefficient. Each specific first filtering coefficient is for filtering PL or L3-RSRP with one specific RS type and second filtering coefficient is for filtering PL or L3-RSRP with different RS type. For a seventh example, one PL with multiple RS type and L3-RSRP and L1-RSRP will be filtered with one first filtering coefficient and one third filtering coefficient and one second filtering coefficient wherein one first filtering coefficient is for filtering PL or L3-RSRP with first RS type and one third filtering coefficient is for filtering PL or L1-RSRP with second RS type and one second filtering coefficient is for filtering PL and L3-RSRP and L1-RSRP with different RS type. In this example, at least one of first filtering coefficient, second filtering coefficient and third filtering coefficient can be configured based on at least one of predefinition, broadcasting and RRC signaling.

In an embodiment, PL compensation for asymmetric UL/DL channels is provided. For a first example, one common PL or multiple RS relationship specific PLs are estimated based on configuration for beam reciprocity at the gNB. In this example, multiple RS relationship specific PLs are estimated based on multiple RS configurations and each RS relationship specific PL is based on one specific RS configuration if beam reciprocity is assumed, otherwise, one common PL is estimated with multiple RS relationship specific PLs. The configuration for beam reciprocity can be at least one of broadcasting and RRC signaling. For a second example, one or more PL compensation offsets are explicitly configured to the UE. In this example, one common PL offset can be configured for compensation on all RS relationship specific PLs, or multiple RS relationship specific PL offsets can be configured and each RS relationship specific PL offset is used for compensation specific RS relationship specific PL wherein the configuration can be at least one of broadcasting and RRC signaling. For a third example, one PL compensation is based on combining or filtering multiple RS relationship PLs and one second filter coefficient wherein filtering function can be at least one of maximum selection, minimum selection, average and one second filter coefficient is explicitly indicated to the UE by the RRC signaling.

Disclosed herein are detailed configurations for beam specific and common UL power control (PC) parameters for SRS, PUSCH, or PUCCH. The RS relationship between antenna groups of SRS, DMRS for PUSCH, or DMRS for PUCCH and DL RS (e.g. CSI-RS) are configured and indicated to the UE. Based on specific RS relationship, RS relationship specific power control parameters are used. With inter-channel association, PUSCH and SRS are supported for RS relationship specific operation. UL PC parameters for beam management SRS are based on RS relationship common PL and some parameters for PUSCH. RS relationship common PL denotes that one PL can be associated with multiple RS relationships. Generally, a RS relationship between an AGP of a DMRS of a PUSCH and another RS implies a RS relationship between a PUSCH and another RS, and this implication can be extended to other UL channels.

In an embodiment, the numerology, format (long or short with different symbol number, even repetition, etc.), multiplexing with other channels (e.g., PUSCH, SRS), $P_0$ or alpha can be different in the PUCCH configuration.

In an embodiment, a method in a user equipment (UE) for RS relationship specific pathloss (PL) estimation for uplink (UL) transmission power control includes receiving, by the UE, at least one of a first type channel state information reference signal (CSI-RS) for layer 1 (L1) reference signal (RSRP), a synchronization signal (SS) block, and a second type CSI-RS for layer 3 (L3) RSRP. The method also includes determining, by the UE, at least one RS relationship specific PL according to at least one of the first type channel state information reference signal (CSI-RS) for layer 1 (L1) reference signal receive power (RSRP), the SS block, and the second type CSI-RS for layer 3 (L3) RSRP.

In an embodiment, a method in a user equipment (UE) for resource specific power control parameter set includes receiving, by the UE, a UE resource specific power control parameter set. The UE resource is associated with at least one of a PUCCH format, numerology, transmission scheme, multiplexing indication, payload size, and waveform. The method also includes receiving, by the UE, multiple power control parameter sets each associated with different PUCCH resources. For PUCCH with a first resource, a first power control parameter set is used for UL PC. For PUCCH with a second resource, a second power control parameter set is used for UL PC.

Optionally, in any of the preceding aspects, another implementation of the aspect also includes receiving quasi-co-location factor (QCL) information, the QCL information indicating a RS relationship between at least two different reference signals (RSs) including first RS and second RS wherein first RS or second RS can be at least one of a SS block, a CSI-RS, a DMRS for physical DL shared channel (PDSCH), a DMRS for physical DL control channel (PDDCH), a sounding reference signal (SRS), a DMRS for physical UL shared channel (PUSCH), and a DMRS for physical UL control channel (PUCCH).

Optionally, in any of the preceding aspects, another implementation of the aspect provides that determining at least one RS relationship specific PL when the UE is in the idle state comprises estimating the PL according to a beam reciprocity configuration which can be predefinition, or explicitly indicated by the system information or implicitly derived by the physical random access channel (PRACH) resource or preamble index configuration for preamble repetition transmission.

Optionally, in any of the preceding aspects, another implementation of the aspect provides that estimating at least one RS relationship specific PL comprises estimating a plurality of RS relationship specific PL portions with a plurality of SS blocks for a first configuration wherein one RS relationship specific PL is according to an RSRP which is associated with a specific SS block index and estimating a common PL for a second configuration according to an RSRP which is associated with a plurality of SS blocks with different index and a plurality of SS blocks is associated with one SS block period.

Optionally, in any of the preceding aspects, another implementation of the aspect provides that first configuration can be based on at least one of explicit indication for beam reciprocity or implicitly derived by the PRACH resource or preamble index configuration for preamble repetition transmission and second configuration can be based on at least one of predefinition, explicit indication for no beam reciprocity or implicitly derived by the PRACH resource or preamble index configuration for no preamble repetition transmission.

Optionally, in any of the preceding aspects, another implementation of the aspect also includes L3 filtering according to a first filter coefficient for one common RSRP or one common PL or multiple RS relationship specific RSRP or multiple RS relationship specific PL estimation based on at least one SS block wherein first filter coefficient can be predefined or configured with broadcasting channel.

Optionally, in any of the preceding aspects, another implementation of the aspect also includes a second filter coefficient for filtering one common RSRP or one common PL estimation based on multiple RS relationship specific RSRP or multiple RS relationship specific PL wherein each RS relationship specific RSRP or PL is estimated based one specific SS block with first filter coefficient.

Optionally, in any of the preceding aspects, another implementation of the aspect also includes receiving system information for a PL offset compensation.

Optionally, in any of the preceding aspects, another implementation of the aspect provides that determining, by the UE, at least one PL when the UE is in the connected state comprises estimating at least one RS relationship specific PL measurements on at least one of at least one first type CSI-RS, at least one SS block, at least one second type CSI-RS, wherein the first type CSI-RS is configured for layer 1 (L1) RSRP or CSI measurement, wherein the second type CSI-RS is configured for layer 3 (L3) RSRP for mobility measurement, and wherein the SS block is for a layer 3 (L3) RSRP for mobility measurement.

Optionally, in any of the preceding aspects, another implementation of the aspect provides that one RS relationship specific PL is estimated according to one specific first type CSI-RS antenna port group (APG) or one specific SS block or one specific second type CSI-RS APG wherein one CSI-RS APG is associated with one CSI-RS resource or a CSI-RS resource set, and at least two different RS out of one first type CSI-RS, one SS block and one second type CSI-RS can be configured with QCL information.

Optionally, in any of the preceding aspects, another implementation of the aspect also includes L1 filtering one RS relationship specific RSRP or PL based on one third filter coefficient and at least one of one first type CSI-RS, one SS block and one second type CSI-RS wherein one third filter coefficient is configured based on at least one of predefinition, broadcasting signaling and RRC signaling.

Optionally, in any of the preceding aspects, another implementation of the aspect also includes filtering one RS relationship specific RSRP or PL based on one second filter coefficient and multiple RS specific L1 RSRP or PL and each RS specific L1 RSRP or PL is estimated according to a RS subset of one first type CSI-RS, one SS block and one second type CSI-RS and at least one third filter coefficient wherein third filter coefficient for filtering different RS specific L1 RSRP or PL can be same or different.

Optionally, in any of the preceding aspects, another implementation of the aspect also includes L3 filtering one RS relationship specific RSRP or PL based on one fourth filter coefficient and at least one of one SS block and one second type CSI-RS wherein one fourth filter coefficient is configured based on at least one of predefinition, broadcasting signaling and radio resource control (RRC) signaling.

Optionally, in any of the preceding aspects, another implementation of the aspect also includes filtering one RS relationship specific RSRP or PL based on one second filter coefficient and multiple RS specific L3 RSRP or PL and each RS specific L3 RSRP or PL is estimated according to a RS subset of one SS block and one second type CSI-RS and at least one fourth filter coefficient wherein fourth filter coefficient for filtering different RS specific L3 RSRP and PL can be the same or different.

Optionally, in any of the preceding aspects, another implementation of the aspect also includes filtering one RS relationship specific RSRP or PL based on one second filter coefficient and at least one L1 RSRP or PL associated with first RS subset and at least one L3 RSRP or PL associated with second RS subset wherein first RS subset and second subset are grouped form one first type CSI-RS, one SS block and one second type CSI-RS; one L1 RSRP or PL is filtered with at least one third filter coefficient or second filter coefficient; one L3 RSRP or PL is filtered with at least one fourth filter coefficient or second filter coefficient.

Optionally, in any of the preceding aspects, another implementation of the aspect provides that determining the RS relationship specific PL further comprising configuring one or multiple RS relationship specific PL offsets with UE-specific RRC signaling and determining the RS relationship specific PL as the sum of estimated RS relationship specific PL based on DL RS and one common or RS relationship specific PL offset.

Optionally, in any of the preceding aspects, another implementation of the aspect provides that determining the RS relationship specific PL further comprise configuring one or multiple RS relationship specific PL offsets with cell-specific broadcasting signaling and determining the RS relationship specific PL as the sum of estimated RS relationship specific PL based on DL RS and one common or RS relationship specific PL offset.

Optionally, in any of the preceding aspects, another implementation of the aspect provides that determining the RS relationship specific PL further comprise configuring beam reciprocity indication to determine one RS relationship specific PL or determine one common PL based on multiple RS relationship specific PL which are associated with the reception beam or second filter coefficient.

Optionally, in any of the preceding aspects, another implementation of the aspect provides that determining the RS relationship specific PL further comprise filtering one common PL based on multiple RS relationship specific PL or configured fifth filter coefficient wherein are configured with separate CSI-RS APG or QCL information and configuration for fifth filter coefficient can be at least one predefinition or RRC signaling and the filtering function on multiple RS relationship specific PL can be at least of averaging, maximum selection, minimum selection.

Optionally, in any of the preceding aspects, another implementation of the aspect also includes receiving, by the UE, at least two RS relationship specific power control parameter sets for one of SRS, PUSCH, PUCCH. Each specific RS relationship is associated with at least one specific RS relationship information.

Optionally, in any of the preceding aspects, another implementation of the aspect also includes receiving, by the UE, one or more RS relationship information. Each RS relationship information is associated with a respective RS configuration identified with a respective APG index, resource index, or resource set index.

Optionally, in any of the preceding aspects, another implementation of the aspect provides that, for SRS, PUSCH, or PUCCH with a first RS relationship or associated RS relationship information, a first power control parameter set is used for UL power control (PC).

Optionally, in any of the preceding aspects, another implementation of the aspect provides that, for SRS, PUSCH, or PUCCH with a second RS relationship or associated RS relationship information, a second control parameter set is used for UL PC.

Optionally, in any of the preceding aspects, another implementation of the aspect provides that each power control parameter set includes parameters for at least one of a first target power, a second target power, a PL, a PL compensation factor, and a TPC factor.

Optionally, in any of the preceding aspects, another implementation of the aspect also includes configuring the UE at least two RS relationship specific power control parameter sets for PUSCH, PUCCH, or SRS including first power control parameter set and second power control parameter set, wherein the first target power of is common and configured with a broadcasting channel, wherein the second target power is common and configured with a dedicated RRC signaling or comprises multiple second target powers each associated with a different RS relationship or RS relationship information, wherein the PL compensation factor is common or comprises multiple PL compensation factors each associated with a different RS relationship or RS relationship information, wherein closed-loop TPC (transmission power command) is common or comprises multiple TPC each associated with a different RS relationship or RS relationship information.

Optionally, in any of the preceding aspects, another implementation of the aspect provides that the UE is configure to support a specific PL for separate RS relationship or QCL information, wherein for PUSCH, PUCCH, or SRS with a first RS relationship or QCL information, the PL of the first power control parameter set is estimated according to a DL RS associated with the first RS relationship or QCL information and wherein for PUSCH, PUCCH, or SRS with a second RS relationship or QCL information, the PL of the second power control parameter set is estimated according to a DL RS associated with a second RS relationship or RS QCL information, wherein the RS relationship or QCL is dynamically indicated with at least one of DCI, RRC signaling and MAC CE.

Optionally, in any of the preceding aspects, another implementation of the aspect also includes receiving, by the UE, a RS relationship or QCL information between an AGP of an SRS and an AGP of a DMRS of a PUSCH according to an explicit association or according to an implicit association derived from a common RS relationship or QCL associating with the APG of another RS.

Optionally, in any of the preceding aspects, another implementation of the aspect provides that a power control parameter set for PUSCH is at least partially reused for a power control parameter set for SRS.

Optionally, in any of the preceding aspects, another implementation of the aspect also includes configuring the UE with one common power control parameter set for SRS transmission with at least one specific resource wherein the one specific resource is associated with at least one of a resource index and, RS relationship index and an APG RS relationship information with an APG of another RS; and determining a common power control parameter set according to a first reference power control parameter set for PUSCH and a second reference power control parameter set that is different from any of the PUSCH power control parameter sets.

Optionally, in any of the preceding aspects, another implementation of the aspect provides that the configuring the UE is triggered by a MAC CE, a RRC, and or a DCI.

Optionally, in any of the preceding aspects, another implementation of the aspect also includes configuring a plurality of RS relationships of APGs for PUSCH, PUCCH, or SRS and configuring a DL RS. The aspect also includes configuring one or more RS relationship specific PL parameters. The aspect also includes configuring an association between the PUSCH and the SRS. The aspect also includes configuring the SRS including at least one of a target power, a RS relationship association, alpha, and TPC. The aspect also includes determining a total transmit power according to the configurations and an associated specific PL.

Optionally, in any of the preceding aspects, another implementation of the aspect provides that the SS block comprises at least one of a synchronization signal and a demodulation reference signal (DMRS) for a physical broadcast channel (PBCH).

Optionally, in any of the preceding aspects, another implementation of the aspect also includes configuring the UE at least two resource specific power control parameter sets for PUCCH including first power control parameter set and second power control parameter set, wherein the first target power of is common or comprises multiple first target powers each associated with a specific resource based on a broadcasting channel, wherein the second target power is common or comprises multiple second target powers each associated with a different resource based on a dedicated RRC signaling, wherein the PL compensation factor is common or comprises PL compensation factors each associated with a different RS relationship based on a dedicated RRC signaling, wherein closed-loop TPC (transmission power command) is common or comprises multiple TPC each associated with a different resource based on a dedicated RRC signaling.

Optionally, in any of the preceding aspects, another implementation of the aspect also includes configuring a plurality of resource specific PC parameter sets; configuring specific PUCCH resource information; and determining a specific total transmission power according to the configurations and an associated specific PL.

Figure 3:
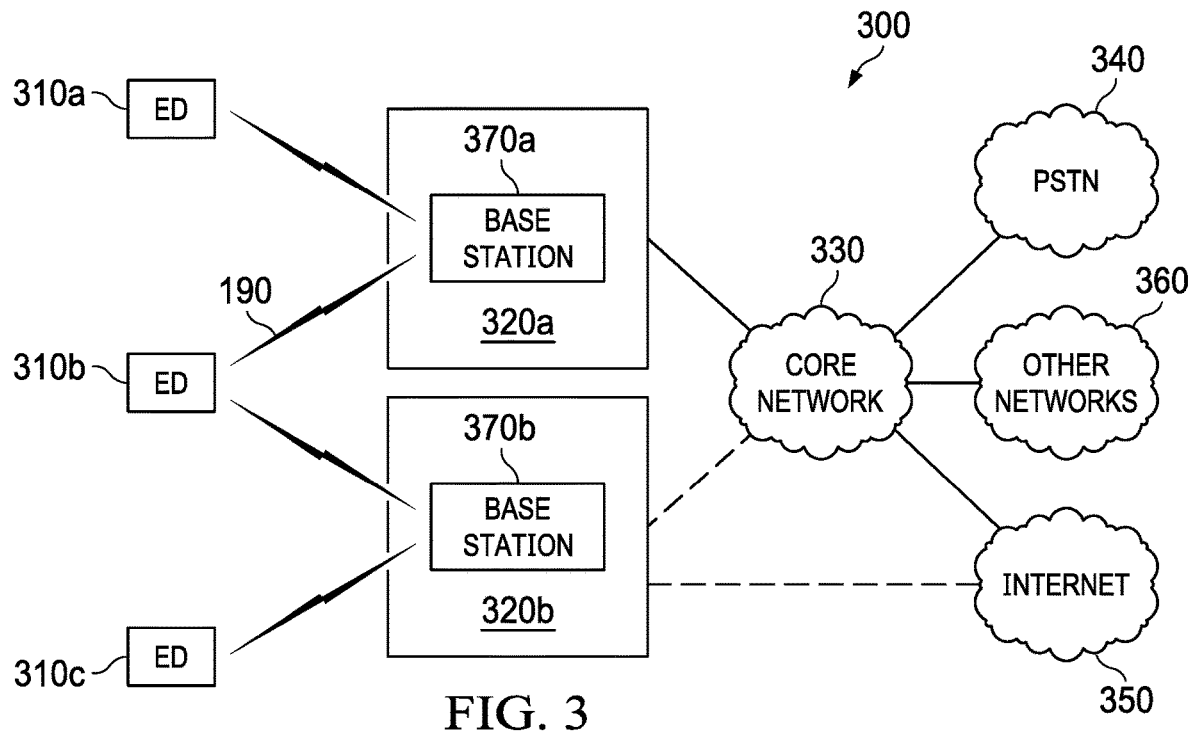
FIG. 3 is a network diagram of a communication system.

FIG. 3 illustrates an example communication system 300 in which embodiments of the present disclosure could be implemented. In general, the communication system 300 enables multiple wireless or wired elements to communicate data and other content. The purpose of the communication system 300 may be to provide content (voice, data, video, text) via broadcast, narrowcast, user device to user device, etc. The communication system 300 may operate by sharing resources such as bandwidth.

In this example, the communication system 300 includes electronic devices (ED) 310a-310c, radio access networks (RANs) 320a-320b, a core network 330, a public switched telephone network (PSTN) 340, the internet 350, and other networks 360. Although certain numbers of these components or elements are shown in FIG. 3, any reasonable number of these components or elements may be included in the communication system 300.

The EDs 310a-310c are configured to operate, communicate, or both, in the communication system 300. For example, the EDs 310a-310c are configured to transmit, receive, or both via wireless or wired communication channels. Each ED 310a-310c represents any suitable end user device for wireless operation and may include such devices (or may be referred to) as a user equipment/device (UE), wireless transmit/receive unit (WTRU), mobile station, fixed or mobile subscriber unit, cellular telephone, station (STA), machine type communication (MTC) device, personal digital assistant (PDA), smartphone, laptop, computer, tablet, wireless sensor, or consumer electronics device.

In FIG. 3, the RANs 320a-320b include base stations 370a-370b, respectively. Each base station 370a-370b is configured to wirelessly interface with one or more of the EDs 310a-310c to enable access to any other base station 370a-370b, the core network 330, the PSTN 340, the internet 350, or the other networks 360. For example, the base stations 370a-370b may include (or be) one or more of several well-known devices, such as a base transceiver station (BTS), a Node-B (NodeB), an evolved NodeB (eNodeB), a Home eNodeB, a gNodeB, a transmission point (TP), a site controller, an access point (AP), or a wireless router. Any ED 310a-310c may be alternatively or additionally configured to interface, access, or communicate with any other base station 370a-370b, the internet 350, the core network 330, the PSTN 340, the other networks 360, or any combination of the preceding. The communication system 300 may include RANs, such as RAN 320b, wherein the corresponding base station 370b accesses the core network 330 via the internet 350, as shown.

The EDs 310a-310c and base stations 370a-370b are examples of communication equipment that can be configured to implement some or all of the functionality or embodiments described herein. In the embodiment shown in FIG. 3, the base station 370a forms part of the RAN 320a, which may include other base stations, base station controller(s) (BSC), radio network controller(s) (RNC), relay nodes, elements, or devices. Any base station 370a, 370b may be a single element, as shown, or multiple elements, distributed in the corresponding RAN, or otherwise. Also, the base station 370b forms part of the RAN 320b, which may include other base stations, elements, or devices. Each base station 370a-370b transmits or receives wireless signals within a particular geographic region or area, sometimes referred to as a "cell" or "coverage area". A cell may be further divided into cell sectors, and a base station 370a-370b may, for example, employ multiple transceivers to provide service to multiple sectors. In some embodiments there may be established pico or femto cells where the radio access technology supports such. In some embodiments, multiple transceivers could be used for each cell, for example using multiple-input multiple-output (MIMO) technology. The number of RAN 320a-320b shown is an example only. Any number of RAN may be contemplated when devising the communication system 300.

The base stations 370a-370b communicate with one or more of the EDs 310a-310c over one or more air interfaces 390 using wireless communication links e g radio frequency (RF), microwave, infrared (IR), etc. The air interfaces 390 may utilize any suitable radio access technology. For example, the communication system 300 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 390.

A base station 370a-370b may implement Universal Mobile Telecommunication System (UMTS) Terrestrial Radio Access (UTRA) to establish an air interface 390 using wideband CDMA (WCDMA). In doing so, the base station 370a-370b may implement protocols such as HSPA, HSPA+ optionally including HSDPA, HSUPA or both. Alternatively, a base station 370a-370b may establish an air interface 390 with Evolved UTMS Terrestrial Radio Access (E-UTRA) using LTE, LTE-A, or LTE-B. It is contemplated that the communication system 300 may use multiple channel access functionality, including such schemes as described above. Other radio technologies for implementing air interfaces include IEEE 802.11, 802.15, 802.16, CDMA2000, CDMA2000 3x, CDMA2000 EV-DO, IS-2000, IS-95, IS-856, GSM, EDGE, and GERAN. Of course, other multiple access schemes and wireless protocols may be utilized.

The RANs 320a-320b are in communication with the core network 330 to provide the EDs 310a-310c with various services such as voice, data, and other services. The RANs 320a-320b or the core network 330 may be in direct or indirect communication with one or more other RANs (not shown), which may or may not be directly served by core network 330, and may or may not employ the same radio access technology as RAN 320a, RAN 320b or both. The core network 330 may also serve as a gateway access between (i) the RANs 320a-320b or EDs 310a-310c or both, and (ii) other networks (such as the PSTN 340, the internet 350, and the other networks 360). In addition, some or all of the EDs 310a-310c may include functionality for communicating with different wireless networks over different wireless links using different wireless technologies or protocols. Instead of wireless communication (or in addition thereto), the EDs may communicate via wired communication channels to a service provider or switch (not shown), and to the internet 350. PSTN 340 may include circuit switched telephone networks for providing plain old telephone service (POTS). Internet 350 may include a network of computers and subnets (intranets) or both, and incorporate protocols, such as IP, TCP, UDP. EDs 310a-310c may be multimode devices capable of operation according to multiple radio access technologies, and incorporate multiple transceivers necessary to support such.

It is contemplated that the communication system 100 as illustrated in FIG. 3 may support a New Radio (NR) cell, which also may be referred to as hyper cell. Each NR cell includes one or more TRPs using the same NR cell ID. The NR cell ID is a logical assignment to all physical TRPs of the NR cell and may be carried in a broadcast synchronization signal. The NR cell may be dynamically configured. The boundary of the NR cell may be flexible and the system dynamically adds or removes TRPs to from the NR cell.

In one embodiment, a NR cell may have one or more TRPs within the NR cell transmitting a UE-specific data channel, which serves a UE. The one or more TRPs associated with the UE specific data channel are also UE specific and are transparent to the UE. Multiple parallel data channels within a single NR cell may be supported, each data channel serving a different UE.

In another embodiment, a broadcast common control channel and a dedicated control channel may be supported. The broadcast common control channel may carry common system configuration information transmitted by all or partial TRPs sharing the same NR cell ID. Each UE can decode information from the broadcast common control channel in accordance with information tied to the NR cell ID. One or more TRPs within a NR cell may transmit a UE specific dedicated control channel, which serves a UE and carries UE-specific control information associated with the UE. Multiple parallel dedicated control channels within a single NR cell may be supported, each dedicated control channel serving a different UE. The demodulation of each dedicated control channel may be performed in accordance with a UE-specific reference signal (RS), the sequence or location of which are linked to the UE ID or other UE specific parameters.

In some embodiments, one or more of these channels, including the dedicated control channels and the data channels, may be generated in accordance with a UE specific parameter, such as a UE ID, or an NR cell ID. Further, the UE specific parameter or the NR cell ID can be used to differentiate transmissions of the data channels and control channels from different NR cells.

An ED, such as a UE, may access the communication system 300 through at least one of the TRP within a NR cell using a UE dedicated connection ID, which allows one or more physical TRPs associated with the NR cell to be transparent to the UE. The UE dedicated connection ID is an identifier that uniquely identifies the UE in the NR cell. For example, the UE dedicated connection ID may be identified by a sequence. In some implementations, the UE dedicated connection ID is assigned to the UE after an initial access. The UE dedicated connection ID, for example, may be linked to other sequences and randomizers which are used for PHY channel generation.

In some embodiments, the UE dedicated connection ID remains the same as long as the UE is communicating with a TRP within the NR cell. In some embodiments, the UE can keep original UE dedicated connection ID when crossing NR cell boundary. For example, the UE can only change its UE dedicated connection ID after receiving signaling from the network.

Figure 4A:
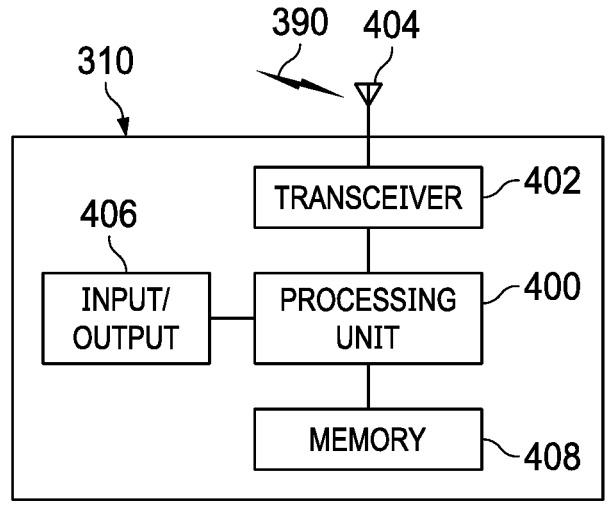
FIG. 4A is a block diagram of an example electronic device.
Figure 4B:
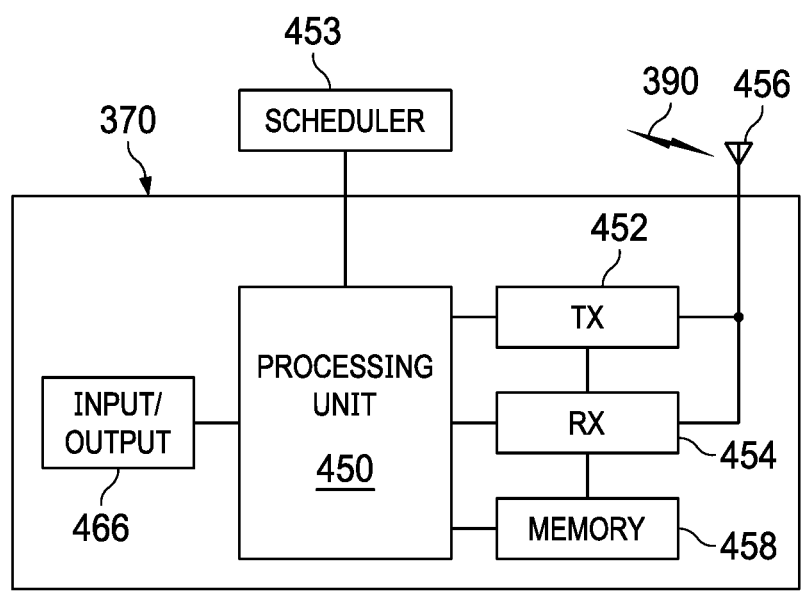
FIG. 4B is a block diagram of an example electronic device.

FIGS. 4A and 4B illustrate example devices that may implement the methods and teachings according to this disclosure. In particular, FIG. 4A illustrates an example ED 310, and FIG. 4B illustrates an example base station 370. These components could be used in the communication system 300 or in any other suitable system.

As shown in FIG. 4A, the ED 310 includes at least one processing unit 400. The processing unit 400 implements various processing operations of the ED 310. For example, the processing unit 400 could perform signal coding, data processing, power control, input/output processing, or any other functionality enabling the ED 310 to operate in the communication system 300. The processing unit 400 may also be configured to implement some or all of the functionality or embodiments described in more detail above. Each processing unit 400 includes any suitable processing or computing device configured to perform one or more operations. Each processing unit 400 could, for example, include a microprocessor, microcontroller, digital signal processor, field programmable gate array, or application specific integrated circuit.

The ED 310 also includes at least one transceiver 402. The transceiver 402 is configured to modulate data or other content for transmission by at least one antenna or Network Interface Controller (NIC) 404. The transceiver 402 is also configured to demodulate data or other content received by the at least one antenna 404. Each transceiver 402 includes any suitable structure for generating signals for wireless or wired transmission or processing signals received wirelessly or by wire. Each antenna 404 includes any suitable structure for transmitting or receiving wireless or wired signals. One or multiple transceivers 402 could be used in the ED 310. One or multiple antennas 404 could be used in the ED 310. Although shown as a single functional unit, a transceiver 402 could also be implemented using at least one transmitter and at least one separate receiver.

The ED 310 further includes one or more input/output devices 406 or interfaces (such as a wired interface to the internet 350). The input/output devices 406 permit interaction with a user or other devices in the network. Each input/output device 406 includes any suitable structure for providing information to or receiving information from a user, such as a speaker, microphone, keypad, keyboard, display, or touch screen, including network interface communications.

In addition, the ED 310 includes at least one memory 408. The memory 408 stores instructions and data used, generated, or collected by the ED 310. For example, the memory 408 could store software instructions or modules configured to implement some or all of the functionality or embodiments described above and that are executed by the processing unit(s) 400. Each memory 408 includes any suitable volatile or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 4B, the base station 370 includes at least one processing unit 450, at least one transmitter 452, at least one receiver 454, one or more antennas 456, at least one memory 458, and one or more input/output devices or interfaces 466. A transceiver, not shown, may be used instead of the transmitter 452 and receiver 454. A scheduler 453 may be coupled to the processing unit 450. The scheduler 453 may be included within or operated separately from the base station 370. The processing unit 450 implements various processing operations of the base station 370, such as signal coding, data processing, power control, input/output processing, or any other functionality. The processing unit 450 can also be configured to implement some or all of the functionality or embodiments described in more detail above. Each processing unit 450 includes any suitable processing or computing device configured to perform one or more operations. Each processing unit 450 could, for example, include a microprocessor, microcontroller, digital signal processor, field programmable gate array, or application specific integrated circuit.

Each transmitter 452 includes any suitable structure for generating signals for wireless or wired transmission to one or more EDs or other devices. Each receiver 454 includes any suitable structure for processing signals received wirelessly or by wire from one or more EDs or other devices. Although shown as separate components, at least one transmitter 452 and at least one receiver 454 could be combined into a transceiver. Each antenna 456 includes any suitable structure for transmitting or receiving wireless or wired signals. Although a common antenna 456 is shown here as being coupled to both the transmitter 452 and the receiver 454, one or more antennas 456 could be coupled to the transmitter(s) 452, and one or more separate antennas 456 could be coupled to the receiver(s) 454. Each memory 458 includes any suitable volatile or non-volatile storage and retrieval device(s) such as those described above in connection to the ED 310. The memory 458 stores instructions and data used, generated, or collected by the base station 370. For example, the memory 458 could store software instructions or modules configured to implement some or all of the functionality or embodiments described above and that are executed by the processing unit(s) 450.

Each input/output device 466 permits interaction with a user or other devices in the network. Each input/output device 466 includes any suitable structure for providing information to or receiving/providing information from a user, including network interface communications.

Frame structures have been proposed that are flexible in terms of the use of differing numerologies. A numerology is defined as the set of physical layer parameters of the air interface that are used to communicate a particular signal. A numerology is described in terms of at least subcarrier spacing and OFDM symbol duration, and may also be defined by other parameters such as fast Fourier transform (FFT)/inverse FFT (IFFT) length, transmission time slot length, and cyclic prefix (CP) length or duration. In some implementations, the definition of the numerology may also include which one of several candidate waveforms is used to communicate the signal. Possible waveform candidates may include, but are not limited to, one or more orthogonal or non-orthogonal waveforms selected from the following: Orthogonal Frequency Division Multiplexing (OFDM), Filtered OFDM (f-OFDM), Filter Bank Multicarrier (FBMC), Universal Filtered Multicarrier (UFMC), Generalized Frequency Division Multiplexing (GFDM), Single Carrier Frequency Division Multiple Access (SC-FDMA), Low Density Signature Multicarrier Code Division Multiple Access (LDS-MC-CDMA), Wavelet Packet Modulation (WPM), Faster Than Nyquist (FTN) Waveform, low Peak to Average Power Ratio Waveform (low PAPR WF), Pattern Division Multiple Access (PDMA), Lattice Partition Multiple Access (LPMA), Resource Spread Multiple Access (RSMA), and Sparse Code Multiple Access (SCMA).

These numerologies may be scalable in the sense that subcarrier spacings of different numerologies are multiples of each other, and time slot lengths of different numerologies are also multiples of each other. Such a scalable configuration across multiple numerologies provides implementation benefits, for example scalable total OFDM symbol duration in a time division duplex (TDD) context.

Table 1 below shows the parameters associated with some example numerologies, in the four columns under "Frame structure". Frames can be configured using one or a combination of the four scalable numerologies. For comparison purposes, in the right hand column of the table, the conventional fixed LTE numerology is shown. The first column is for a numerology with 60 kHz subcarrier spacing, which also has the shortest OFDM symbol duration because OFDM symbol duration varies inversely with subcarrier spacing. This may be suitable for ultra-low latency communications, such as Vehicle-to-Any (V2X) communications. The second column is for a numerology with 30 kHz subcarrier spacing. The third column is for a numerology with 15 kHz subcarrier spacing. This numerology has the same configuration as in LTE, except there are only 7 symbols in a time slot. This may be suitable for broadband services. The fourth column is for a numerology with 7.5 kHz spacing, which also has the longest OFDM symbol duration among the four numerologies. This may be useful for coverage enhancement and broadcasting. Additional uses for these numerologies will be or become apparent to persons of ordinary skill in the art. Of the four numerologies listed, those with 30 kHz and 60 kHz subcarrier spacings are more robust to Doppler spreading (fast moving conditions), because of the wider subcarrier spacing. It is further contemplated that different numerologies may use different values for other physical layer parameters, such as the same subcarrier spacing and different cyclic prefix lengths.

It is further contemplated that other subcarrier spacings may be used, such as higher or lower subcarrier spacings. As illustrated in the example above, the subcarrier spacing of each numerology (7.5 kHz, 15 kHz, 30 kHz, 60 kHz) can be a factor of $2^n$ times the smallest subcarrier spacing, where n is an integer. Larger subcarrier spacings that are also related by a factor of $2^n$, such as 120 kHz, may also or alternatively be used. Smaller subcarrier spacings that are also related by a factor of $2^n$, such as 3.75 kHz, may also or alternatively be used. The symbol durations of the numerologies may also be related by a factor of $2^n$. Two or more numerologies that are related in this way are sometimes referred to as scalable numerologies.

In other examples, a more limited scalability may be implemented, in which two or more numerologies all have subcarrier spacings that are integer multiples of the smallest subcarrier spacing, without necessarily being related by a factor of $2^n$. Examples include 15 kHz, 30 kHz, 45 kHz, 60 kHz, 120 kHz subcarrier spacings.

In still other examples, non-scalable subcarrier spacings may be used, which are not all integer multiples of the smallest subcarrier spacing, such as 15 kHz, 20 kHz, 30 kHz, 60 kHz.

In Table 1, each numerology uses a first cyclic prefix length for a first number of OFDM symbols, and a second cyclic prefix length for a second number of OFDM symbols. For example, in the first column under "Frame structure", the time slot includes 3 symbols with a cyclic prefix length of 1.04 μs followed by 4 symbols with a cyclic prefix length of 1.3 μs.

TABLE 2

Example numerology with different CP lengths

| Sub-carrier spacing (kHz) | 15 | 30 | 30 | 60 | 60 | 60 |
|---|---|---|---|---|---|---|
| Useful duration $T_u$ (μs) | 66.67 | 33.33 | 33.33 | 16.67 | 16.67 | 16.67 |
| CP length (μs) (1) | 5.2 | 5.73 | 2.6 | 2.86 | 1.3 | 3.65 |
| CP length (μs) (6 or 12) | 4.7 | 5.08 | 2.34 | 2.54 | 1.17 | 3.13 |
| # of symbols per TTI | 7 (1, 6) | 13 (1, 12) | 7 (1, 6) | 13 (1, 12) | 7 (1, 6) | 25 (10, 15) |
| TTI (ms) | 0.5 | 0.5 | 0.25 | 0.25 | 0.125 | 0.5 |
| CP overhead | 6.70% | 13.30% | 6.70% | 13.30% | 6.70% | 16.67% |

It should be understood that the specific numerologies of the examples of Tables 1 and 2 are for illustration purposes, and that a flexible frame structure combining other numerologies can alternatively be employed.

OFDM-based signals can be employed to transmit a signal in which multiple numerologies coexist simultaneously. More specifically, multiple sub-band OFDM signals can be generated in parallel, each within a different sub-band, and each sub-band having a different subcarrier spacing (and more generally with a different numerology). The multiple sub-band signals are combined into a single signal for transmission, for example for downlink transmissions. Alternatively, the multiple sub-band signals may be transmitted from separate transmitters, for example for uplink transmissions from multiple electronic devices (EDs), which may be user equipment (UEs). In a specific example, filtered OFDM (f-OFDM) can be employed by using filtering to

TABLE 1

Example set of Numerologies

| Parameters | Frame structure | | | | Baseline (LTE) |
|---|---|---|---|---|---|
| time slot Length | 0.125 ms | 0.25 ms | 0.5 ms | 1 ms | TTI = 1 ms |
| Subcarrier spacing | 60 kHz | 30 kHz | 15 kHz | 7.5 kHz | 15 kHz |
| FFT size | 512 | 1024 | 2048 | 4096 | 2048 |
| Symbol duration | 16.67 μs | 33.33 μs | 66.67 μs | 133.33 μs | 66.67 μs |
| #symbols in each time slot | 7 (3, 4) | 7 (3, 4) | 7 (3, 4) | 7 (3, 4) | 14 (2, 12) |
| CP length | 1.04 μs, 1.30 μs (32, 40 point) | 2.08 μs, 2.60 μs (64, 80 point) | 4.17 μs, 5.21 μs (128, 160 point) | 8.33 μs, 10.42 μs (256, 320 point) | 5.2 μs, 4.7 μs (160, 144 point) |
| CP overhead | 6.67% | 6.67% | 6.67% | 6.67% | 6.67% |
| BW (MHz) | 20 | 20 | 20 | 20 | 20 |

In Table 2, an example set of numerologies is shown, in which different cyclic prefix lengths can be used in different numerologies having the same subcarrier spacing.

shape the frequency spectrum of each sub-band OFDM signal, thereby producing a frequency localized waveform, and then combining the sub-band OFDM signals for transmission. f-OFDM lowers out-of-band emission and improves transmission, and addresses the non-orthogonality introduced as a result of the use of different subcarrier spacings. Alternatively, a different approach can be used to achieve a frequency localized waveform, such as windowed OFDM (W-OFDM).

The use of different numerologies can allow the coexistence of a diverse set of use cases having a wide range quality of service (QoS) requirements, such as different levels of latency or reliability tolerance, as well as different bandwidth or signaling overhead requirements. In one example, the base station can signal to the ED an index representing a selected numerology, or a single parameter (e.g., subcarrier spacing) of the selected numerology. The signaling can be done in a dynamic or a semi-static manner, for example in a control channel such as the physical downlink control channel (PDCCH) or in downlink control information (DCI). Based on this signaling, the ED may determine the parameters of the selected numerology from other information, such as a look-up table of candidate numerologies stored in memory.

Figure 5:
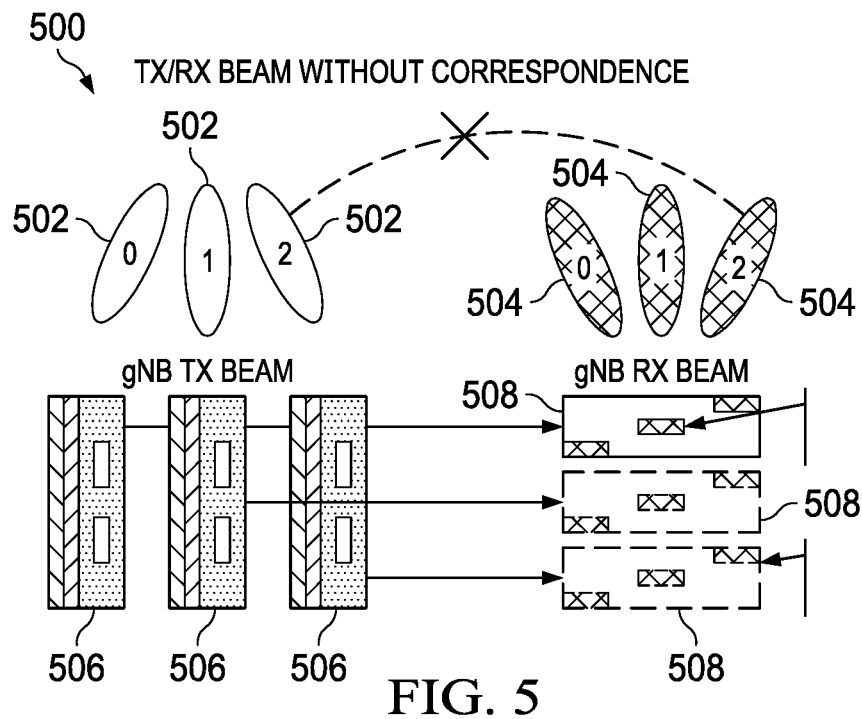
FIG. 5 is a diagram illustrating transmission (Tx) and reception (Rx) beams without correspondence.

FIG. 5 is a diagram 500 illustrating transmission (Tx) beams 502 and reception (Rx) beams 504 without correspondence at the gNB.

Figure 6:
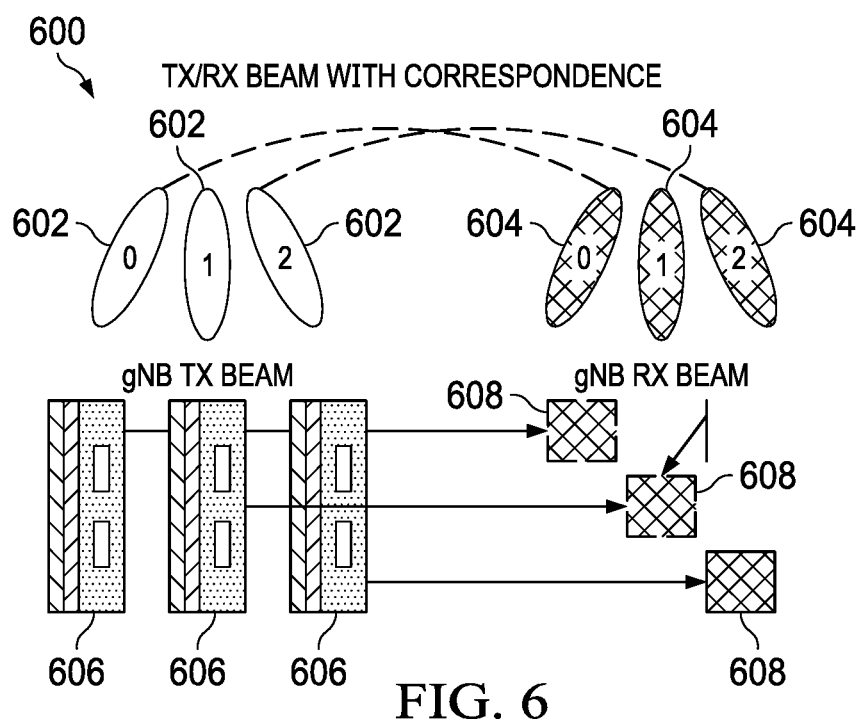
FIG. 6 is a diagram illustrating Tx and Rx beams with correspondence.

FIG. 6 is a diagram 600 illustrating Tx beams 602 and Rx beams 604 with correspondence at gNB. When Tx beams 602 and Rx beams 604 have correspondence (i.e. reciprocity), PRACH resource or preamble index configuration does not support repetition transmission for the preamble.

In an embodiment, the PL is estimated according to the beam correspondence configuration. This configuration can be at least one of: 1) implicitly with or without PRACH transmission repetition using specific PRACH resources or preamble index implying whether or not to assist the Rx beam sweeping at the gNB; or 2) explicitly with or without beam correspondence at the gNB configuration. For the first configuration, the BSP specific PL estimation for UL transmission which has the association with the specific SS block index (idx) is derived from the RSRP which is only associated with a specific SS block idx. The idx is [0, L−1] and L is the maximum number of SS blocks within one SS burst. This first configuration corresponds to a RS relationship specific PL and implies that beam correspondence is assumed at gNB. For the second configuration, the PL estimation is derived from the RSRP which is associated with all SS block(s) which are associated with different SS block index (idx) within one SS burst. This second configuration is for cell specific PL and implies that beam correspondence is not assumed at gNB. Other factors may also be used as discussed below.

The PL for Msg3 (i.e. PUSCH transmission during RACH procedure) can be the same as the PL for Msg1 (i.e. Preamble) or the PL for Msg3 can be indicated with the RS relationship association between the antenna port group (APG) of DMRS for PUSCH with a specific SS block with specific index (idx).

In an embodiment, the PL estimation may be at least one of 1) a RS relationship specific PL based on SS block (SSB) with specific index (SSBidx) or 2) a common PL based on multiple SS blocks with different index within one SS burst. This method of PL estimation also includes at least one of one-dimension (i.e. one filter coefficient) L3 filtering with a first filter coefficient and two-dimension filtering (i.e. at least two filter coefficients) with a first and second filter coefficient. With one-dimension L3 filtering, one reference transmission power and one composite and filtered RSRP from at least one SS block (synchronization or DMRS of the PBCH) is combined and filtered with a first filter coefficient. For a first example, one or multiple RS relationship specific PL or L3-RSRP with one or multiple specific SS block with specific index (idx) is filtered with one first filtering coefficient (i.e. one-dimension filtering) and one RS relationship specific PL or L3-RSRP with one specific SS block with specific index (idx) is filtered with one first filtering coefficient. For a second example, one common PL or L3-RSRP with multiple SS blocks with different index (idx) is filtered with one first filtering coefficient.

With two dimensional filtering, separate RS relationship specific PLs or L3-RSRPs can be estimated with first filter coefficient. Each PL or L3-RSRP is associated with a specific SS block (synchronization or DMRS of the PBCH) with specific index (idx). Filtering factor with a second filter coefficient is then performed. One composite PL is filtered or averaged from multiple RS relationship specific PLs with the second filter coefficient. For this embodiment, first filter coefficient or second filter coefficient can be configured with at least one of predefinition and broadcasting.

Figure 7:
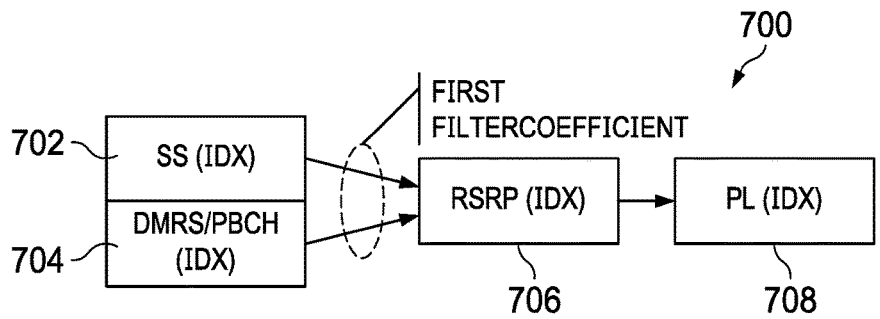
FIG. 7 is a diagram illustrating an embodiment of a method of one dimensional L3 filtering for PL estimation based on SS Block.

FIG. 7 is a diagram illustrating an embodiment of a method 700 of one dimensional L3 filtering for PL estimation. FIG. 7 is an example of RS relationship (i.e. SS block) specific PL estimation using one dimensional L3 filtering with first filtering coefficient. In this embodiment, filtering with a first filter coefficient is performed on one SS block to produce a RSRP(idx) 706 or a PL(idx) 708. The SS block includes SS(idx) 702 and DMRS/PBCH (idx) 704.

Figure 8:
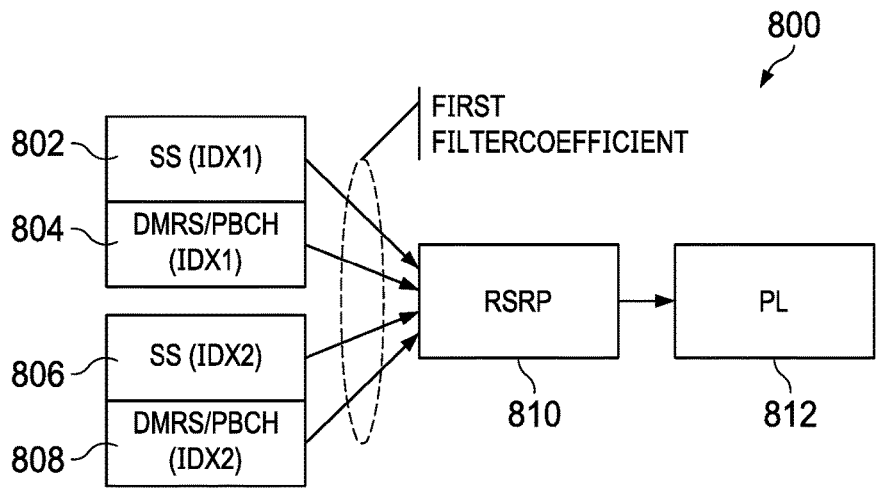
FIG. 8 is a diagram illustrating another embodiment of a method of one dimensional filtering for PL estimation.

FIG. 8 is a diagram illustrating another embodiment of a method 800 of one dimensional filtering for PL estimation. In the embodiment depicted in FIG. 8, filtering is performed on two SS blocks with two different idx (idx1 and idx2) for one common PL 812. The first SS block includes SS 802 and DMRS/PBCH 804 and the second SS block includes SS 806 and DMRS/PBCH 808.

Figure 9:
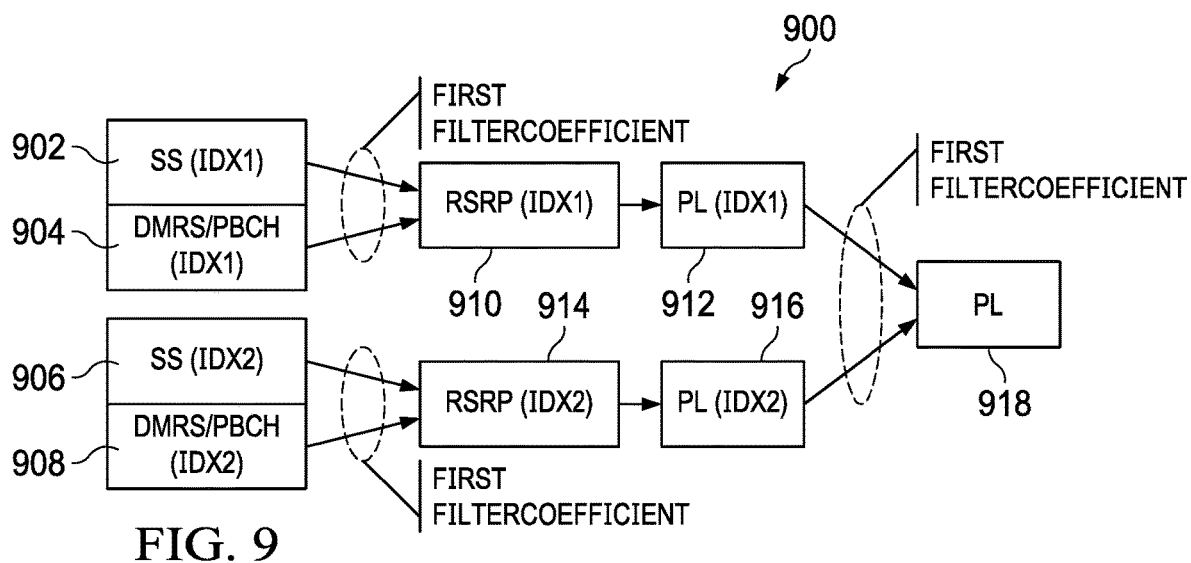
FIG. 9 is a diagram illustrating an embodiment of a method for two dimensional filtering.

FIG. 9 is a diagram illustrating an embodiment of a method 900 for two dimensional filtering where in two RS relationship specific PLs 912, 916 or L3-RSRPs 910, 914 are estimated with separate SS blocks (a first SS block with SS(idx1) 902 and DMRS/PBCH(idx1) 904 and a second SS block with SS(idx2) 906 and DMRS/PBCH(idx2) 908), with idx1, idx2, and one first filter coefficient. One common PL 918 is estimated with two RS relationship specific PLs 912, 916 or L3-RSRPs 910, 914 and one second filter coefficient.

Figure 10:
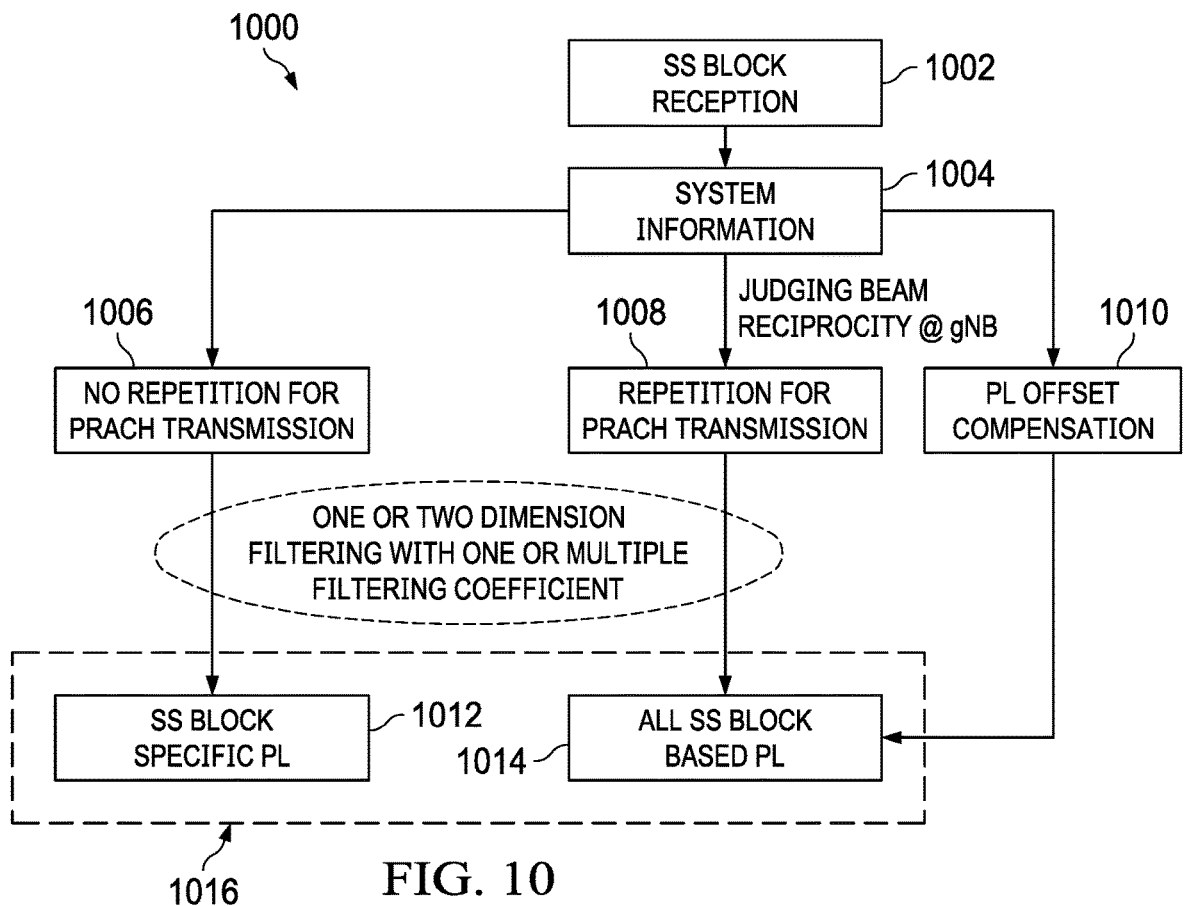
FIG. 10 is a flowchart of an embodiment of a method for DL PL estimation for a UE in an idle mode.

FIG. 10 is a flowchart of an embodiment of a method 1000 for DL PL estimation based on at least one SS block or indicated PL compensation offset for a UE in an idle mode. First, at block 1002, the UE receives an at least one SS block. Next, at block 1004, the UE obtains system information and, at block 1010, determines a PL offset compensation. At block 1008, for repetition for PRACH transmission, the UE determines, at block 1014, a common PL (all SS block based) using one or two-dimension filtering with one or multiple filtering coefficients and based on the PL compensation offset. At block 1006, for no repetition for PRACH transmission, the UE determines, at block 1012, RS relationship (i.e. SS block) specific PL according to one dimension filtering with one filtering coefficient or PL compensation offset according to the system information. The method 1000 executes either block 1006 or block 1008, but not both. Block 1010 is optional and can be executed with either block 1006 or block 1008.

In an embodiment for estimating DL PL for a UE in a connected state, the UE is configured to estimate a plurality of RS relationship specific PL measurements on at least one of a first type CSI-RS, a SS block and a second type CSI-RS. The first type CSI-RS is configured for L1 RSRP or CSI measurement. The second type CSI-RS is configured to L3 RSRP for mobility measurement. The SS block is also predefined for L3 RSRP for mobility measurement. The configuration for PL estimation can be based on at least one of predefinition, broadcasting and dynamic control indication (DCI), medium access control (MAC) control element (CE), and radio resource control (RRC) signaling. In addition to first type CSI-RS for one PL, the SS block or the second CSI-RS can be configured for PL estimation together with first CSI-RS based on the RS relationship configuration between the APG of the first CSI-RS, the SS block, or APG of the second CSI-RS. Thus, in an embodiment, with the QCL, the PL estimation can be based on at least two out of the first type CSI-RS, the SS block, and the second type CSI-RS. In an embodiment, without QCL, the PL estimation is based only on the first CSI-RS. Each L1-RSRP or PL measurement is associated with at least one first type CSI-RS APG, or one QCLed SS block, or at least one QCLed second type CSI-RS APG. One APG has at least one antenna port with the QCL assumption. At least one CSI-RS APG can be associated with one or multiple CSI-RS resource(s) or resource set(s).

Figure 11:
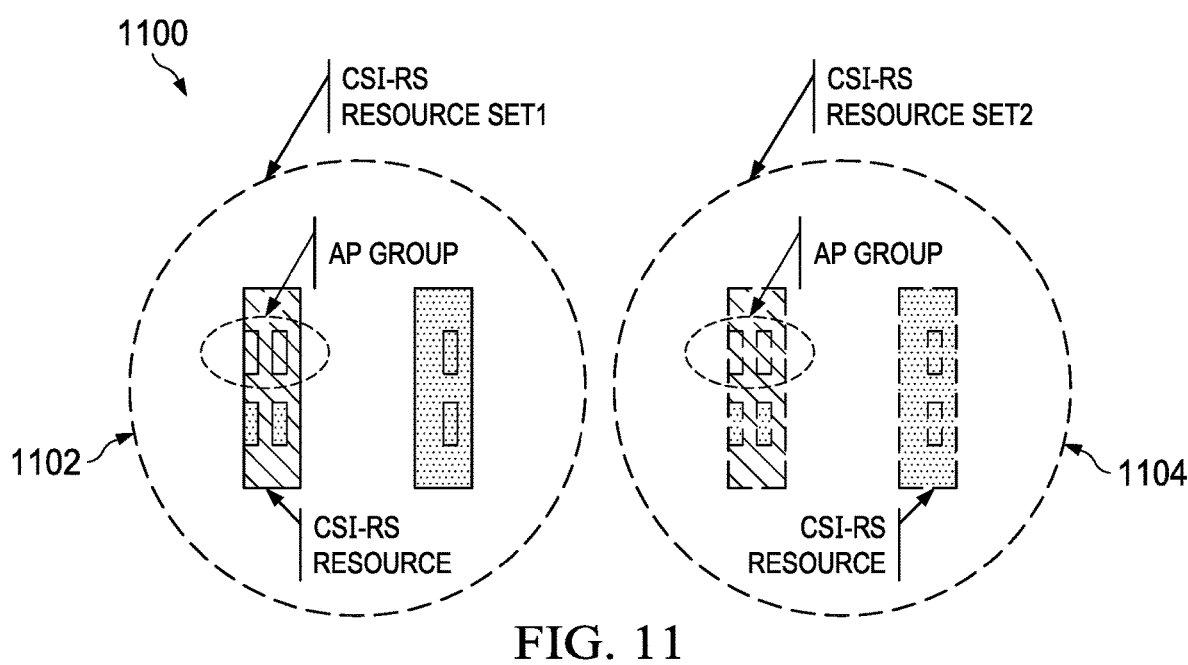
FIG. 11 is a diagram illustrating an embodiment of APGs with a first APG having a first CSI-RS resource set and a second APG having a second CSI-RS resource set.

FIG. 11 is a diagram 1100 illustrating an embodiment of AP groups (APGs) with a first APG 1102 having a first CSI-RS resource set and a second APG 1104 having a second CSI-RS resource set.

Figure 12:
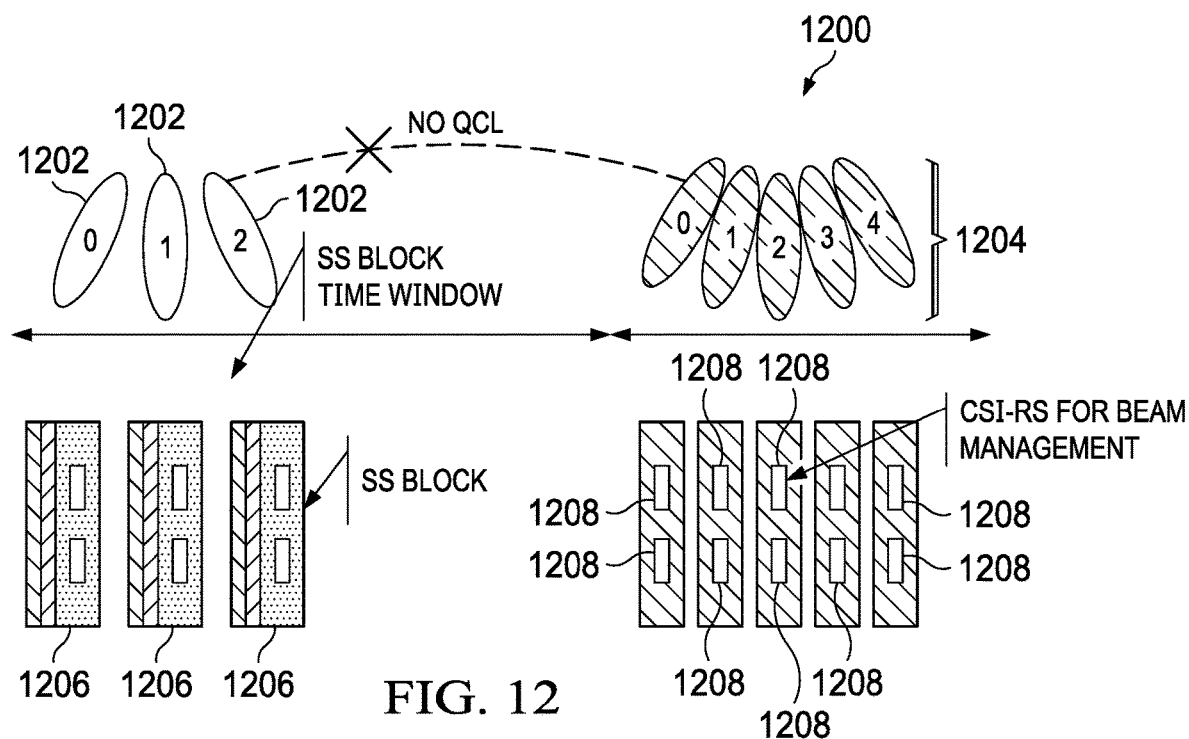
FIG. 12 is a diagram illustrating an embodiment of a method of estimating PL with no QCL.

FIG. 12 is a diagram illustrating an embodiment of a method 1200 of estimating PL with no QCL. gNB transmit beams 1202 (labeled 0, 1, 2) each include a respective SS block 1206. gNB receive beams 1204 (labeled 0, 1, 2, 3, 4) include CSI-RS 1208 for beam management. In an embodiment, without the QCL, the PL estimation is based only on the first CSI-RS.

Figure 13:
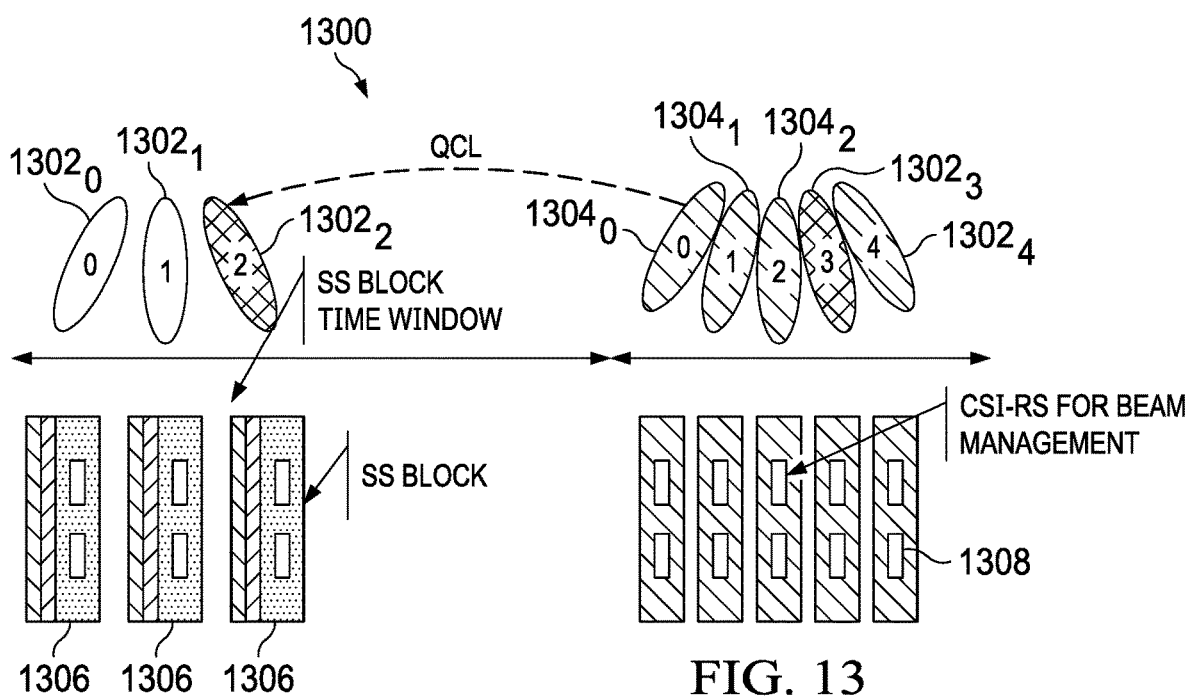
FIG. 13 and FIG. 14 are diagrams illustrating an embodiment of a method of estimating PL assuming QCL.
Figure 14:
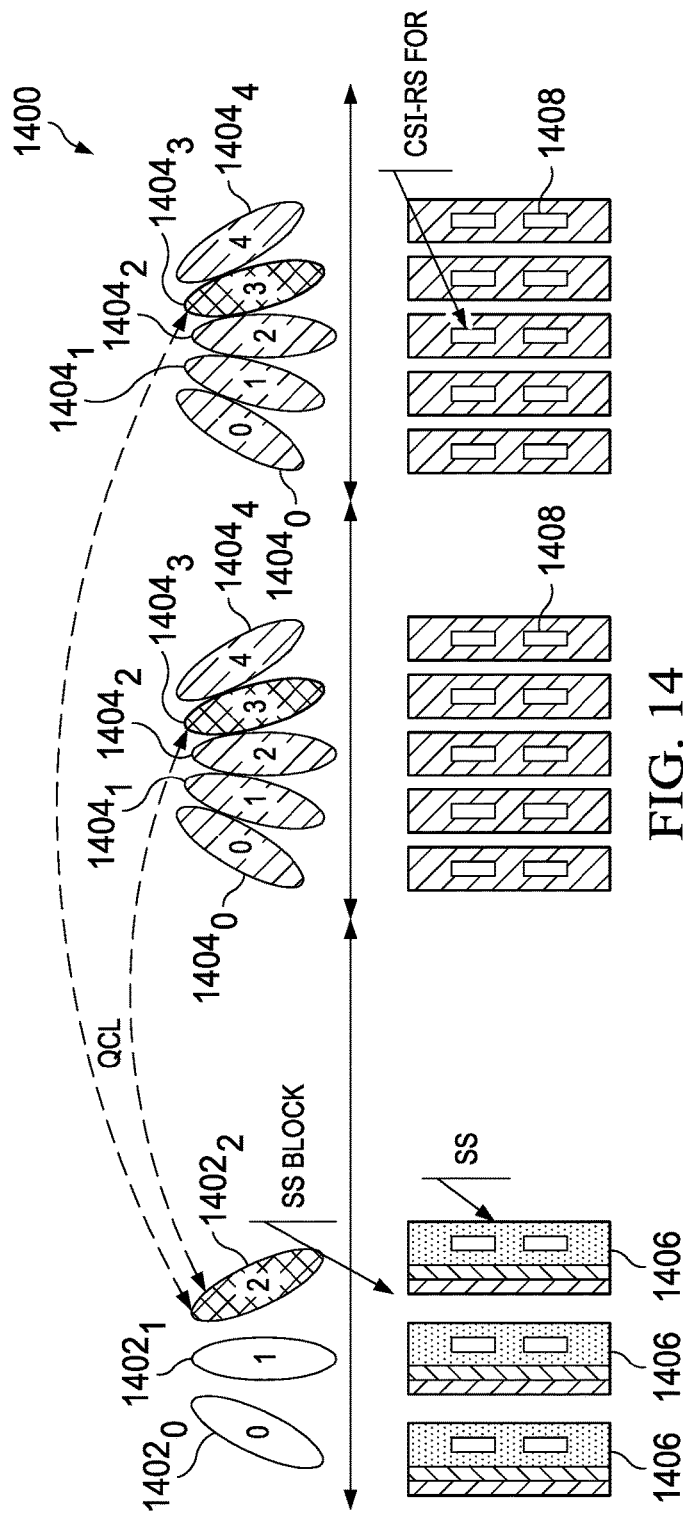

FIG. 13 and FIG. 14 are diagrams illustrating an embodiment of a method of estimating PL assuming QCL.

FIG. 13 is a diagram 1300 illustrating an embodiment of a method of estimating PL assuming QCL. gNB transmit beams $1302_0$, $1302_1$, $1302_2$ each include a respective SS block 1306. gNB receive beams $1304_0$, $1304_1$, $1304_2$, $1304_3$, $1302_4$ each include CSI-RS 1308 for beam management. The beams 1302, 1304 are related by QCL. Thus, in an embodiment, with the QCL, the PL estimation can be based on at least two out of the first type CSI-RS, the SS block, and the second type CSI-RS. LTE UL PC with fractional power control (FPC) has been agreed as a general framework for NR UL PC. The general formula of UE transmission power is $$P(i) = \min\left\{\begin{array}{l}P_{CMAX}(i),\\ 10\log_{10}(M(i)) + P_O(j) + \alpha(j) \cdot PL + \Delta_{TF}(i) + f(i)\end{array}\right\}[dBm]$$

in which open-loop part includes UE maximum power $P_{CMAX}(i)$, pathloss PL, factor $\alpha(j)$, nominal power $P_O(j)$, and sometimes static power offset, and closed-loop part includes power adjustment based on transmit format factor $\Delta_{TF}(i)$ and dynamic TPC command f(i). Based on this PC framework, different configurations are considered for NR UL PC. We propose a general PC setting framework for standardization that allows flexible combination of the key components to support UL PC in many varieties of forms in NR.

Now, both SS block (SCH or DMRS of PBCH) and CSI-RS are agreed for PL estimation. However, the applicable case for above DL RSs and how to combine/handle the measurement are still open.

When multiple DL RS are configured to a UE, which DL RS should be used for PL estimate for a specific PC setting should be specified. In other words, an association between a UL signal (or equivalently, a PC setting) and a DL RS (or equivalently, a configured L3 or L1 RSRP) needs to be specified, via, e.g., standard specifications, RRC configuration, MAC or PHY layer signaling. To obtain the PL estimate from the RSRP, the per-port DL RS power needs to be signaled to the UE.

For UEs without UE-specific configurations (e.g. UEs in an IDLE state), pathloss estimation for UL PC compensation for some transmissions (e.g. Msg1 and Msg3 in initial access RACH procedure) can only be derived from SS block with L3 filtering RSRP based on mobility measurement. Here the association between the UL transmissions and the L3 SS-RSRP can be specified in standards.

For UEs with UE-specific configurations (e.g. UEs in a CONNECTED state), one or multiple CSI-RS can be configured for beam management. To flexibly and dynamically track the beam specific pathloss, a UE can be configured to estimate pathloss associated with a specific CSI-RS resource and L1 RSRP for beam management measurement. In addition, SS block is one "always-on" signal used for L3 mobility in both IDLE and CONNECTED and also can be configured to support the spatial QCL assumption with CSI-RS in some cases. So both SS block and CSI-RS can be configured for PL estimation. Both L1 RSRP and L3 RSRP can be considered for the combined PL estimation. The RS or RSRP to be used for a UL transmission can be specified in RRC configuration, MAC or PHY layer signaling, and the RS or RSRP may be indexed and the index can be signaled to a UE for a UL transmission.

In some cases, there will be a pathloss mismatch measured between DL and UL. For example, the TRP serving sets for DL and UL can be different, and Tx/Rx beam reciprocity at the gNB or UE may not always be assumed. Then the pathloss should be compensated for these mismatch cases. Two possible options can be considered for the PL compensation. The first one can be based on PL offset compensation, which can be signaled as a static power offset. The second one can be combining (e.g. averaging) one PL from multiple "beam" specific PL. On the other hand, UL RS based PL estimate may also be considered. In this case, the network estimates the PL and indicates to UE, and the framework can be extended to support it.

In order to estimate PL, the per-port transmission power of the RS needs to be signaled to the receiver side. As in LTE, CSI-RS per-port power can be signaled when the CSI-RS is configured. For SS and DMRS, however, their per-port powers need to be provided in associated signaling in NR.

In an aspect, PL estimation supports one or more of the following:

Signaling to UE the association of a UL signal and a RS (together with the per-port RS power) for PL estimate Both L3 and L1 RSRP should be supported for PL estimation.

SS block only based L3 RSRP should be supported for IDLE

CSI-RS based L1 RSRP should be supported for CONNECTED

Power offset for PL compensation for asymmetric UL/DL should be supported

For beam specific power control, open (at least PL) & closed-loop parameters are agreed. Generally, beam specific power control can be similar for PUSCH/PUCCH/SRS with multiple beam transmission. For one complete beam specific PC setting, at least the following parameters should be clearly specified to UE.

The first parameter is the beam identity. For the UL transmission with one or more specific UL BPL (e.g. associated for one or multiple codeword), one or more reference DL BPL can be configured for the PL compensation. Beam information can be indicated with the QCL assumption between antenna port (group) of RS for PUSCH/PUCCH/SRS and DL RS. The second parameter is beam specific open-loop parameters. Based on the specific beam identity, the associated PL can be used. Specific $P_0$ can be used to semi-statically compensate the reception power for multiple considerations (e.g. target power, interference, etc.). Moreover, $P_0$ includes cell-specific nominal $P_{0\_nomial}$ and UE-specific $P_{0\_UE\_specific}$, then it seems reasonable to keep the one common cell-specific nominal $P_{0\_nomial}$ and multiple beam specific UE-specific $P_{0\_UE\_beam\_specific}$. Alternatively, the parameters including PL, $P_0$ and $_\alpha$ can be maintained or configured for each BPL respectively. Furthermore, BPLs can be clustered into different groups based on the beam management for simplicity. One BPL group is configured with one set of parameters (PL/$P_0$/$_\alpha$), and the TPC command can be configured per BPL in the group.

For the PL compensation factor $\alpha$, a beam specific value may not be needed. The third parameter is beam specific closed-loop parameters. Following the agreement, it seems only dynamic adjustment based on TPC command is necessary. Now, PUSCH with one or more code words can be associated with at least one or more QCL indicated beam information. In this case, TPC command can be associated with multiple port groups. Then different transmission layers (e.g. associated with code word(s) from different beams or panels) may use different transmission power which is different from LTE with equally inter-layer splitting, and this can be realized by associating different PC settings/parameters to the layers. Then the following mechanism is the potential power scaling when the expected total power exceeds the maximum power. In addition, the impact from TA (if supported) differences should also be taken into account.

It can be seen that beam specific PC may take different forms due to different considerations. To support this, the standards should focus on providing sufficient flexibility to combine/specify relevant key components involved in PC, such as the specific UL transmissions with specific properties (e.g., beam and port information), RS for PL, open-loop parameters, TPC command configurations, etc.

In an aspect, beam specific PC supports one or more of the following:

QCL assumption between antenna port (group) of RS for PUSCH/PUCCH/SRS and DL RS (e.g. CSI-RS) should be indicated for identifying beam identity Beam specific $P_0$ should be at least based on UE-specific part $P_{0\_UE\_beam\_specific}$ Different port groups of PUSCH can support different PC parameters PL compensation should be supported for UL/DL mismatch cases (e.g. beam reciprocity)

The beam specific PL can be maintained per BPL or BPL Group.

In NR, different traffic service types will be supported including eMBB and URLLC. Different traffic services may have different performance requirements (e.g. reliability, latency) based on different mechanisms such as grant mode (e.g. dynamic grant or RRC configured), numerology and scheduling time unit length (e.g. mini-slot, slot), etc. Generally speaking, traffic service specific UL PC loop should be used to maintain the specific performance requirements for PUSCH and even associated PUCCH/SRS. The specific PC loop may include the open-loop parameters $P_0$, and closed-loop TPC commands. In addition, some new specific UL PC mechanisms should be discussed because of the new requirements. In some cases, dynamic multiplexing between URLLC and eMBB (each is configured with multiple numerologies) may be supported for one profitable resource utilization; however, this multiplexing also may result in the resource collision between URLLC and eMBB. Then the potential interference should be considered for traffic service specific power control. Though for same traffic service with different numerologies, it seems the predefined PSD scaling is one simple and straightforward mechanism to maintain the same performance requirement. However, interference may be different. A configurable specific parameter is preferred for the added flexibility. In addition, for one UE supporting multiple traffic service specific PC loops, the associated mechanism specific traffic service can be implicitly associated with at least one of grant mode (e.g. dynamic grant or RRC configured), numerology and scheduling time unit length (e.g. mini-slot, slot).

In an aspect, traffic service specific power control is supported:

The specific PC parameters can be configured open-loop part (e.g. $P_0$ and $_\alpha$) or closed-loop part Traffic service can be implicitly associated with other grant property including at least one of Numerology Dynamic grant or RRC configured Scheduling time unit length (e g mini-slot, slot)

Though channel/signal specific uplink power control consideration ideally aims to provide the optimal performance gain, some components (e.g. $P_0$, $_\alpha$, etc.) may be common to multiple specific power control loops. For example in LTE, some parts for Msg1 transmission are reused for PUSCH transmission of Msg3 and some parts for scheduled PUSCH are reused for SRS transmission. Thus, common PC parameter settings should be reserved and extended for NR UL PC. For example, if a UE can support one or multiple beams or numerologies, then some common parameters setting may be maintained for PUSCH and SRS which are associated with the same beam or numerology on the same carrier or bandwidth part. Moreover, a detailed SRS PC mechanism will be apparent to those skilled in the art, and power control for SRS switching may optionally use this mechanism.

In an aspect, common PC parameter setting is supported between PUSCH and SRS which are associated with the same beam or numerology.

The above discussions illustrate that a PC setting contains several key components, and each component may take various values of parameters of various forms. When the components are determined, a PC setting is well defined/determined. As evident from above, to determine each component for each PC setting can be complicated. However, the standards do not have to specify how all the components need to be determined for all PC settings; a significant part of determining the components and their parameters should be left to implementation. Consequently, in addition to discussing specific PC settings, a general PC setting framework needs to be decided and standardized.

In more detail, a PC setting should generally contain at least several of the following key components, which can be indexed for convenient referencing in signaling and flexible combining:

The UL signal/channel.

If the same signal/channel is associated with multiple PC setting, then the associated configurations/properties to uniquely identify this signal/channel also need to be specified. For example, if different beams are associated with PUSCH, and each beam has a different PC setting, then the beam configuration information (or equivalent QCL information) should be specified together with the UL signal/channel information for each PC setting. This can also be applied to PUSCH layers, UL signals with different numerologies, etc.

The DL RS (or equivalently, the RSRP) and its per-port transmission power.

The component is generally mandatory for a PC setting except for cases such as with network-indicated PL value.

The open-loop PC parameters, mainly $P_0$, $\alpha$, and power offset.

The TPC command.

This includes the associated TPC command configurations, DCI resources and configurations, etc.

This component is optional for a PC setting.

The closed-loop state or closed-loop process.

This specifies which closed-loop state/process a PC setting will use, and each corresponds to one closed-loop (i.e., PC loop) the UE is configured and needs to maintain. For absolute TPC commands, the loop state is equal to the TPC command and is memory-less, otherwise the loop state is the cumulative sum of the TPC commands associated with this loop. A UE may maintain multiple closed-loop states/processes, and different states/processes may be specified with same/different components listed above. Note that the closed-loop state is related to but not the same as the TPC command configurations, as one closed-loop state may be associated with multiple TPC command resources and vice versa for flexibility.

This component is optional for a PC setting.

A PC setting can be basically viewed as an association of the above components. By properly combining/configuring/indicating the above components, the network can support many forms of PC settings and the UE can uniquely determine its power. However, to reduce UE complexity, only a limited number of PC settings may be supported by a UE, and the maximum number can be standardized or reported by UE as UE capability.

In an aspect, a Standardized general PC setting framework is provided that allows to flexibly specifying at least some of the following components and their values: the UL signal/channel, the DL RS and its per-port power, the open-loop PC parameters, the TPC command, and the closed-loop state/process.

FIG. 14 is a diagram illustrating an embodiment of a method 1400 of estimating PL assuming QCL. gNB transmit beams $1402_0$, $1402_1$, $1402_2$ include a respective SS block 1406. gNB receive beams $1404_0$, $1404_1$, $1404_2$, $1404_3$, $1402_4$ include CSI-RS 1408 for beam management. The beams $1402_2$, $1404_2$ are related by QCL. Thus, in an embodiment, with the QCL, the PL estimation can be based on at least two out of the first type CSI-RS, the SS block, and the second type CSI-RS.

Estimating the DL PL for a UE in the connected state can also utilize one or two-dimensional filtering. In an embodiment, one-dimension filtering for L1-RSRP or PL with third filter coefficient is performed. One PL is estimated with one reference transmission power and one composite and filtered L1-RSRP or PL from on RS type with first CSI-RS, or SS block or second CSI-RS with the third filter coefficient. In an embodiment, one-dimension filtering for L1-RSRP or PL with third filter coefficient are performed. One PL is estimated with one reference transmission power and one composite and filtered L1-RSRP or PL from multiple RS type including first CSI-RS and QCLed SS block/second CSI-RS with the third filter coefficient. Third coefficient can be configured with RRC signaling.

In another embodiment, two-dimension filtering is performed with one or multiple third filter coefficients for multiple RS type specific L1-RSRP or PL. Each RS type specific PL is associated with one common or specific third filter coefficient and a specific RS type which is at least one of a SS block, a first CSI-RS, and a second CSI-RS and different RS type specific PL is associated with different RS type. Filtering on multiple RS type specific PLs with a second filter coefficient is performed on the result of the first filtering process. One composite PL is filtered or averaged from multiple RS type specific L1-RSRPs or PLs with the second filter coefficient. All second and third coefficients can be configured with RRC signaling.

Figure 15:
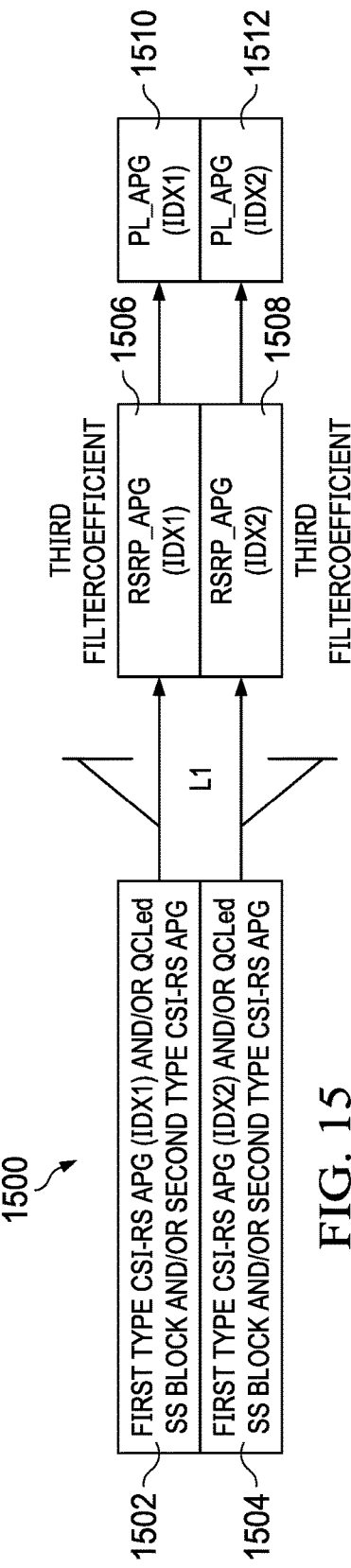
FIG. 15 is a diagram illustrating an embodiment of a method of one dimensional L1 filtering for DL PL estimation for a UE in a connected state.

FIG. 15 is a diagram illustrating an embodiment of a method 1500 of one dimensional filtering with a third filter coefficient for DL PL estimation for a UE in a connected state wherein two RS relationship specific L1-RSRP 1506, 1508 and PL 1510, 1512 are estimated with a specific first CSI-RS or QCLed SS block and QCLed second CSI-RS 1502, 1504 respectively. The third coefficient can be configured with RRC signaling.

Figure 16:
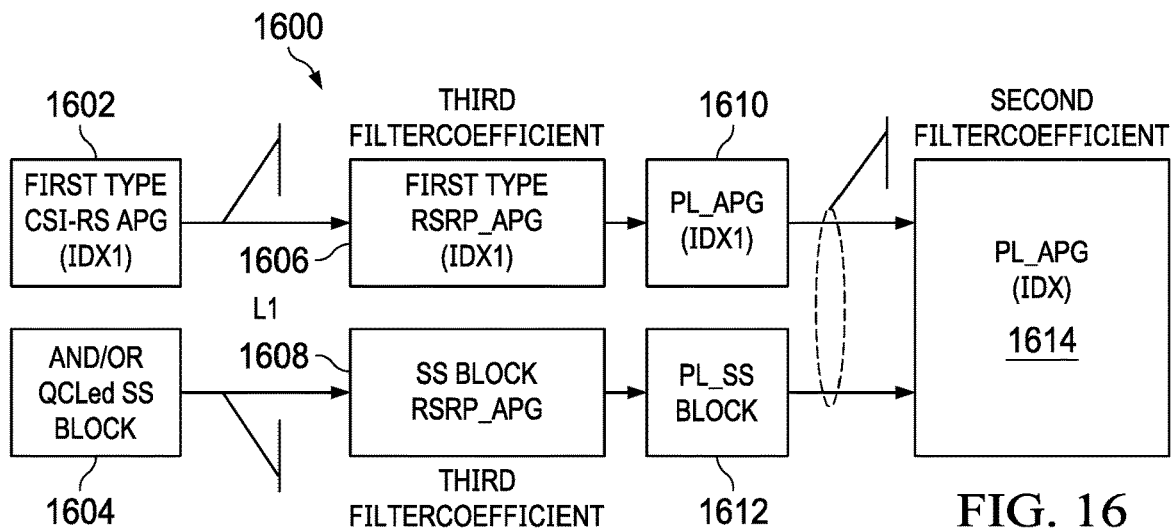
FIGS. 16, 17 and 18 are diagrams illustrating an embodiment of a method of two dimensional L1 filtering for DL PL estimation for a UE in a connected state.
Figure 17:
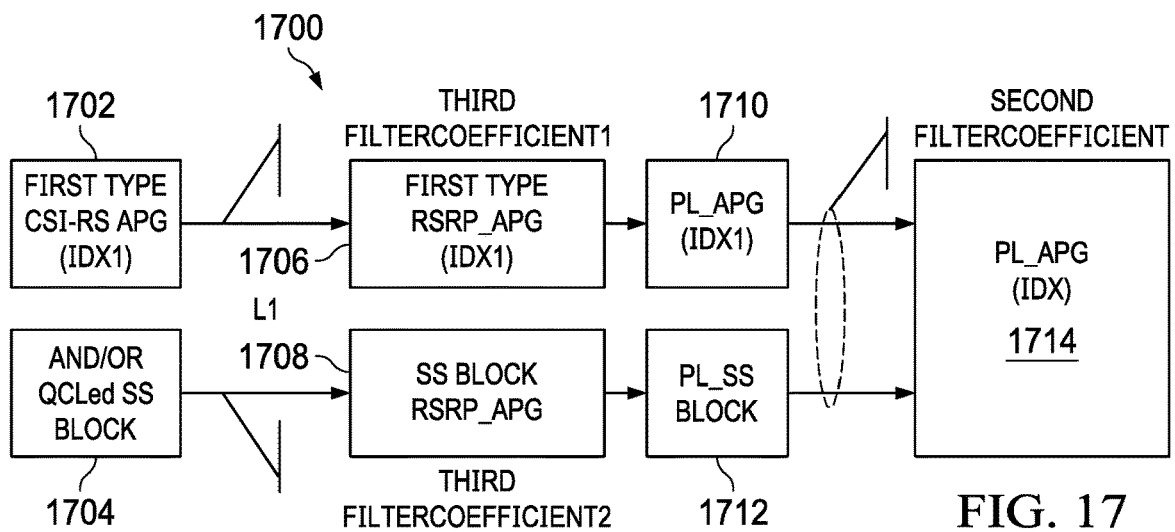
Figure 18:
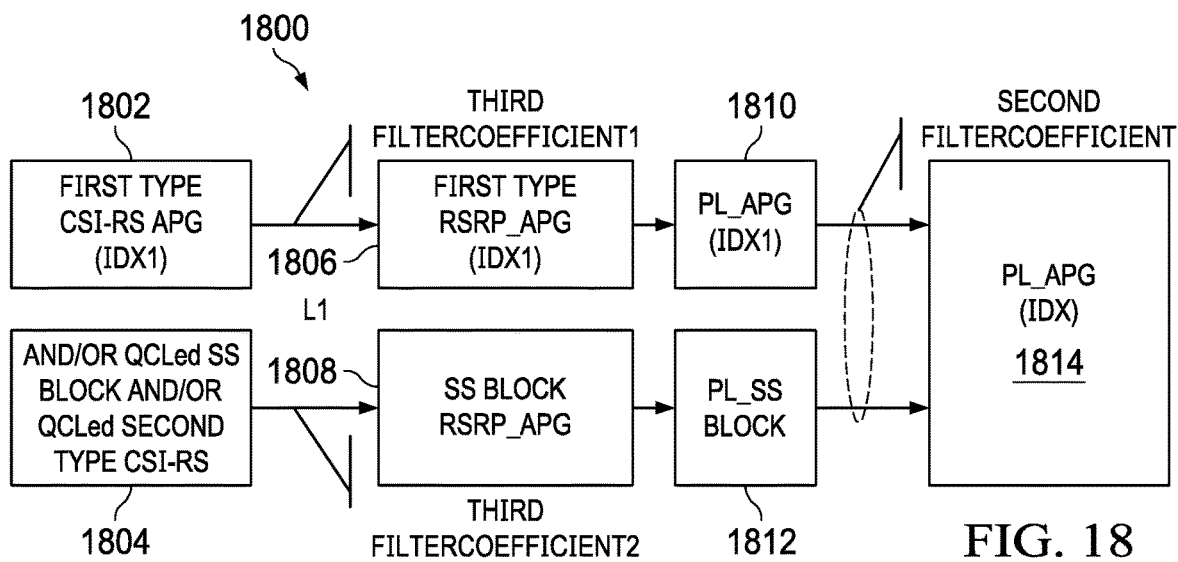

FIGS. 16, 17 and 18 are diagrams illustrating an embodiment of a method of two dimensional L1 filtering for DL PL estimation for a UE in a connected state. FIGS. 16 and 17 are diagrams illustrating embodiments of methods 1600, 1700 of two dimensional filtering with one or two third filter coefficient and a second filter coefficient for DL PL estimation for a UE in a connected state wherein two RS type specific L1-RSRP or PL are estimated with specific first CSI-RS or QCLed SS block and one common or specific third filter coefficient and one composite L1-RSRP or PL is estimated with two RS type specific L1-RSRPs or PLs and one second filter coefficient. All second and third filter coefficients can be configured with RRC signaling.

Method 1600 includes filtering a first type CSI-RS APG (idx1) 1602 or a QCLed SS block 1604 with third filter coefficients to obtain a first type RSRP_APG(idx1) 1606 and an SS block RSRP_APG 1608 or their associated PLs (PL_APG(idx1) 1610 and PL SS block 1612). A composite PL_APG(idx) 1614 is obtained by filtering with a second filter coefficient the PL_APG(idx1) 1610 and the PL SS block 1612.

Method 1700 includes filtering a first type CSI-RS APG (idx1) 1702 with a L1 third filter coefficient1 and filtering a QCLed SS block 1704 with a L1 third filter coefficient2 to obtain a first type RSRP_APG(idx1) 1706 and SS block RSRP_APG 1708 respectively or their corresponding PLs (PL_APG(idx1) 1710 and PL SS block 1712). The PLs 1710, 1712 are filtered with a second filter coefficient to obtain a common PL_APG 1714.

FIG. 18 is a diagram illustrating an embodiment of a method 1800 of two dimensional filtering for DL PL estimation for a UE in a connected state. A first type CSI-RS APG(idx1) is filtered with a L1 third filter coefficient1 to obtain a first type RSRP_APG(idx1) 1806 or a PL_APG (idx1) 1810. A QCLed SS block or QCLed second type CSI-RS 1804 is filtered with a L1 third filter coefficient2 to obtain an SS block RSRP_APG 1808 or a PL SS block 1812. The PLs 1810, 1812 are filtered with a second filter coefficient to obtain a common PL 1814.

Figure 19:
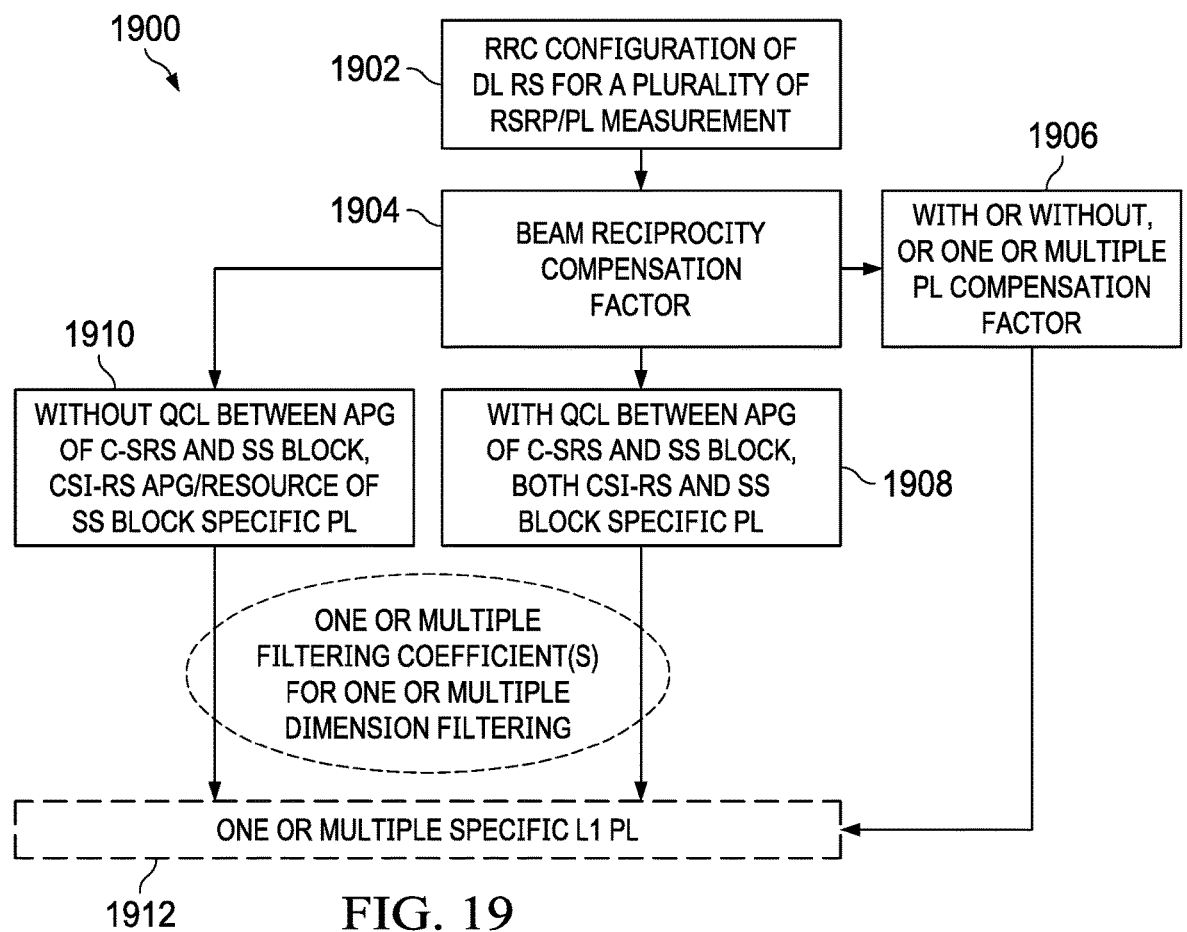
FIG. 19 is a flowchart of an embodiment of a method for DL PL estimation with L1 filtering for a UE in a connected state.

FIG. 19 is a flowchart of an embodiment of a method 1900 for DL PL estimation with L1 filtering for a UE in a connected state. At block 1902, the UE obtains an RRC configuration of DL RS for a plurality of RSRP/PL measurements. At block 1904, the UE optionally obtains a beam reciprocity compensation factor. At block 1906, one or multiple PL compensation factors, and optionally the beam reciprocity compensation factor, are used to determine one or multiple specific L1 PLs at block 1912. At block 1908, with QCL between APG of CSRS and SS block, both CSI RS and SS block specific PL are used with one or multiple filtering coefficients for one or multiple dimension filtering to determine one or multiple specific L1 PL. At block 1910, without QCL between APG of C-SRS and SS block, CSI-RS APG/resource of SS block specific PL is used with one or multiple filtering coefficients for one or multiple dimension filtering to obtain one or multiple specific L1 PL.

In another embodiment, the UE is configured to estimate a plurality of RS relationship specific PL measurements on a second type CSI-RS or an SS block. The second type CSI-RS is configured for L3 RSRP for mobility measurement. The SS block is also predefined for L3 RSRP for mobility measurement. The configuration for PL estimation can be based on at least one of DCI, MAC CE, and RRC signaling. In addition to a second CSI-RS for PL, the SS block can be configured for PL estimation based on the RS relationship configuration between the SS block or the second CSI-RS with or without RS relationship. In an embodiment, without RS relationship, the PL estimation is based only on the second CSI-RS or SS block. Each PL measurement based on a L3 measurement is associated with at least one L3 measurement of a second type CSI-RS APG or one L3 measurement of a QCLed SS block. One APG has at least one antenna port with RS relationship assumption. At least one CSI-RS APG can be associated with one or multiple CSI-RS resource(s) or resource set(s).

Figure 20:
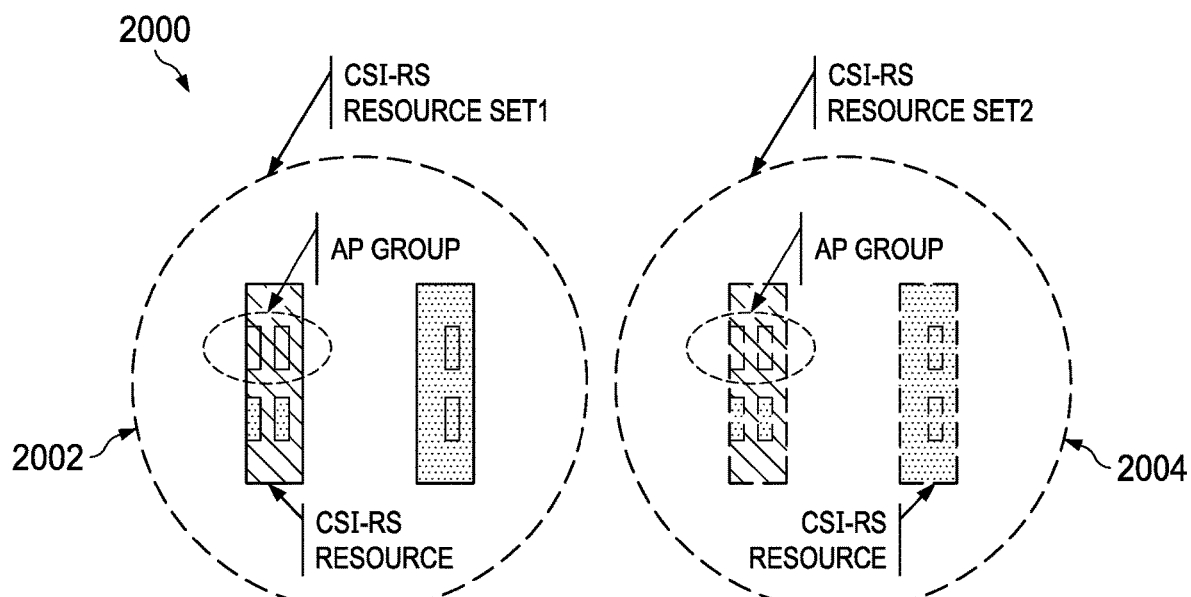
FIG. 20 is a diagram of an embodiment of a method for DL PL estimation for a UE in a connected state with two APGs 2002, 2004 each having a respective CSI-RS resource set.

FIG. 20 is a diagram of an embodiment of a method 2000 for DL PL estimation for a UE in a connected state with two APGs 2002, 2004 each having a respective CSI-RS resource set. FIG. 20 is a diagram 2000 illustrating an embodiment of AP groups (APGs) with a first APG 2002 having a first CSI-RS resource set and a second APG 2004 having a second CSI-RS resource set.

Figure 21:
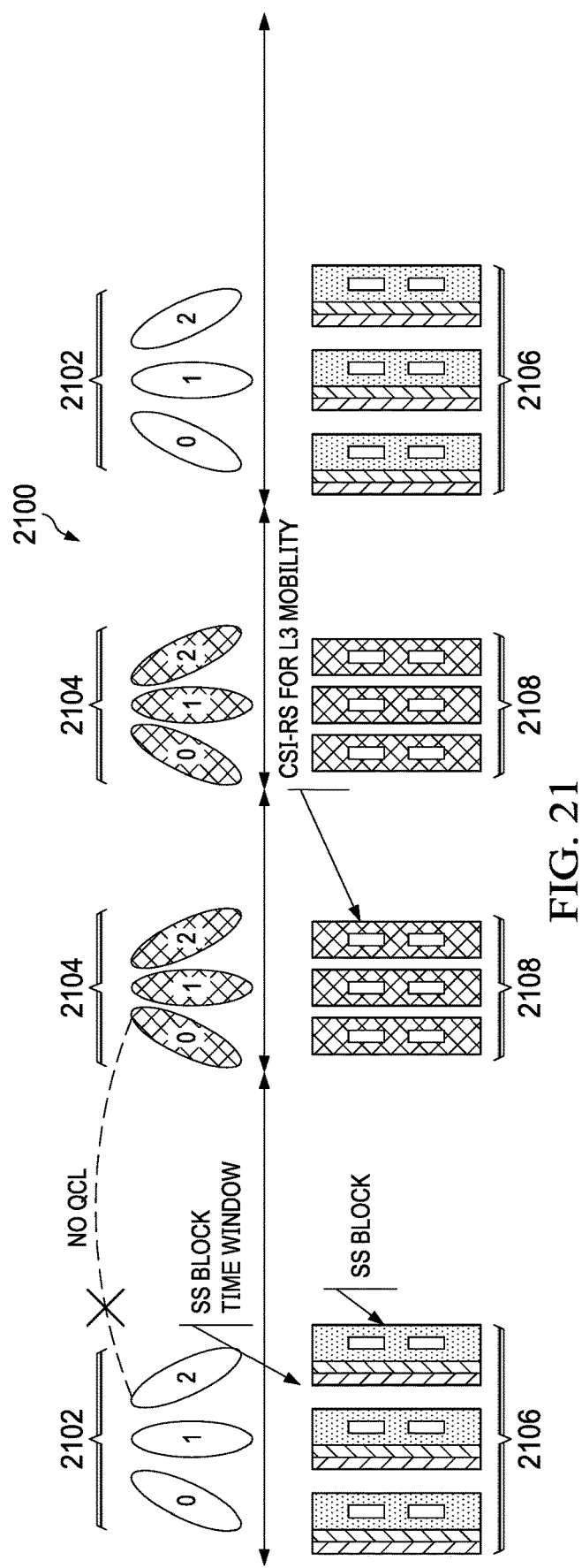
FIG. 21 is a diagram of an embodiment of a method for DL PL estimation for a UE in a connected state without QCL.

FIG. 21 is a diagram of an embodiment of a method 2100 for DL PL estimation for a UE in a connected state without QCL. gNB transmit beams 2102 (labeled 0, 1, 2) each include a respective SS block 2106. gNB receive beams 2104 (labeled 0, 1, 2) each include a respective CSI-RS 2108 for L3 mobility.

Estimating the DL PL for a UE in the connected state can also utilize one or two-dimensional filtering. In an embodiment, one-dimension filtering for L3-RSRP or PL with fourth filter coefficient is performed. One PL is estimated with one reference transmission power and one composite and filtered L3-RSRP or PL from one RS type with SS block or second CSI-RS with the fourth filter coefficient. In an embodiment, one-dimension filtering for L3-RSRP or PL with fourth filter coefficient is performed. One PL is estimated with one reference transmission power and one composite and filtered L3-RSRP or PL from multiple RS types including SS block and QCLed second CSI-RS with the fourth filter coefficient. All second and fourth filter coefficients can be configured with RRC signaling.

In another embodiment, two-dimension filtering is performed with one or multiple fourth filter coefficients for multiple RS type specific L3-RSRP or PLs. Each RS type specific PL is associated with one common or specific fourth filter coefficient and a specific RS type which is at least one of a SS block, a first CSI-RS, and a second CSI-RS and different RS type specific PL is associated with different RS type. Filtering on multiple RS type specific PLs with a second filter coefficient is performed on the result of the first filtering process. One composite PL is filtered or averaged from multiple RS type specific PLs with the second filter coefficient. All second and fourth filter coefficients can be configured with RRC signaling.

Figure 22:
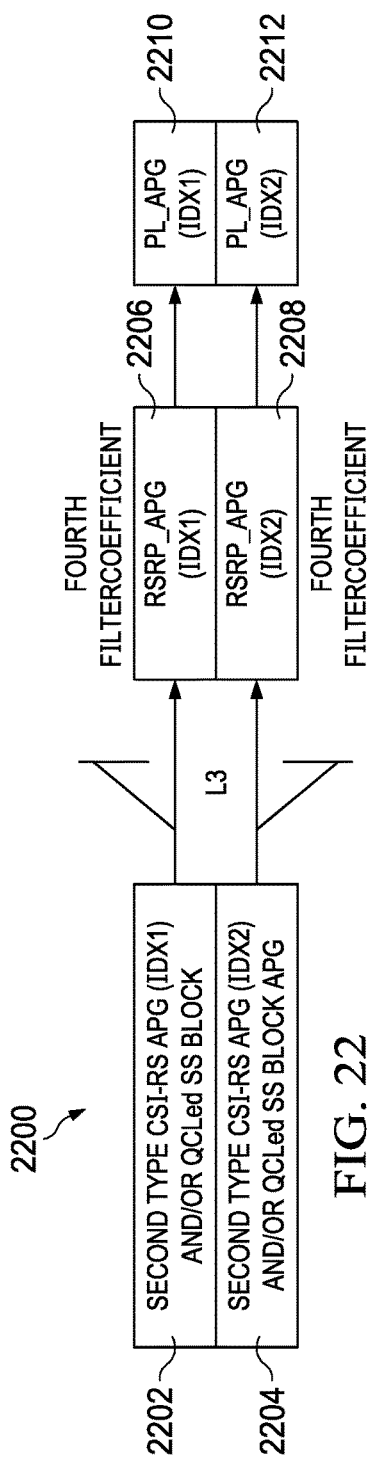
FIG. 22 is a diagram of an embodiment of a method for one dimension L3 filtering with a fourth filter coefficient for DL PL estimation for a UE in a connected state based on CSI-RS.

FIG. 22 is a diagram of an embodiment of a method 2200 for multiple RS relationship specific L3-RSRP or PL with one dimension L3 filtering with a fourth filter coefficient for DL PL estimation based on CSI-RS for a UE in a connected state. A second type CSI_RS APG(idx1) or QCLed SS block 2202 is layer 3 (L3) filtered with a fourth filter coefficient to obtain an RSRP_APG(idx1) 2206 or a PL_APG(idx1) 2210. A second type CSI-RS APG(idx2) or QCLed SS block APG 2204 is filtered with the L3 fourth filter coefficient to obtain the RSRP_APG(idx2) 2208 or PL_APG(idx2) 2212.

Figure 23:
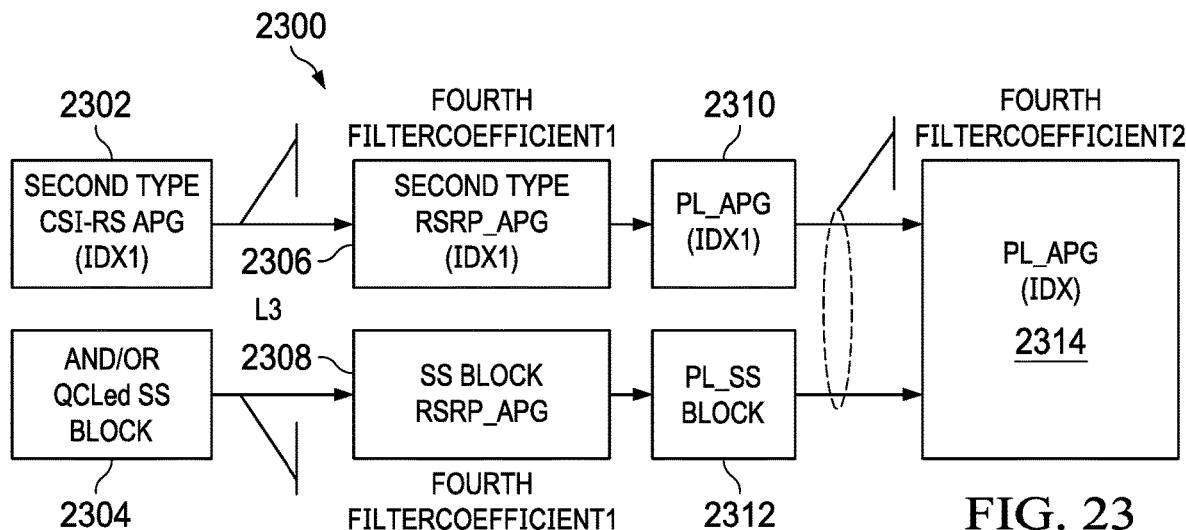
FIG. 23 is a diagram of another embodiment of a method for two dimension L3 filtering with a fourth filter coefficient for DL PL estimation for a UE in a connected state.

FIG. 23 is a diagram of an embodiment of a method 2400 for two dimension filtering for DL PL estimation for a UE in a connected state. The method includes one fourth filter coefficient1 and one fourth filter coefficient2 for two RS type specific L3-RSRP 2306, 2308 or PL 2310, 2312. Each L3-RSRP 2306, 2308 or PL 2310, 2312 is associated with one specific RS type (second CSI-RS 2302 or QCLed SS block 2304) with one fourth filter coefficient1. Filtering on two RS type specific L3-RSRP 2306, 2308 or PLs 2310, 2312 with a fourth filter coefficients is then performed. One composite PL 2314 is filtered or averaged from two RS type specific L3-RSRP 2306, 2308 or PL 2310, 2312 with a fourth filter coefficient2. All fourth filter coefficients can be configured with RRC signaling.

Figure 24:
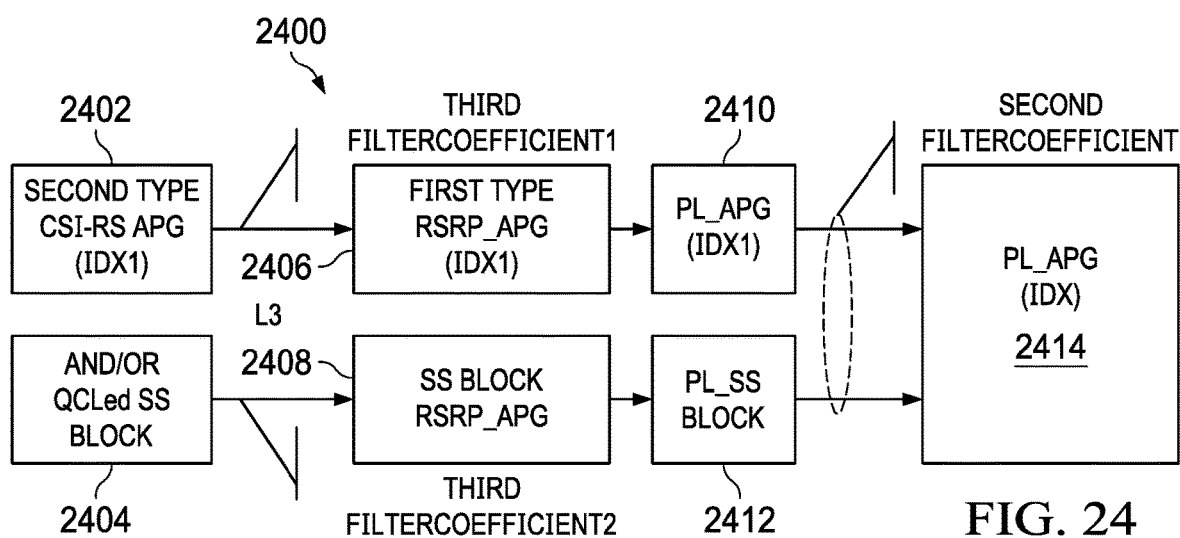
FIG. 24 is a diagram of an embodiment of a method for two dimension L3 filtering with two fourth filter coefficients for DL PL estimation for a UE in a connected state.

FIG. 24 is a diagram of an embodiment of a method 2400 for two dimension filtering for DL PL estimation for a UE in a connected state. The method includes multiple fourth filter coefficients (fourth filter coefficient1 and fourth filter coefficient2) and one second filter coefficient for an RS type specific L3-RSRP 2406, 2408 or PL 2410, 2412. Each RS type specific L3-RSRP 2406, 2408 or PL 2410, 2412 is associated with a specific RS type (second CSI-RS 2402 or QCLed SS block 2404) with one fourth filter coefficient (fourth filter coefficient1 for second type CSI-RS APG(idx1) 2402 and fourth filter coefficient2 for or QCLed SS block 2404). Filtering on two RS type specific L3-RSRP 2406, 2409 or PL 2410, 2412 with a second filter coefficient is then performed. One composite PL 2414 is filtered or averaged from the two RS type specific L3-RSRP 2406, 2408 or PLs 2410, 2412 with a second filter coefficient. All second and fourth filter coefficients can be configured with RRC signaling.

Figure 25A:
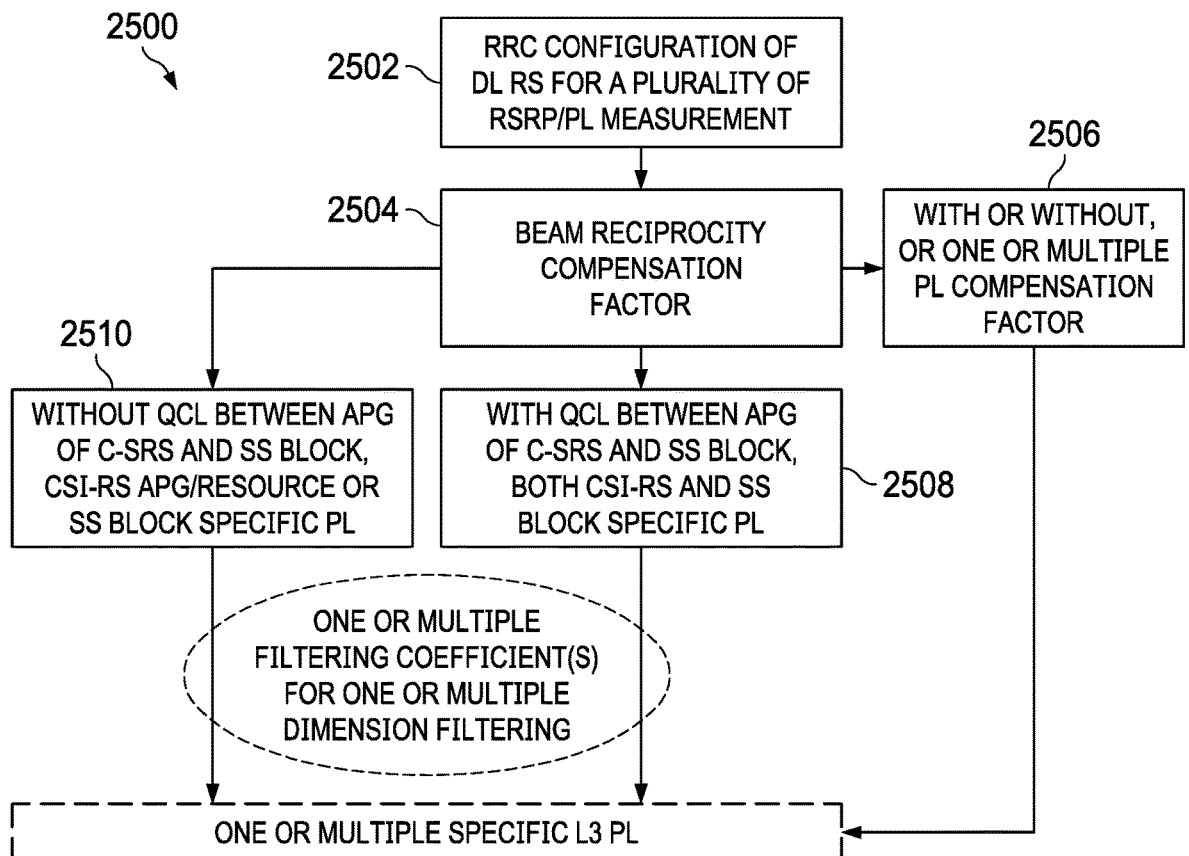
FIG. 25A is a flowchart of an embodiment of a method for DL PL estimation with L3 filtering for a UE in a connected state.

FIG. 25A is a flowchart of an embodiment of a method 2500 for DL PL estimation with L3 filtering for a UE in a connected state. At block 2502, the gNB obtains an RRC configuration of DL RS for a plurality of RSRP/PL measurements. At block 2504, the gNB optionally determines a beam reciprocity compensation factor. At block 2506, the gNB uses one or multiple PL compensation factors, and optionally the beam reciprocity compensation factor, to determine one or multiple specific L3 PLs. At block 2508, the gNB, with QCL between APG of C-SRS and SS block, both CSI-RS and SS block specific PL and one or multiple filtering coefficients for one or multiple dimension filtering are used to determine, at block 2512, one or multiple specific L3 PLs. At block 2510, without QCL between APG of C-SRS and SS block, CSI-RS APG/resource or SS block specific PL are used with one or multiple filtering coefficients for one or multiple dimension filtering to obtain, at block 2512, one or multiple specific L3 PL. Blocks 2508 and 2510 are mutually exclusive with only one block being executed depending on whether QCL exists between the APG of C-SRS and the SS block. Block 2506 is optional and can be executed in conjunction with either block 2508 or block 2510.

In another embodiment, two-dimension filtering is performed with one third filter coefficient, one fourth filter coefficient and one second filter coefficient for RS type specific L1-RSRP or PL and RS type specific L3-RSRP or PL. Each RS type specific PL is associated with one specific third or fourth filter coefficient and a specific RS type which is at least one of a SS block, a first CSI-RS, and a second CSI-RS and different RS type specific PL is associated with different RS type. Filtering on multiple RS type specific L1-RSRP or PL and L3-RSRP or PL with a second filter coefficient is performed on the result of the first filtering process. One composite PL is filtered or averaged from multiple RS type specific PLs or L1-RSRP or L3-RSRP with the second filter coefficient. All second, third and fourth filter coefficients can be configured with RRC signaling.

Figure 25B:
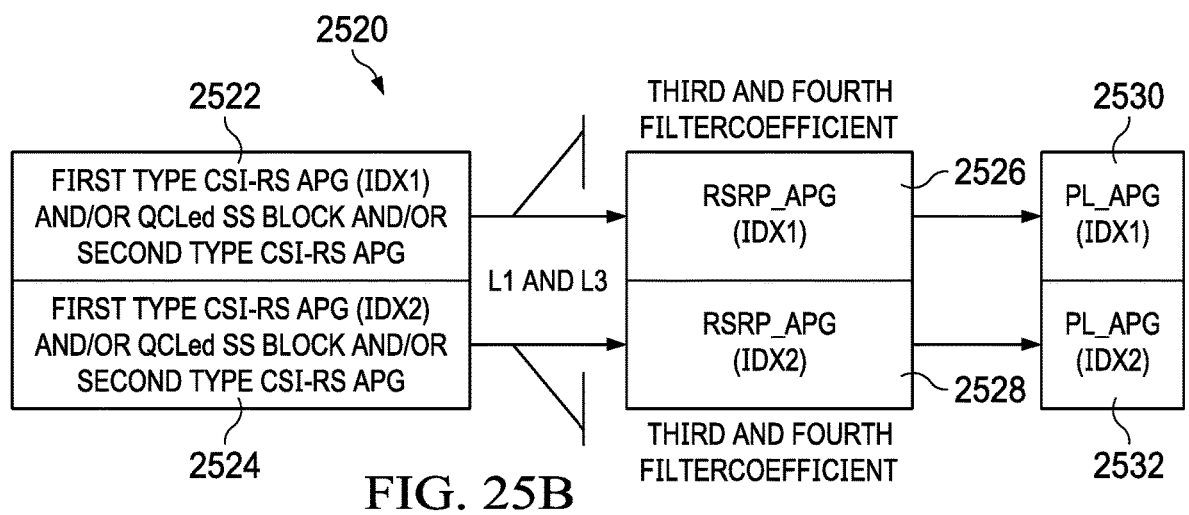
FIGS. 25B-25D are diagrams illustrating embodiments of methods of two dimensional filtering for DL PL estimation.
Figure 25C:
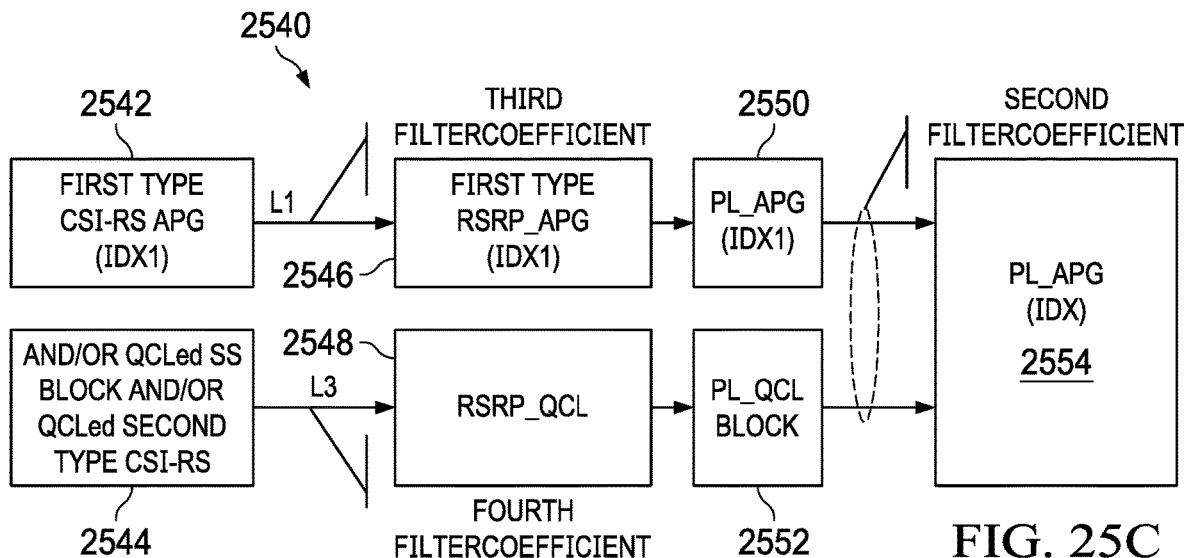
Figure 25D:
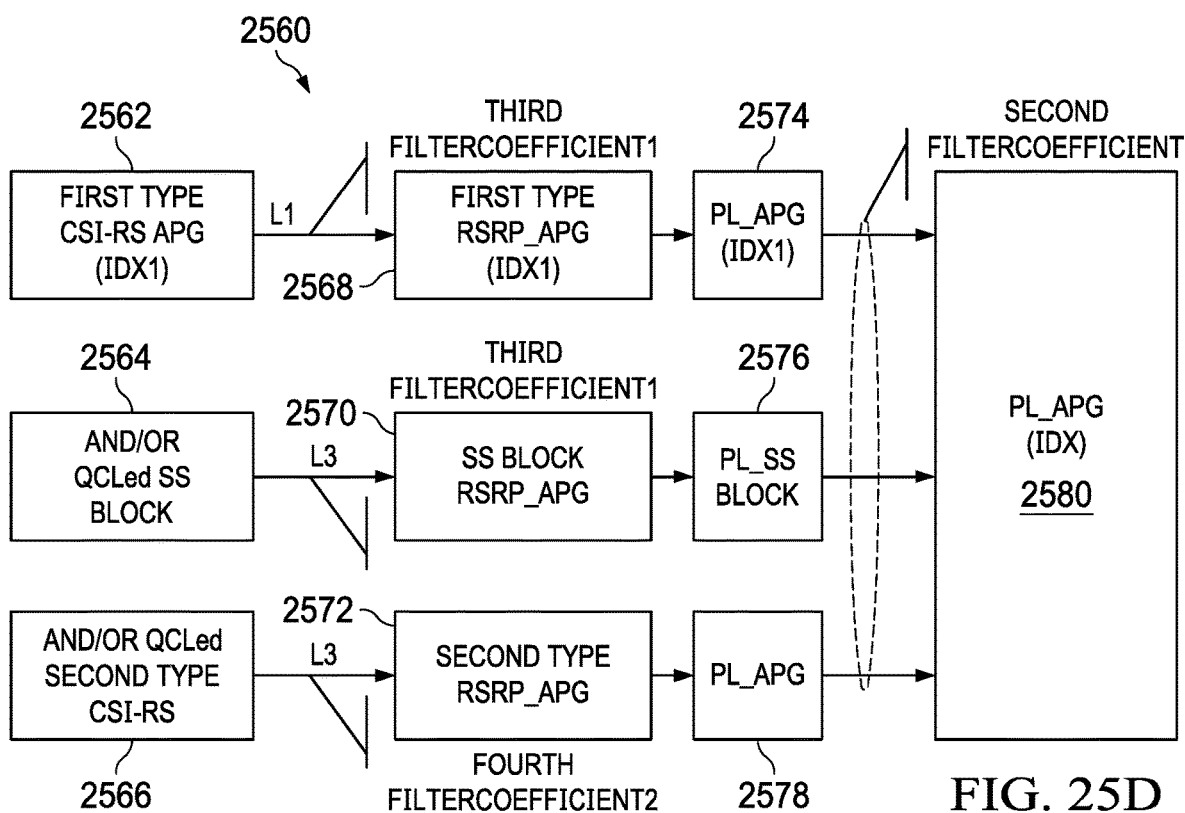

FIGS. 25B-25D are diagrams illustrating embodiments of methods 2520, 2540, 2560 of two dimensional filtering for DL PL estimation.

In method 2520, a first type CSI-RS APG (idx1) or QCLed SS block or second type CSI-RS APG 2522 is filtered with a L1 third filter coefficient and with a L3 fourth filter coefficient to obtain an RSRP_APG(idx1) 2526 or PL_APG(idx1) 2530. A first type CSI-RS APG(idx2) or QCLed SS block or second type CSI-RS APG 2524 is filtered with a L1 third filter coefficient and with a L3 fourth filter coefficient to obtain an RSRP_APG(idx2) 2528 or a PL_APG(idx2) 2532.

In method 2540, a first type CSI-RS APG(idx1) is filtered with a L1 third filter coefficient to obtain a first type RSRP_APG (idx1) 2546 or a PL_APG(idx1) 2550. A QCLed SS block or QCLed second type CSI-RS 2544 is filtered with a L3 fourth filter coefficient to obtain an RSRP QCL 2548 or a PL QCL block 2552. The RSRP 2546, 2548 or the PLs 2550, 2552 are filtered with a second filter coefficient to obtain a common PL_APG 2554.

In method 2560, a first type CSI-RS APG(idx1) 2562 is filtered with a L1 third filter coefficient1 to obtain a first type RSRP_APG(idx1) 2568 or a PL_APG(idx1) 2574. A QCLed SS block 2564 is filtered with a L3 fourth filter coefficient1 to obtain an SS block RSRP_APG 2570 or a PL SS block 2576. A QCLed second type CSI-RS 2566 is filtered with a L3 fourth filter coefficient2 to obtain a second type RSRP_APG 2572 or a PL_APG 2578. The RSRPs 2568, 2570, 2572 or the PLs 2574, 2576, 2578 are filtered with a second filter coefficient to obtain a common PL_APG 2580.

In an embodiment, a method for PL compensation for UL/DL correspondence for a serving beam/BPL or TRP is provided. For a first example, one common PL or multiple RS relationship specific PLs are estimated based on configuration for beam reciprocity at the gNB. In this example, multiple RS relationship specific PLs are estimated based on multiple RS configurations and each RS relationship specific PL is based on one specific RS configurations if beam reciprocity is assumed, otherwise, one common PL is estimated with multiple RS relationship specific PLs. The configuration for beam reciprocity (1 bit) can be at least one of broadcasting and RRC signaling. For a second example, one or more PL compensation offset is explicitly configured to the UE. In this example, one common PL offset can be configured for compensation on all RS relationship specific PLs, or multiple RS relationship specific PL offset can be configured and each RS relationship specific PL offset is used for compensating specific RS relationship specific PL wherein the configuration can be at least one of broadcasting, MAC CE and RRC signaling. One or more compensation PL offsets can be configured with value or derived by one or more compensation factor based on one mapping table between compensation PL offset and compensation factor. For a third example, one PL compensation is based on combining or filtering multiple RS relationship PLs and one second filter coefficient. The filtering function can be at least one of maximum selection, minimum selection, average and one second filter coefficient is explicitly indicated to the UE by the RRC signaling. PL for one UL RS relationship can be determined by configuring the association between one specific UL RS relationship and one specific DL RS relationship. This association can based on RS relationship.

Figure 26:
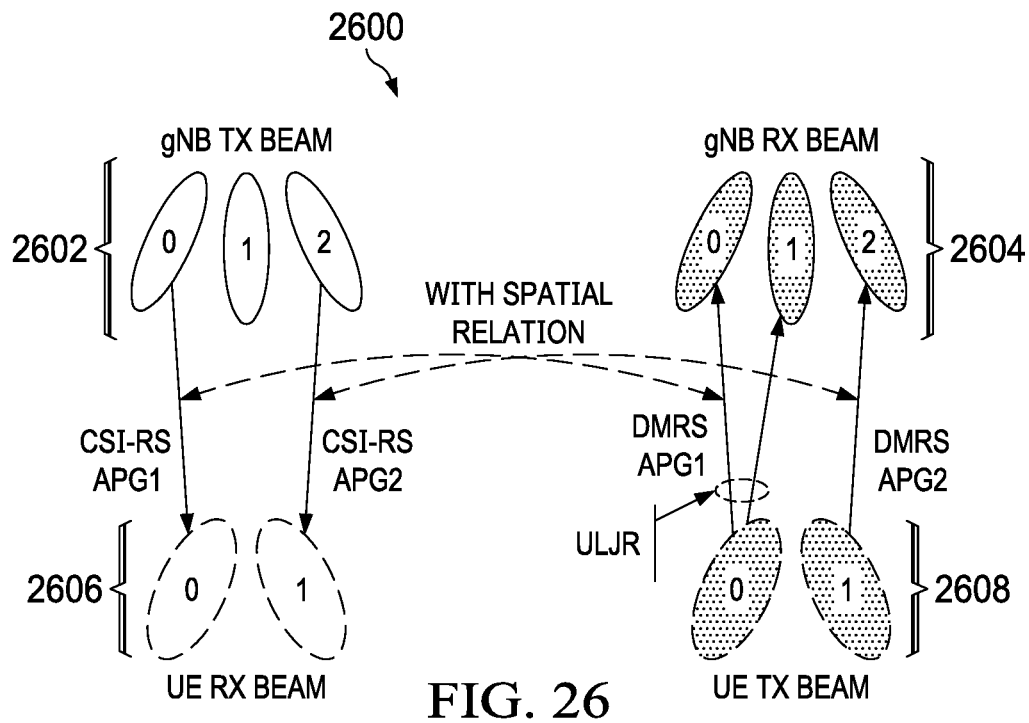
FIG. 26 is a diagram illustrating an embodiment of a RS spatial relationship specific method for PL compensation for UL/DL correspondence for a serving beam or BPL or TRP.

FIG. 26 is a diagram illustrating an embodiment of a RS spatial relationship specific method 2600 for PL compensation for UL/DL correspondence for a serving beam/BPL or TRP. In an embodiment, the UE can be configured with two RS relationships wherein first relationship is between two ULs with Tx beam0 (UE) 2608 and Rx beam0 2604 or Rx beam1 (gNB) 2604 and DL CSI-RS APG1 with Tx beam 0 (gNB) 2602 and Rx beam0 (UE) 2606.

Figure 27:
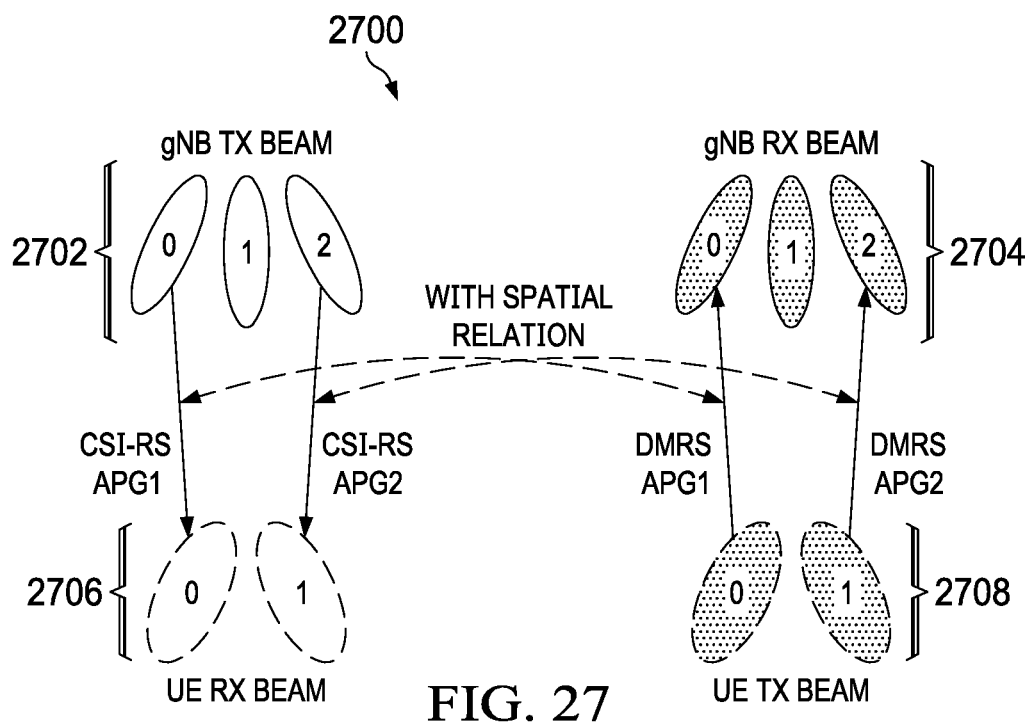
FIG. 27 is a diagram illustrating a RS relationship specific method for DL PL estimation.

FIG. 27 is a diagram 2700 illustrating a RS relationship assumption between UL and DL for UL PL estimation. In an embodiment, the UE can be configured with two RS relationships wherein the first relationship is between UL with Tx beam0 (UE) 2708 and Rx beam0 (gNB) 2704 and DL CSI-RS APG1 with Tx beam 0 (gNB) 2702 and Rx beam0 (UE) 2706. The UE is provided with at least two RS relationship or "RS relationship assumption" or "RS relationship association" specific power control parameter sets for SRS/PUSCH/PUCCH wherein the RS relationship association can be between a first APG and a second APG which can be configured with at least two different RS from:
DMRS for PUSCH
DMRS for PUCCH
SRS
CSI-RS for DL L3 RSRP
CSI-RS for DL L1 RSRP or CSI measurement
DMRS for PDCCH
DMRS for PDSCH
SS Block The UE is provided with one or more RS relationships or RS relationship assumptions and different RS relationship assumptions are associated with different RS configurations identified with a different APG index, resource index, or resource set index. Each RS configuration is associated with at least one of first type CSI-RS, SS block and second type CSI-RS. Table 3 below shows the RS relationships between different RS configurations.

TABLE 3

| APG QCL assumption/association | |
|---|---|
| DMRS for PUSCH | CSI-RS or SS block or DMRS for |
| DMRS for PUCCH | PDCCH or DMRS for PDSCH |
| SRS | |
| SRS | DMRS for PUSCH or DMRS for PUCCH |
| DMRS for PUCCH | DMRS for PUSCH |

For SRS/PUSCH/PUCCH with a first RS relationship or RS relationship assumption, the first power control parameter set is used for UL PC. For SRS/PUSCH/PUCCH with a second RS relationship or RS relationship assumption, the second power control parameter set is used for UL PC. Each power control parameter set includes parameters of at least one of a first target power (nominal part $P_0$), second target power (UE specific part $P_0$), pathloss (PL), PL compensation factor, and a closed-loop transmission power command TPC factor for dynamic power adjustment following formula 10 $\log_{10}(M_{UL})+[P_{0\_NOMINAL\_UL}+P_{0\_UE\_UL}]+\alpha\cdot PL+\Delta_{TF}(i)+f(i)$ wherein $P_{0\_NOMINAL\_UL}$ and $P_{0\_UE\_UL}$ denote first target power and second target power PL and a denote PL compensation factor and pathloss (PL) and f(i) denotes a closed-loop transmission power command TPC factor.

In an embodiment, the UE is configured with at least two specific power control parameter sets for PUSCH/PUCCH/SRS. The first target power can be common and configured with a broadcasting channel. The second target power can be common and configured with dedicated RRC signaling. Alternatively, the second target power can be different with multiple values with or without multiple offset values configured with dedicated RRC signaling wherein each specific second target power is associated with a specific RS relationship or RS relationship assumption. The PL compensation factor can be common and configured with dedicated RRC signaling. Alternatively PL compensation factor can be different with multiple values which are configured with dedicated RRC signaling. The TPC can be common and configured with DCI. Alternatively can be independently operated with or without accumulative mechanism with DCI and each TPC is associated with one specific RS relationship or RS relationship assumption.

In another embodiment, the UE is configured with at least two specific power control parameter sets for PUSCH which is associated with at least two data layers or data layer groups or antenna ports or antenna port groups. In this embodiment, at least two data layers or data layer groups or antenna ports or antenna port groups are associated with one PUSCH assignment or at least one codeword. For one example, at least two data layers or data layer groups or antenna ports or antenna port groups are associated with one codeword and each data layer/data layer group/antenna port/antenna port group is associated with one specific RS relationship or RS relationship assumption. For another example, at least two data layers or data layer groups or antenna ports or antenna port groups are associated with two codewords and each data layer/data layer group/antenna port/antenna port group is associated with one specific RS relationship or RS relationship assumption. For this embodiment, the UE is configured with at least two specific power control parameter sets for PUSCH. For first data layer or data layer group or antenna port or antenna port group with a first RS relationship or RS relationship assumption, the first power control parameter set is used for UL PC. For second data layer or data layer group or antenna port or antenna port group with a second RS relationship or RS relationship assumption, the second power control parameter set is used for UL PC. The first target power can be common and configured with a broadcasting channel. The second target power can be common and configured with dedicated RRC signaling. Alternatively, the second target power can be different with multiple values with or without multiple offset values configured with dedicated RRC signaling wherein each specific second target power is associated with a specific RS relationship or RS relationship assumption. The PL compensation factor can be common and configured with dedicated RRC signaling. Alternatively PL compensation factor can be different with multiple values which are configured with dedicated RRC signaling. The TPC can be common and configured with dynamic DCI. For this embodiment, one common power scaling factor can be used for scaling the total power for PUSCH with all data layers or antenna ports. The scaling factor can be the ratio between preconfigured P_MAX and the total power derived with the power control mechanism.

The UE can be configured to support a RS relationship specific PC for separate RS relationship or RS relationship assumptions. For PUSCH/PUCCH/SRS or PUSCH data layer/data layer group/antenna port/antenna port group with a first RS relationship or RS relationship assumption, the PL of the first power control parameter set will be estimated with DL RS (e.g. CSI-RS) associated with a first RS relationship or RS relationship assumption. For PUSCH/PUCCH/SRS or PUSCH data layer/data layer group/antenna port/antenna port group with a second RS relationship or RS relationship assumption, the PL of the second power control parameter set will be estimated with DL RS associated with a second RS relationship or RS relationship assumption. The RS relationship or RS relationship assumption can be at least one of RRC signaling, dynamic DCI or MAC CE. Providing the UE with the RS relationship assumption between AGP of SRS and AGP of DMRS of PUSCH can be based on an explicit association or an implicit association which can be derived from the common RS relationship association with the APG of another RS (CSI-RS). The power control parameter set for PUSCH can be partially reused for power control parameter set for SRS wherein SRS and PUSCH are configured with same RS relationship or RS relationship assumption.

In an embodiment, the UE is configured with one common power control parameter set for SRS transmission with at least one specific resource wherein the resource can be associated with a specific at least one of a 1) resource index, 2) AGP RS relationship assumption with AGP of the other RS, and 3) RS relationship index. The common power control parameter set can be partially derived from at least 1) one reference power control parameter set for PUSCH, 2) a separate power control parameter set which is different from any of the PUSCH power control parameter sets, and 3) one additional power offset which can be configured. The configuration can be MAC CE, RRC, or DCI triggered. For a first example, this common power control parameter set can be one of multiple RS relationship specific power control parameter sets for PUSCH with or without one additional power offset based on configuring reference RS relationship or RS relationship assumption. For a second example, this common power control parameter set can be separately configured with at least one of a first target power (nominal part $P_0$), second target power (UE specific part $P_0$), pathloss (PL) with specific RS relationship or RS relationship assumption, PL compensation factor, and a closed-loop TPC factor. And this common power control parameter set can be used for SRS transmissions with multiple specific resources.

Figure 28A:
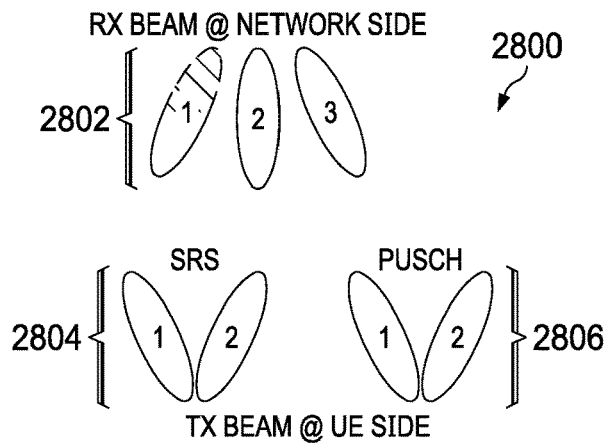
FIGS. 28A and 28B are diagrams of embodiments of a system illustrating the association between SRS and PUSCH.
Figure 28B:
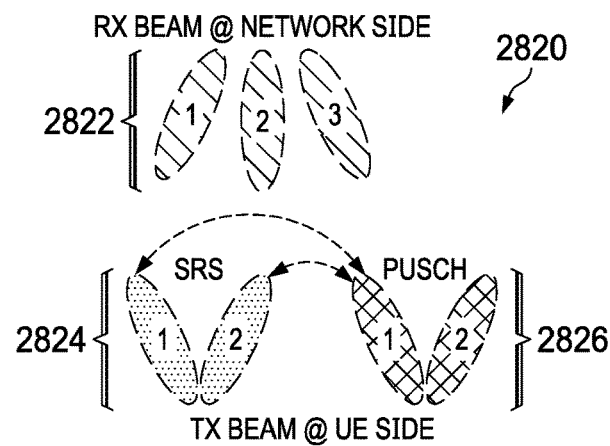

FIGS. 28A and 28B are diagrams of embodiments of a system 2800, 2820 illustrating the association between SRS and PUSCH. FIG. 28A is a system 2800 that shows that, in an embodiment, the first PUSCH is associated with a first SRS and the second PUSCH is associated with a second SRS with a specific RS relationship configuration. FIG. 28B is a system 2820 that shows that, in an embodiment, the first PUSCH and the second PUSCH are associated with the same SRS with RS relationship configuration.

Figure 29:
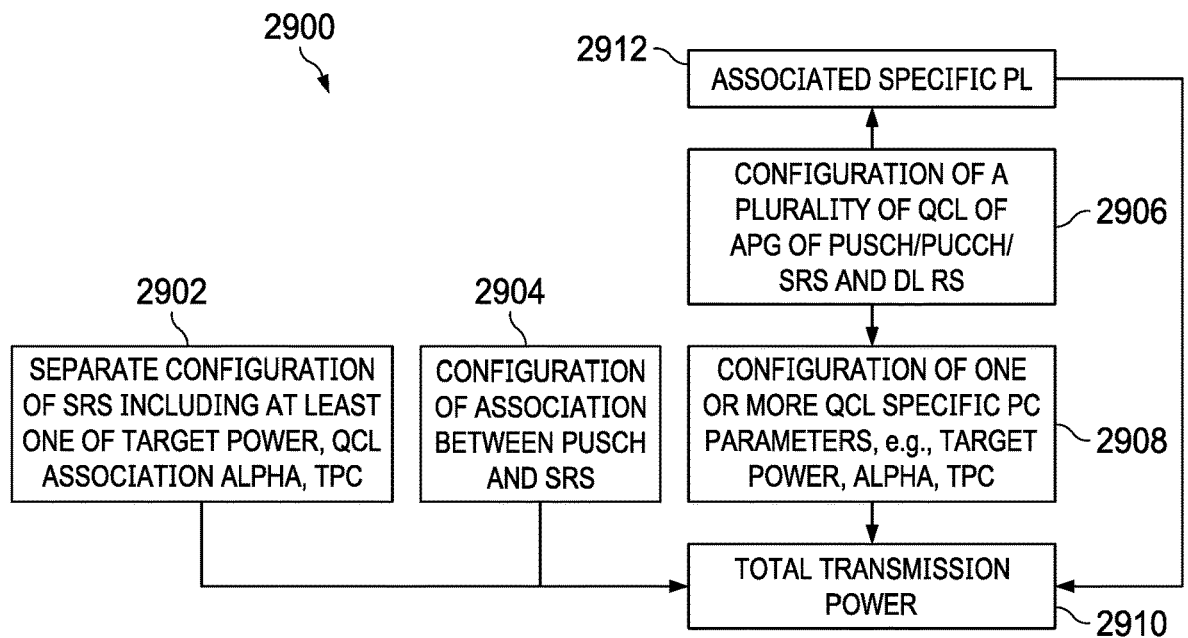
FIG. 29 is a flowchart of an embodiment of a method for beam or RS relationship specific UL PC that is RS relationship specific.

FIG. 29 is a flowchart of an embodiment of a method 2900 for RS relationship specific UL PC that is RS relationship assumption specific. The method 2900 begins at block 2902 where separate configuration of SRS including at least one of a target power, a QCL association alpha, and TPC is performed. At block 2904, a configuration of association between PUSCH and SRS is performed. At block 2906, a configuration of a plurality of QCL of APG of PUSCH/PUCCH/SRS and DL RS is performed. At block 2908, a configuration of one or more QCL specific PC parameters (e.g., target power, alpha, TPC, etc.) is performed. At block 2912, associated specific PLs are determined from the configuration of the plurality of QCLs of APG of PUSCH/PUCCH/SRS and DL RS. AT block 2910, the total transmission power is determined from the configurations in blocks 2902, 2904, 2906, 2908 and from the associated specific PLs determined in block 2912.

Figure 30A:
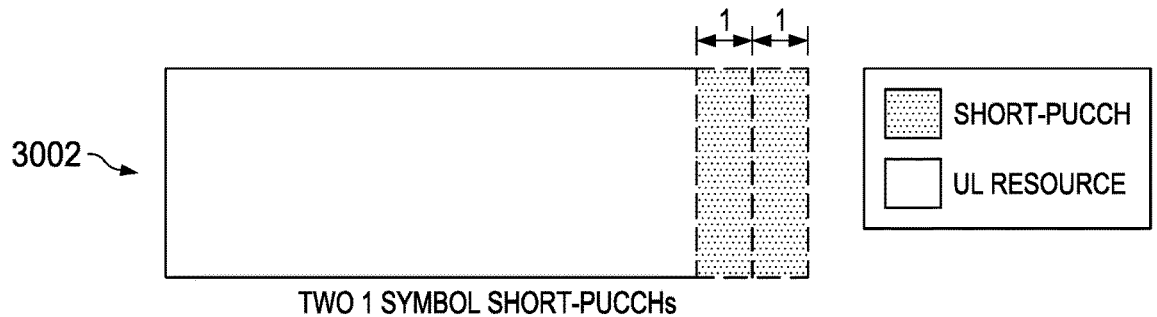
FIGS. 30A-30D show various embodiments for TDM multiplexing between two PUCCHs with same or different symbol.
Figure 30B:
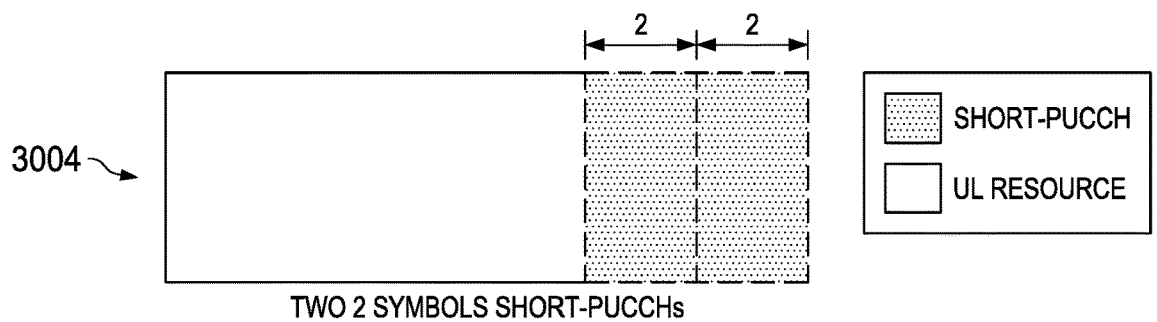
Figure 30C:
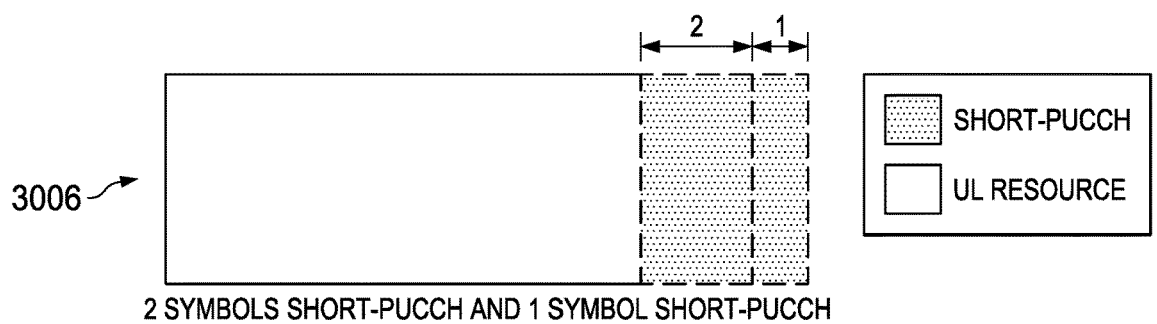
Figure 30D:
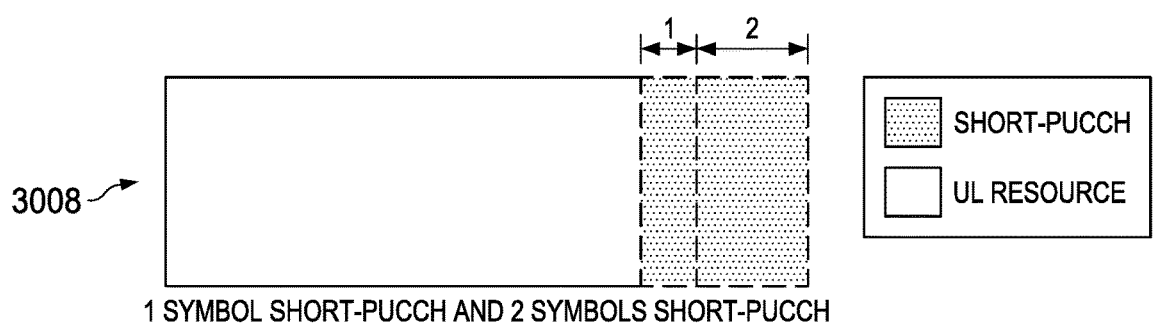

FIGS. 30A-30D show various embodiments 3002, 3004, 3006, 3008 for UL PC parameters. In FIG. 30A, the UL resource is followed by two 1-symbol short-PUCCHs. In FIG. 30B, the UL resource is followed by two 2-symbol short-PUCCHs. In FIG. 30C, the UL resource is followed by a 2-symbol short-PUCCH and a 1 symbol short-PUCCH. In FIG. 30D, the UL resource is followed by a 1-symbol short-PUCCH and a 2-symbol short-PUCCH.

In an embodiment, the method for UL PC parameter is PUCCH resource specific. In either case, the UE is provided with a resource specific power control parameter set wherein the resource can be associated with at least one of:
  PUCCH format—e.g., different symbol number of one PUCCH format
  Numerology
  Transmission scheme—(pre-DFT, sequence based)
  Multiplexing with another channel/reference signal or not
  Payload size
  Waveform The UE is provided with multiple power control parameter sets associated with different PUCCH resources. For a PUCCH with a first resource, the first power control parameter set is used for UL PC. For PUCCH with a second resource, the second power control parameter set is used for UL PC. At least one of the first target power (nominal $P_0$), second target power (UE-specific $P_0$), PL, offset for uplink control information (UCI) bit type, and the offset for PUCCH format can be different. The PC can be provided by the following expression: $[P_{0\_nominal}+P_{0\_specific}]+PL_{QCL}+\Delta_{UCI}+\Delta_{F\_PUCCH}(F)+\Delta_{TxD}+g(i)$ wherein $P_{0\_nominal}$ and $P_{0\_specific}$ denote first target power and second target power, $PL_{QCL}$ denotes RS relationship specific PL, $\Delta_{UCI}$ $\Delta_{F\_PUCCH}$ (F) denote offset for uplink control information (UCI) bit type and the offset for PUCCH format, and g(i) denotes closed-loop TPC for PUCCH.

Figure 31:
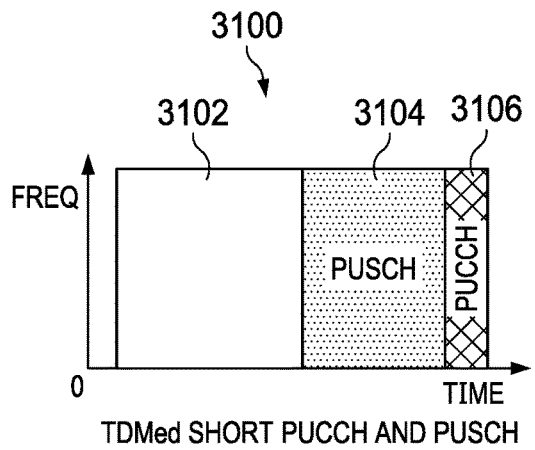
FIG. 31 shows a TDM multiplexed between a short PUCCH and a PUSCH following a UL resource.

In another embodiment, UE supports TDM multiplexing between different PUCCH transmissions which may have different transmission power. For this embodiment, one power control scaling mechanism for at least one of PUCCH will be used for the same power level for different PUCCH transmission. For a first example, the scaling mechanism is to decrease the one larger power; For a second example, the scaling mechanism is to increase the one smaller power; For a third example, the scaling mechanism is to scale all different powers for all different PUCCHs;

In another embodiment, UE may support TDM multiplexing between PUSCH and PUCCH transmissions which may have different transmission power. FIG. 31 shows a TDM 3100 multiplexed between a short PUCCH 3106 and a PUSCH 3104 following a UL resource 3102. For this embodiment, one power control scaling mechanism for at least one of PUCCH and PUSCH will be used for the same power level for PUCCH and PUSCH transmission. In a first example, the scaling mechanism is to decrease the one larger power for PUSCH or PUCCH. In a second example, the scaling mechanism is to increase the one smaller power for PUSCH or PUCCH. In a third example, the scaling mechanism is to scale all different powers for both PUSCH and PUCCH.

Figure 32:
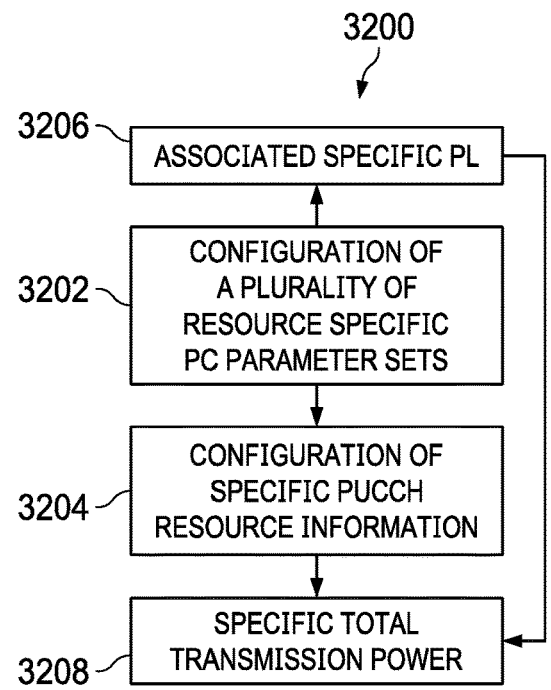
FIG. 32 is a flowchart of an embodiment of a method for PUCCH resource specific or specific PC.

FIG. 32 is a flowchart of an embodiment of a method 3200 for PUCCH specific PC. At block 3202, a UE receives a configuration of a plurality of resource specific PC parameter sets. At block 3206, the UE determines associated specific PLs from the resource specific PC parameter sets. At block 3204, the UE receives configuration of specific PUCCH resource information. At block 3208, the UE determines a specific total transmission power from the specific PUCCH resource information and the associated specific PLs.

Figure 33:
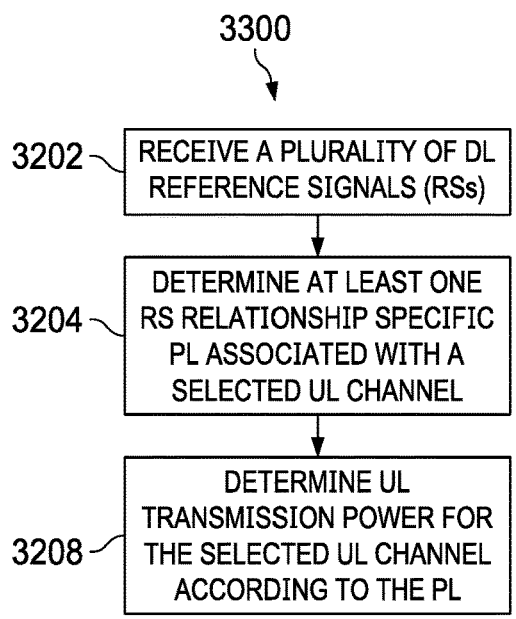
FIG. 33 is a flowchart of an embodiment of a method for UL transmission power control.

FIG. 33 is a flowchart of an embodiment of a method 3300 for UL transmission power control. At block 3302, the UE receives a plurality of DL reference signals (RSs). Each DL RS is associated with at least one UL channel. At block 3304, the UE determines at least one RS relationship specific pathloss (PL) associated with a selected UL channel according to the RS associated with the selected UL channel. At block 3306, the UE determines UL transmission power for the selected UL channel according to the PL.

Figure 34:
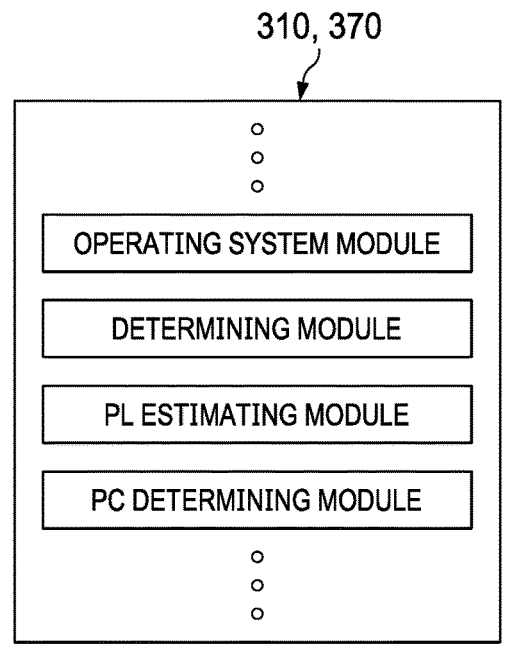
FIG. 34 is a block diagram of component modules.

It should be appreciated that one or more steps of the embodiment methods provided herein may be performed by corresponding units or modules, according to FIG. 34 30. For example, a signal may be transmitted by a transmitting unit or a transmitting module. A signal may be received by a receiving unit or a receiving module. A signal may be processed by a processing unit or a processing module. Other steps may be performed by a determining module, a PL estimating module, and PC determining module. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Additional details regarding the EDs 310 and the base stations 370 are known to those of skill in the art. As such, these details are omitted here for clarity.

In an embodiment, a method in a user equipment (UE) for uplink (UL) transmission power control includes receiving, by the UE, a plurality of DL reference signals (RSs). Each DL RS is associated with at least one UL channel. The method also includes determining, by the UE, at least one RS relationship specific pathloss (PL) associated with a selected UL channel according to the RS associated with the selected UL channel. The method also includes determining, by the UE, UL transmission power for the selected UL channel according to the PL.

In an embodiment, a method in a user equipment (UE) for resource specific power control parameter set includes receiving, by the UE, more than one PUCCH format comprising a symbol number and payload size. The method also includes receiving, by the UE, more than one power control parameter sets each associated with different PUCCH formats. The method also includes transmitting, by the UE, a PUCCH according to a transmission power determined according to one of the PUCCH formats.

In an embodiment, a user equipment (UE) for uplink (UL) transmission power control, includes a non-transitory memory storage that includes instructions. The UE also includes one or more processors in communication with the non-transitory memory storage. The one or more processors execute instructions according to the method of any one of the disclosed embodiments or aspects.

In an embodiment, a non-transitory computer-readable medium storing computer instructions for uplink (UL) transmission power control is provided. The instructions, when executed by one or more processors, cause the one or more processors to perform the method of any one of the disclosed embodiments or aspects.

Optionally, in any of the preceding aspects, another implementation of the aspect also includes transmitting an UL transmission according to the UL transmission power.

Optionally, in any of the preceding aspects, the UL transmission is one of a PUCCH, a PUSCH, and an SRS.

Optionally, in any of the preceding aspects, another implementation of the aspect also includes receiving a RS relationship between a DL (RS) and an associated UL channel.

Optionally, in any of the preceding aspects, each DL RS is one of a SS block, a CSI-RS, DMRS for physical DL control channel (PDCCH). The associated UL channel is one of a sounding reference signal (SRS), a physical UL shared channel (PUSCH), and physical UL control channel (PUCCH).

Optionally, in any of the preceding aspects, another implementation of the aspect also includes L3 filtering according to a first filter coefficient configured for SS block.

Optionally, in any of the preceding aspects, another implementation of the aspect also includes L3 filtering according to a second filter coefficient configured for CSI-RS.

Optionally, in any of the preceding aspects, a first filter coefficient or a second filter coefficient is configured based on at least one of predefinition, broadcasting signaling and RRC signaling.

Optionally, in any of the preceding aspects, another implementation of the aspect also includes receiving, by the UE, at least two RS relationship specific power control parameter sets for one of SRS, PUSCH, PUCCH.

Optionally, in any of the preceding aspects, another implementation of the aspect also includes receiving, by the UE, more than one RS relationship, each RS relationship associated with a respective DL RS configuration identified with at least one of respective DL RS type, respective antenna port group (APG) index, resource index, and resource set index.

Optionally, in any of the preceding aspects, for SRS, PUSCH, or PUCCH with a first RS relationship, a first power control parameter set is used for determining UL transmission power.

Optionally, in any of the preceding aspects, for SRS, PUSCH, or PUCCH with a second RS relationship, a second control parameter set is used for determining UL transmission power.

Optionally, in any of the preceding aspects, each power control parameter set includes parameters for at least one of a first target power, a second target power, a PL, a PL compensation factor, and a TPC factor.

Optionally, in any of the preceding aspects, a first target power of a first control parameter set and a first target power of a second control parameter set are the same and are configured with a broadcasting channel.

Optionally, in any of the preceding aspects, a second target power of a first control parameter set and a second target power of a second control parameter set are common and configured with dedicated RRC signaling.

Optionally, in any of the preceding aspects, a second target power of a first control parameter set and a second target power of a second control parameter set are separately configured with dedicated RRC signaling.

Optionally, in any of the preceding aspects, a PL compensation factor of a first control parameter set and a PL compensation factor of a second control parameter set are common and configured with dedicated RRC signaling.

Optionally, in any of the preceding aspects a PL compensation factor of a first control parameter set and a PL compensation factor of a second control parameter set are separately configured with dedicated RRC signaling.

Optionally, in any of the preceding aspects, a DL RS resource of a first control parameter set and a DL RS resource of a second control parameter set are common and configured with dedicated RRC signaling.

Optionally, in any of the preceding aspects, a DL RS resource of a first control parameter set and a DL RS resource of a second control parameter set are separately configured with dedicated RRC signaling.

Optionally, in any of the preceding aspects, a closed-loop TPC of a first control parameter set and a closed-loop TPC of a second control parameter set are common and configured with dedicated RRC signaling.

Optionally, in any of the preceding aspects, a closed-loop TPC of a first control parameter set and a closed-loop TPC of a second control parameter set are separately configured with dedicated RRC signaling.

Optionally, in any of the preceding aspects, a RS relationship is indicated with at least one of DCI, RRC signaling, and MAC CE.

Optionally, in any of the preceding aspects, another implementation of the aspect also includes obtaining, by the UE, a RS relationship between an AGP of an SRS resource and an AGP of a DMRS of a PUSCH. The RS relationship is determined according to an explicit association or the RS relationship is determined according to an implicit association derived from a common RS relationship associated with the APG of another RS.

Optionally, in any of the preceding aspects, a power control parameter set for PUSCH is at least partially reused for a power control parameter set for SRS.

Optionally, in any of the preceding aspects, another implementation of the aspect also includes configuring the UE with one common power control parameter set for SRS transmission with more than one specific resource wherein the one specific resource is associated with at least one of a DL RS type, a resource index and, RS relationship index. The implementation of the aspect also includes determining a common power control parameter set according to a power control parameter set, the power control parameter set is different from any of the PUSCH power control parameter sets.

Optionally, in any of the preceding aspects, the configuring the UE is triggered by a MAC CE, a RRC, and or a DCI.

Optionally, in any of the preceding aspects, another implementation of the aspect also includes configuring a plurality of RS relationships between APGs for PUSCH, PUCCH, or SRS and configuring a DL RS. The implementation of the aspect also includes configuring one or more RS relationships specific DL RS for PL estimation. The implementation of the aspect also includes configuring an association between the PUSCH and the SRS. The implementation of the aspect also includes configuring the separate SRS power control set including at least one of a target power, a RS for PL estimation, alpha, and TPC. The implementation of the aspect also includes determining a total transmit power according to the configurations and an associated specific PL.

Optionally, in any of the preceding aspects, the SS block comprises at least one of a synchronization signal and a demodulation reference signal (DMRS) for a physical broadcast channel (PBCH).

Optionally, in any of the preceding aspects, a first target power of a first control parameter set and a first target power of a second control parameter set are common and configured with a broadcasting channel.

Optionally, in any of the preceding aspects, an offset for PUCCH format of a first control parameter set and an offset for PUCCH format of a second control parameter set are separately configured with dedicated RRC signaling.

Optionally, in any of the preceding aspects, another implementation of the aspect also includes configuring a plurality of resource specific PC parameter sets. The implementation of the aspect also includes configuring specific PUCCH resource information. The implementation of the aspect also includes determining a specific total transmission power according to the configurations.

Although several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In an embodiment, a method in a user equipment (UE) for reference signal (RS) relationship specific uplink (UL) transmission power control includes transmitting, by the UE, a first UL signal according to a first power control set including at least one of a first target power, a second target power, a DL reference signal (RS) for pathloss estimation, a pathloss compensation factor, and a transmit power command (TPC). The first power control set is determined according to a first RS relationship between one first RS and a first UL signal.

Optionally, in any of the preceding aspects, the method further includes transmitting, by the UE, a second UL signal according to a second power control set including at least one of another first target power, another second target power, another DL RS for pathloss estimation, another pathloss compensation factor, and another transmit power command (TPC). The second power control set is determined according to a second RS relationship between second RS and a second UL signal.

Optionally, in any of the preceding aspects, the first or second RS for RS relationship is one of a SS block, a CSI-RS, and a sounding reference signal (SRS). The UL signal is one of a physical UL shared channel (PUSCH), and physical UL control channel (PUCCH).

Optionally, in any of the preceding aspects, the method further includes receiving more than one RS configurations for RS relationship. Each RS configuration is associated with one specific RS relationship and identified with at least one of a respective DL RS type, a respective antenna port group (APG) index, a resource index, and a resource set index wherein an APG has at least one antenna port.

Optionally, in any of the preceding aspects, one first target power of the first power control set and one another first target power of the second power control set are the same and are configured with a broadcasting channel.

Optionally, in any of the preceding aspects, one second target power of the first power control set and one another second target power of the second power control set are separately configured with dedicated RRC signaling.

Optionally, in any of the preceding aspects, one PL compensation factor of the first power control set and one another PL compensation factor of the second power control set are separately configured with dedicated RRC signaling.

Optionally, in any of the preceding aspects, one DL RS for pathloss estimation of the first power control set and one another DL RS resource for pathloss estimation of the second power control set are separately configured with dedicated RRC signaling.

Optionally, in any of the preceding aspects, one TPC of the first power control set and one another TPC of the second power control set are separately configured with dedicated RRC signaling.

Optionally, in any of the preceding aspects, an RS relationship is indicated with at least one of DCI, RRC signaling, and MAC CE.

Optionally, in any of the preceding aspects, the SS block comprises at least one of a synchronization signal and a demodulation reference signal (DMRS) for a physical broadcast channel (PBCH).

Optionally, in any of the preceding aspects, the method further includes L3 filtering according to a first filter coefficient configured for pathloss estimation with an SS block.

Optionally, in any of the preceding aspects, the method further includes L3 filtering according to a second filter coefficient configured for pathloss estimation with a CSI-RS.

Optionally, in any of the preceding aspects, the first filter coefficient or the second filter coefficient is configured based on at least one of predefinition and RRC signaling.

Optionally, in any of the preceding aspects, the information associating the first power control set with the first RS relationship and information associating the second power control set with the second RS relationship is obtained by at least one of predefinition, broadcast signaling, or dedicated signaling from a network.

In an embodiment, a method in a user equipment (UE) for PUCCH resource specific power control includes transmitting, by the UE, a first PUCCH according to a first power control set including a first target power, a second target power, a DL reference signal (RS) for pathloss estimation, an offset for PUCCH format, and a transmit power command (TPC). The first power control set is determined according to a first PUCCH resource, the first PUCCH resource including at least one of first PUCCH format with specific symbol number, first numerology.

Optionally, in any of the preceding aspects, the method further includes transmitting, by the UE, a second PUCCH according to a second power control set including another first target power, another second target power, another DL reference signal (RS) for pathloss estimation, another offset for PUCCH format, and another transmit power command (TPC). The second power control set is determined according to a second PUCCH resource, the second PUCCH resource including at least one of second PUCCH format with specific symbol number, second numerology.

Optionally, in any of the preceding aspects, one first target power of a first power control set and another first target power of a second power control set are the same and are configured with a broadcasting channel.

Optionally, in any of the preceding aspects, one second target power of a first power control set and another second target power of a second power control set are separately configured with dedicated RRC signaling.

Optionally, in any of the preceding aspects, one DL RS of a first power control set and another DL RS resource of a second power control set are separately configured with dedicated RRC signaling.

Optionally, in any of the preceding aspects, one TPC of a first power control set and another TPC of a second power control set are separately configured with dedicated RRC signaling.

Optionally, in any of the preceding aspects, the method further includes providing information associating the first power control set with the first PUCCH resource and information associating the second power control set with the second PUCCH resource.

Optionally, in any of the preceding aspects, the method further includes configuring more than one PUCCH resource specific power control set. The method also includes configuring one or more numerology. The method also includes configuring one or more PUCCH format specific offset. The method also includes determining a specific total transmission power according to one PUCCH resource specific power control set.

In an embodiment, a user equipment (UE) for uplink (UL) transmission power control, includes a non-transitory memory storage comprising instructions and one or more processors in communication with the non-transitory memory storage, wherein the one or more processors execute instructions according any of the disclosed embodiments or aspects.

In an embodiment, a non-transitory computer-readable medium storing computer instructions for uplink (UL) transmission power control, that when executed by one or more processors, cause the one or more processors to perform the method of any of the disclosed embodiments or aspects.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method, comprising:
    obtaining, by an apparatus, configuration of a reference signal (RS) relationship between an RS and a physical uplink control channel (PUCCH), the RS relationship associated with spatial information for the PUCCH, wherein the RS relationship is associated with a plurality of power control parameters comprising a target power, a pathloss, and a transmit power command (TPC);
    determining, by the apparatus, a value of the target power in accordance with the RS relationship obtained by the apparatus;
    determining, by the apparatus, a value of the pathloss in accordance with the RS relationship obtained by the apparatus;
    determining, by the apparatus, a value of the TPC in accordance with the RS relationship obtained by the apparatus;
    determining, by the apparatus, an uplink transmission power based on the value of the target power, the value of the pathloss, and the value of the TPC; and
    transmitting, by the apparatus to a base station, the PUCCH using the uplink transmission power.

2. The method of claim 1, wherein the determining the value of the pathloss comprises:
    determining a downlink reference signal for pathloss estimation in accordance with the RS relationship; and
    determining the value of the pathloss in accordance with the downlink reference signal.

3. The method of claim 1, further comprising:
    performing a layer 3 filtering according to a filtering coefficient configured for pathloss estimation with a synchronization signal (SS) block.

4. The method of claim 1, further comprising:
    performing a layer 3 filtering according to a filtering coefficient configured for pathloss estimation with a channel state information-reference signal (CSI-RS).

5. The method of claim 1, wherein the configuration of the RS relationship is indicated by a radio resource control (RRC) signaling.

6. The method of claim 1,
    wherein the configuration of the RS relationship includes RS information that comprises information of one of a synchronization signal (SS) block, a channel state information-reference signal (CSI-RS), or a sounding reference signal (SRS),
    wherein the determining the value of the target power includes:
        determining, by the apparatus, the value of the target power in accordance with the information of the one of the SS block, the CSI-RS, or the SRS in the RS relationship,
    wherein the determining the value of the pathloss includes:
        determining, by the apparatus, the value of the pathloss in accordance with the information of the one of the SS block, the CSI-RS, or the SRS in the RS relationship, and
    wherein the determining the value of the TPC includes:
        determining, by the apparatus, the value of the TPC in accordance with the information of the one of the SS block, the CSI-RS, or the SRS in the RS relationship.

7. The method of claim 1, wherein the target power comprises a user equipment specific target power.

8. An apparatus, comprising:
    a non-transitory memory comprising instructions; and
    one or more processors in communications with the non-transitory memory, wherein the one or more processors are configured to execute the instructions to perform operations, the operations comprising:
        obtaining configuration of a reference signal (RS) relationship between an RS and a physical uplink control channel (PUCCH), the RS relationship associated with spatial information for the PUCCH, wherein the RS relationship is associated with a plurality of power control parameters comprising a target power, a pathloss, and a transmit power command (TPC);
        determining a value of the target power in accordance with the RS relationship obtained by the apparatus;
        determining a value of the pathloss in accordance with the RS relationship obtained by the apparatus;
        determining a value of the TPC in accordance with the RS relationship obtained by the apparatus;
        determining an uplink transmission power based on the value of the target power, the value of the pathloss, and the value of the TPC; and
        transmitting, to a base station, the PUCCH using the uplink transmission power.

9. The apparatus of claim 8, wherein the determining the value of the pathloss comprises:
   determining a downlink reference signal for pathloss estimation in accordance with the RS relationship; and
   determining the value of the pathloss in accordance with the downlink reference signal.

10. The apparatus of claim 8, the operations further comprising:
    performing a layer 3 filtering according to a filtering coefficient configured for pathloss estimation with a synchronization signal (SS) block.

11. The apparatus of claim 8, the operations further comprising:
    performing a layer 3 filtering according to a filtering coefficient configured for pathloss estimation with a channel state information-reference signal (CSI-RS).

12. The apparatus of claim 8, wherein the configuration of the RS relationship is indicated by a radio resource control (RRC) signaling.

13. The apparatus of claim 8,
    wherein the configuration of the RS relationship includes RS information that comprises information of one of a synchronization signal (SS) block, a channel state information-reference signal (CSI-RS), or a sounding reference signal (SRS),
    wherein the determining the value of the target power includes:
       determining, by the apparatus, the value of the target power in accordance with the information of the one of the SS block, the CSI-RS, or the SRS in the RS relationship,
    wherein the determining the value of the pathloss includes:
       determining, by the apparatus, the value of the pathloss in accordance with the information of the one of the SS block, the CSI-RS, or the SRS in the RS relationship, and
    wherein the determining the value of the TPC includes:
       determining, by the apparatus, the value of the TPC in accordance with the information of the one of the SS block, the CSI-RS, or the SRS in the RS relationship.

14. The apparatus of claim 8, wherein the target power comprises a user equipment specific target power.

15. A non-transitory computer-readable medium storing computer instructions, that when executed by one or more processors, cause an apparatus to perform operations, the operations comprising:
    obtaining configuration of a reference signal (RS) relationship between an RS and a physical uplink control channel (PUCCH), the RS relationship associated with spatial information for the PUCCH, wherein the RS relationship is associated with a plurality of power control parameters comprising a target power, a pathloss, and a transmit power command (TPC);
    determining a value of the target power in accordance with the RS relationship obtained by the apparatus;
    determining a value of the pathloss in accordance with the RS relationship obtained by the apparatus;
    determining a value of the TPC in accordance with the RS relationship obtained by the apparatus;
    determining an uplink transmission power based on the value of the target power, the value of the pathloss, and the value of the TPC; and
    transmitting, to a base station, the PUCCH using the uplink transmission power.

16. The non-transitory computer-readable medium of claim 15, wherein the determining the value of the pathloss comprises:
    determining a downlink reference signal for pathloss estimation in accordance with the RS relationship; and
    determining the value of the pathloss in accordance with the downlink reference signal.

17. The non-transitory computer-readable medium of claim 15, the operations further comprising:
    performing a layer 3 filtering according to a filtering coefficient configured for pathloss estimation with a synchronization signal (SS) block.

18. The non-transitory computer-readable medium of claim 15, the operations further comprising:
    performing a layer 3 filtering according to a filtering coefficient configured for pathloss estimation with a channel state information-reference signal (CSI-RS).

19. The non-transitory computer-readable medium of claim 15, wherein the configuration of the RS relationship is indicated by a radio resource control (RRC) signaling.

20. The non-transitory computer-readable medium of claim 15,
    wherein the configuration of the RS relationship includes RS information that comprises information of one of a synchronization signal (SS) block, a channel state information-reference signal (CSI-RS), or a sounding reference signal (SRS),
    wherein the determining the value of the target power includes:
       determining, by the apparatus, the value of the target power in accordance with the information of the one of the SS block, the CSI-RS, or the SRS in the RS relationship,
    wherein the determining the value of the pathloss includes:
       determining, by the apparatus, the value of the pathloss in accordance with the information of the one of the SS block, the CSI-RS, or the SRS in the RS relationship, and
    wherein the determining the value of the TPC includes:
       determining, by the apparatus, the value of the TPC in accordance with the information of the one of the SS block, the CSI-RS, or the SRS in the RS relationship.

* * * * *